(12) United States Patent
Massey

(10) Patent No.: US 11,460,145 B2
(45) Date of Patent: Oct. 4, 2022

(54) ADJUSTABLE MOUNTING SYSTEMS FOR TELEVISIONS

(71) Applicant: Manehu Product Alliance, LLC, Carlsbad, CA (US)

(72) Inventor: Kurt William Massey, Mooresville, NC (US)

(73) Assignee: Manehu Product Alliance, LLC, Carlsbad, CA (US)

(*) Notice: Subject to any disclaimer, the term of this patent is extended or adjusted under 35 U.S.C. 154(b) by 0 days.

(21) Appl. No.: 16/924,551

(22) Filed: Jul. 9, 2020

(65) Prior Publication Data

US 2020/0408353 A1 Dec. 31, 2020

Related U.S. Application Data

(63) Continuation of application No. 16/370,854, filed on Mar. 29, 2019, now abandoned, which is a
(Continued)

(51) Int. Cl.
*F16M 11/04* (2006.01)
*F16M 13/02* (2006.01)
(Continued)

(52) U.S. Cl.
CPC ............ *F16M 11/04* (2013.01); *F16M 11/00* (2013.01); *F16M 11/08* (2013.01); *F16M 11/10* (2013.01); *F16M 11/12* (2013.01); *F16M 11/18* (2013.01); *F16M 11/2014* (2013.01); *F16M 11/2021* (2013.01); *F16M 11/2092* (2013.01); *F16M 11/24* (2013.01); *F16M 13/02* (2013.01); *F16M 13/022* (2013.01); *F16M 2200/024* (2013.01); *F16M 2200/044* (2013.01); *F16M 2200/063* (2013.01)

(58) Field of Classification Search
None
See application file for complete search history.

(56) References Cited

U.S. PATENT DOCUMENTS

| 2,090,439 A | 8/1937 | Carwardine |
| 2,630,854 A | 3/1953 | Neher |

(Continued)

FOREIGN PATENT DOCUMENTS

| CN | 111031859 A | 4/2020 |
| GB | 2222939 | 3/1990 |
| WO | 2019043670 | 3/2019 |

OTHER PUBLICATIONS

ISA, International Search Report and Written Opinion for International Application No. PCT/IB2018/57591, dated Jan. 29, 2019.

*Primary Examiner* — Steven M Marsh
(74) *Attorney, Agent, or Firm* — Perkins Coie LLP

(57) ABSTRACT

A mounting system capable of mounting objects to support structures. The mounting system includes a wall mount including a display bracket configured to hold the object, a fixed support bracket coupleable to a vertical support structure, and a linkage assembly. The linkage assembly has a low-profile stowed configuration in which the object is held in a raised position close to the support structure. Tilt adjustment mechanisms are used to adjust the tilt of the display bracket.

27 Claims, 39 Drawing Sheets

Related U.S. Application Data continuation of application No. 15/489,596, filed on Apr. 17, 2017, now Pat. No. 10,281,080, which is a continuation-in-part of application No. 14/563,842, filed on Dec. 8, 2014, now Pat. No. 9,625,091, and a continuation-in-part of application No. 14/229,780, filed on Mar. 28, 2014, now Pat. No. 9,876,984, which is a continuation of application No. 13/118,297, filed on May 27, 2011, now Pat. No. 8,724,037.

(60) Provisional application No. 61/913,195, filed on Dec. 6, 2013, provisional application No. 61/396,850, filed on Jun. 4, 2010.

(51) Int. Cl.
| | | |
|---|---|---|
| *F16M 11/00* | (2006.01) | |
| *F16M 11/20* | (2006.01) | |
| *F16M 11/24* | (2006.01) | |
| *F16M 11/18* | (2006.01) | |
| *F16M 11/10* | (2006.01) | |
| *F16M 11/08* | (2006.01) | |
| *F16M 11/12* | (2006.01) | |

(56) References Cited

U.S. PATENT DOCUMENTS

| | | |
|---|---|---|
| 4,076,351 A | 2/1978 | Wyant |
| 4,082,244 A | 4/1978 | Groff |
| 4,561,674 A | 12/1985 | Alessio |
| 4,691,886 A | 9/1987 | Wendling et al. |
| 5,037,054 A | 8/1991 | McConnell |
| 5,108,063 A | 4/1992 | Koerber, Sr. et al. |
| 5,224,677 A | 7/1993 | Close |
| 5,299,993 A | 4/1994 | Habing |
| 5,499,956 A | 3/1996 | Habing et al. |
| 5,560,501 A | 10/1996 | Rupert |
| 5,738,316 A | 4/1998 | Sweere et al. |
| 5,743,503 A | 4/1998 | Voeller et al. |
| 5,826,846 A | 10/1998 | Buccieri et al. |
| 5,842,672 A | 12/1998 | Sweere et al. |
| 5,857,756 A | 1/1999 | Fehre |
| 5,876,008 A | 3/1999 | Sweere et al. |
| 6,065,725 A | 5/2000 | Mason |
| 6,065,909 A | 5/2000 | Cook |
| 6,105,909 A | 8/2000 | Wirth et al. |
| 6,419,196 B1 | 7/2002 | Sweere et al. |
| 6,523,796 B2 | 2/2003 | Abramowsky et al. |
| 6,592,090 B1 | 7/2003 | Li |
| 6,695,274 B1 | 2/2004 | Chiu |
| 6,889,404 B2 | 5/2005 | Lu et al. |
| 6,905,101 B1 | 6/2005 | Dittmer |
| 6,983,917 B2 | 1/2006 | Oddsen, Jr. |
| 7,014,157 B2 | 3/2006 | Oddsen |
| 7,061,753 B2 | 6/2006 | Michoux et al. |
| 7,252,277 B2 | 8/2007 | Sweere et al. |
| 7,290,744 B2 | 11/2007 | Baldasari |
| 7,300,029 B2 | 11/2007 | Petrick et al. |
| 7,395,996 B2 | 7/2008 | Dittmer |
| 7,398,950 B2 | 7/2008 | Hung |
| 7,448,584 B2 | 11/2008 | Chen et al. |
| 7,546,745 B2 | 6/2009 | Lee et al. |
| 7,546,994 B2 | 6/2009 | Altonji et al. |
| 7,663,868 B1 | 2/2010 | Lam |
| 7,854,415 B2 | 12/2010 | Holbrook et al. |
| 7,866,622 B2 | 1/2011 | Dittmer |
| 7,950,613 B2 | 5/2011 | Anderson et al. |
| 8,006,440 B2 | 8/2011 | Thomas |
| 8,074,950 B2 | 12/2011 | Clary |
| 8,094,438 B2 | 1/2012 | Dittmer et al. |
| 8,333,355 B2 * | 12/2012 | Stifal ................ F16M 11/2092 248/279.1 |
| 8,382,052 B1 | 2/2013 | Mathieson et al. |
| 8,724,037 B1 | 5/2014 | Massey |
| 8,740,164 B2 | 6/2014 | Tachibana |
| 8,746,635 B2 | 6/2014 | Kim et al. |
| 8,864,092 B2 | 10/2014 | Newville |
| 9,004,430 B2 | 4/2015 | Conner |
| 9,121,543 B2 | 9/2015 | Dittmer et al. |
| 9,265,346 B1 | 2/2016 | Forney |
| 9,625,091 B1 | 4/2017 | Massey |
| 9,876,984 B2 | 1/2018 | Massey |
| 10,139,045 B1 | 11/2018 | Keuter |
| 10,257,460 B2 | 4/2019 | Massey |
| 10,277,860 B2 | 4/2019 | Massey |
| 10,281,080 B1 | 5/2019 | Massey |
| 10,738,941 B2 | 8/2020 | Newville |
| 10,830,580 B2 | 11/2020 | Hodowany |
| 10,859,201 B2 | 12/2020 | Newville |
| 10,935,180 B1 | 3/2021 | Massey |
| 11,033,107 B2 | 6/2021 | Warren |
| 11,178,354 B2 | 11/2021 | Massey |
| 2002/0033436 A1 * | 3/2002 | Peng ................ F16M 11/10 248/284.1 |
| 2002/0043978 A1 | 4/2002 | McDonald |
| 2002/0100851 A1 | 8/2002 | Abramowsky et al. |
| 2002/0179791 A1 | 12/2002 | Kwon |
| 2004/0084587 A1 | 5/2004 | Oddsen |
| 2005/0010911 A1 | 1/2005 | Kim et al. |
| 2005/0152102 A1 | 7/2005 | Shin |
| 2005/0204645 A1 | 9/2005 | Bachinski et al. |
| 2005/0236543 A1 | 10/2005 | O'Neil |
| 2006/0070210 A1 | 4/2006 | Amdahl et al. |
| 2006/0077622 A1 | 4/2006 | Keely et al. |
| 2006/0102819 A1 | 5/2006 | Li |
| 2007/0007412 A1 * | 1/2007 | Wang ................ F16M 13/02 248/284.1 |
| 2007/0023599 A1 | 2/2007 | Fedewa |
| 2007/0030405 A1 | 2/2007 | Childrey et al. |
| 2007/0040084 A1 | 2/2007 | Sturman et al. |
| 2007/0221807 A1 | 9/2007 | Park |
| 2007/0252056 A1 | 11/2007 | Novin |
| 2008/0078906 A1 | 4/2008 | Hung |
| 2008/0237424 A1 | 10/2008 | Clary |
| 2009/0034178 A1 | 2/2009 | Le |
| 2009/0050757 A1 * | 2/2009 | Oh ................ F16M 11/10 248/205.1 |
| 2009/0050763 A1 | 2/2009 | Dittmer |
| 2009/0108158 A1 | 4/2009 | Kim et al. |
| 2009/0206221 A1 | 8/2009 | Timm et al. |
| 2009/0212669 A1 | 8/2009 | Robert-Reitman et al. |
| 2010/0006725 A1 | 1/2010 | Kim et al. |
| 2010/0091438 A1 | 4/2010 | Dittmer |
| 2010/0149736 A1 | 6/2010 | Dittmer et al. |
| 2010/0155558 A1 | 6/2010 | Zhang et al. |
| 2010/0171013 A1 | 7/2010 | Anderson et al. |
| 2011/0043978 A1 | 2/2011 | Bremmon et al. |
| 2011/0234926 A1 | 9/2011 | Smith |
| 2012/0032062 A1 | 2/2012 | Newville |
| 2012/0033371 A1 | 2/2012 | Pankros et al. |
| 2012/0061543 A1 | 3/2012 | Juan |
| 2012/0167486 A1 | 7/2012 | Lee |
| 2013/0176667 A1 | 7/2013 | Kulkarni |
| 2013/0187019 A1 | 7/2013 | Dittmer et al. |
| 2014/0211100 A1 | 7/2014 | Massey |
| 2015/0277214 A1 | 10/2015 | Schuh |
| 2018/0054156 A1 | 2/2018 | Lokey |
| 2018/0131895 A1 | 5/2018 | Massey |
| 2019/0072231 A1 | 3/2019 | Newville et al. |
| 2019/0309895 A1 | 10/2019 | Newville |
| 2019/0335135 A1 | 10/2019 | Massey |
| 2020/0049304 A1 | 2/2020 | Hung |
| 2020/0355319 A1 | 11/2020 | Newville et al. |

\* cited by examiner

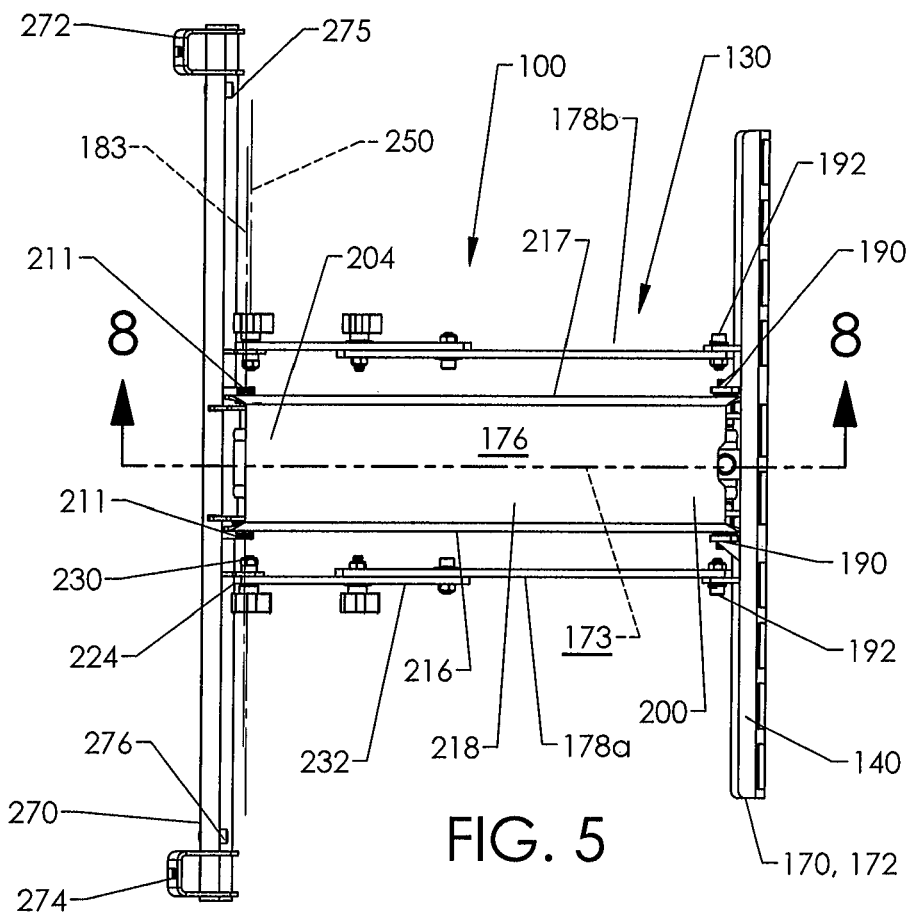
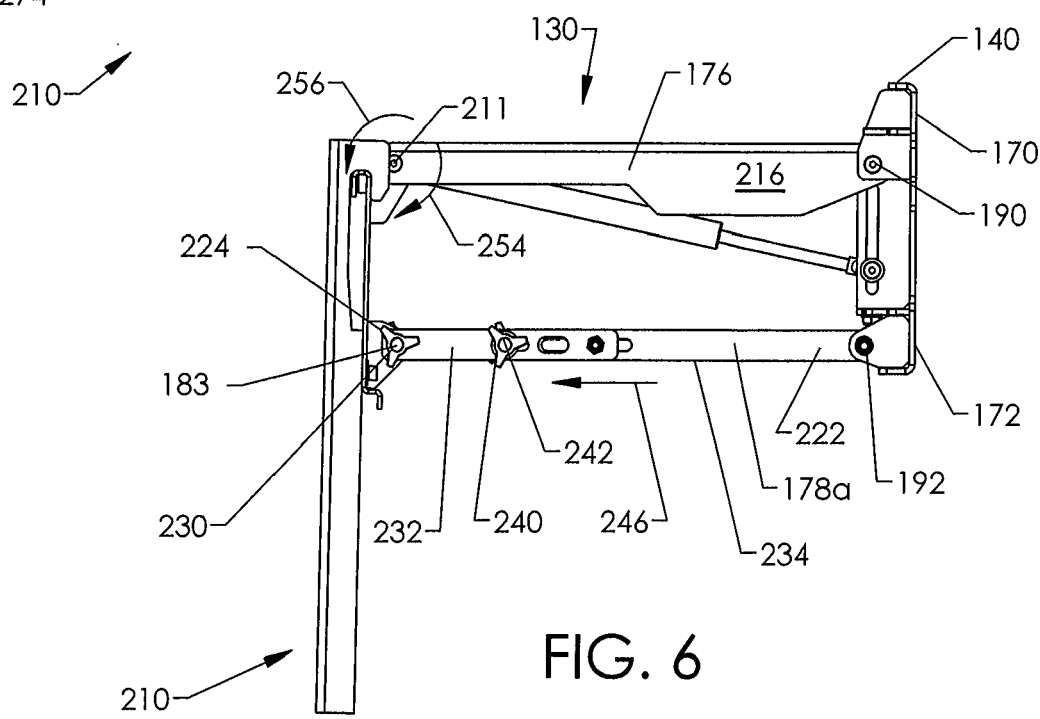

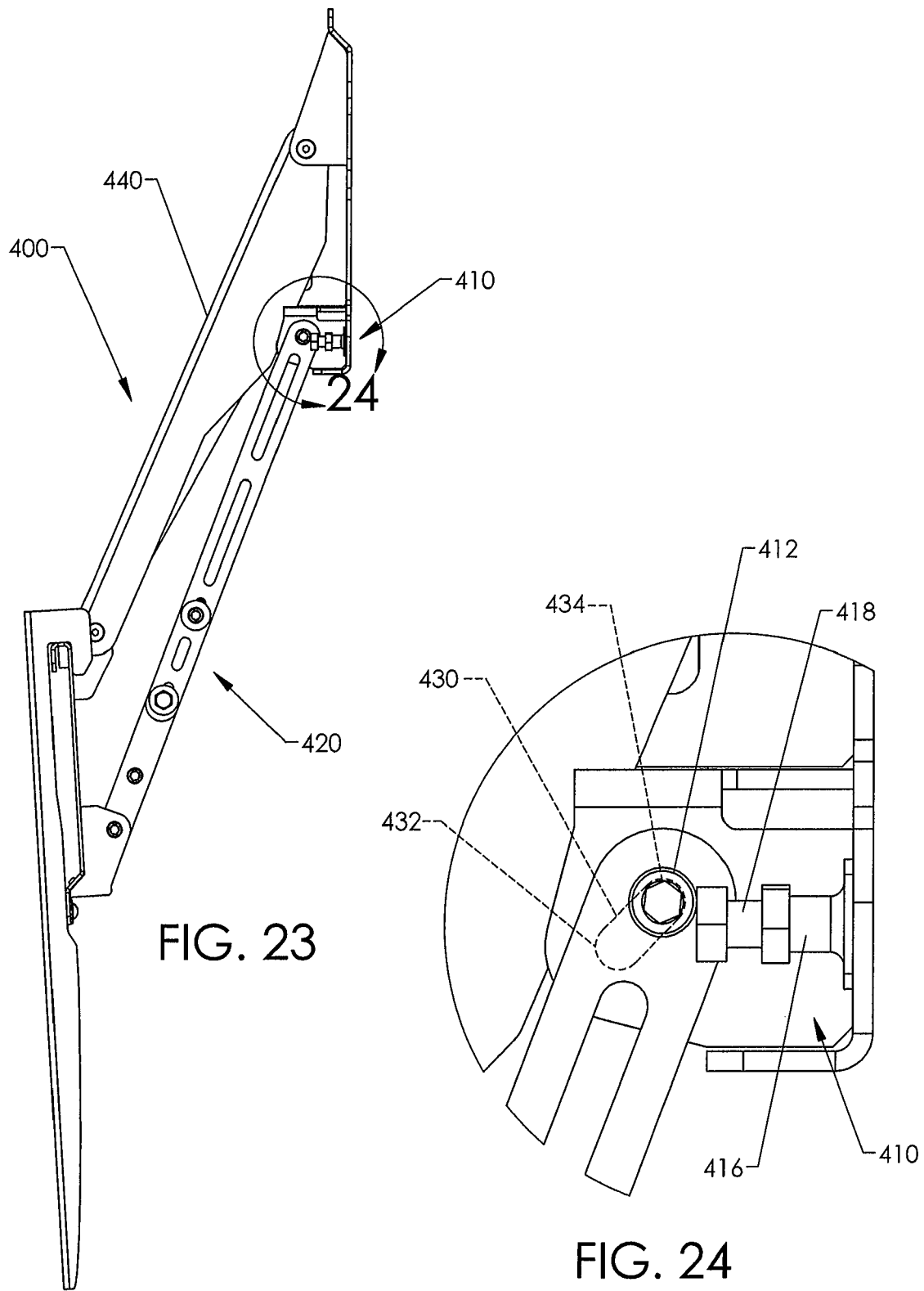

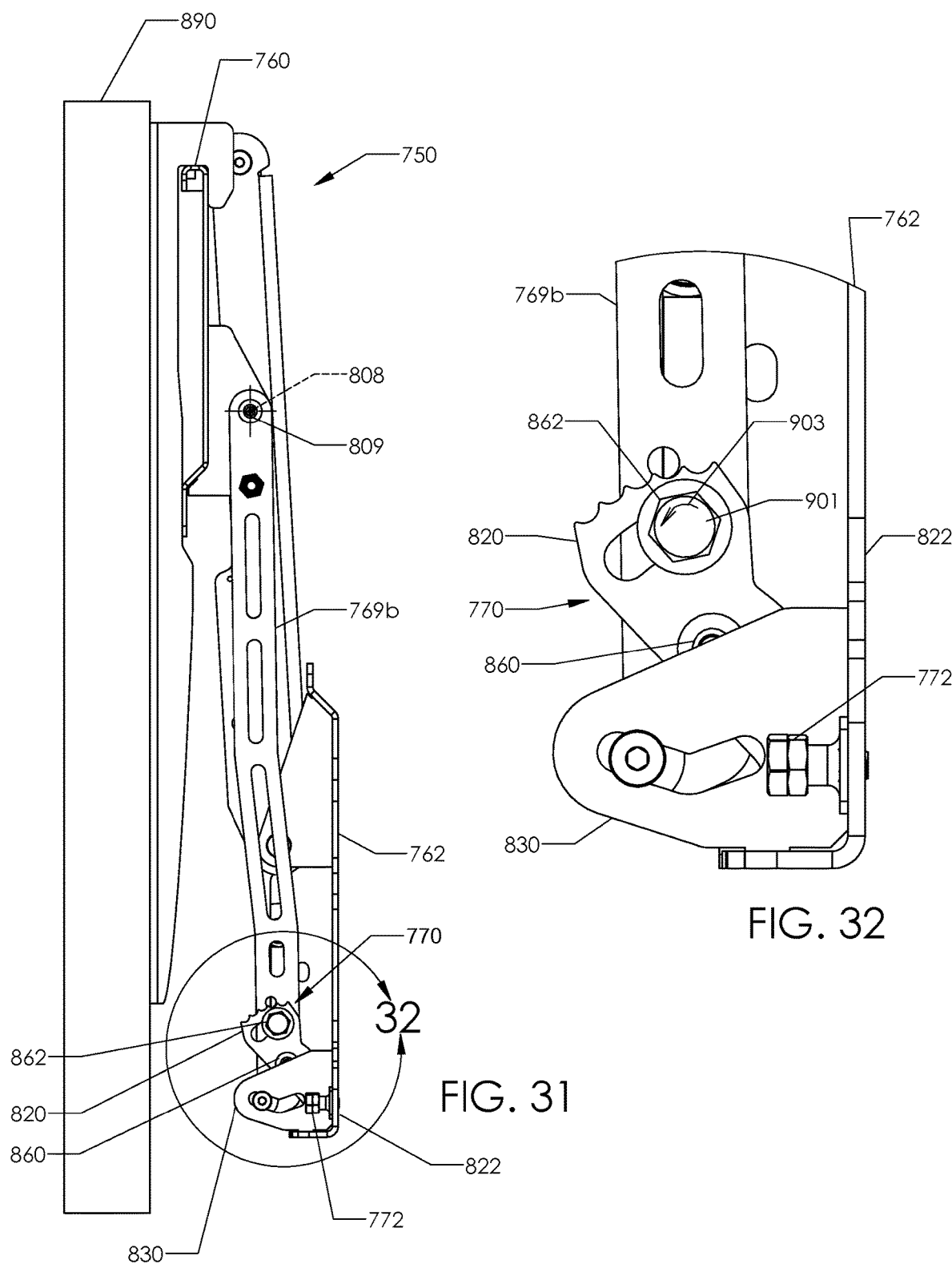

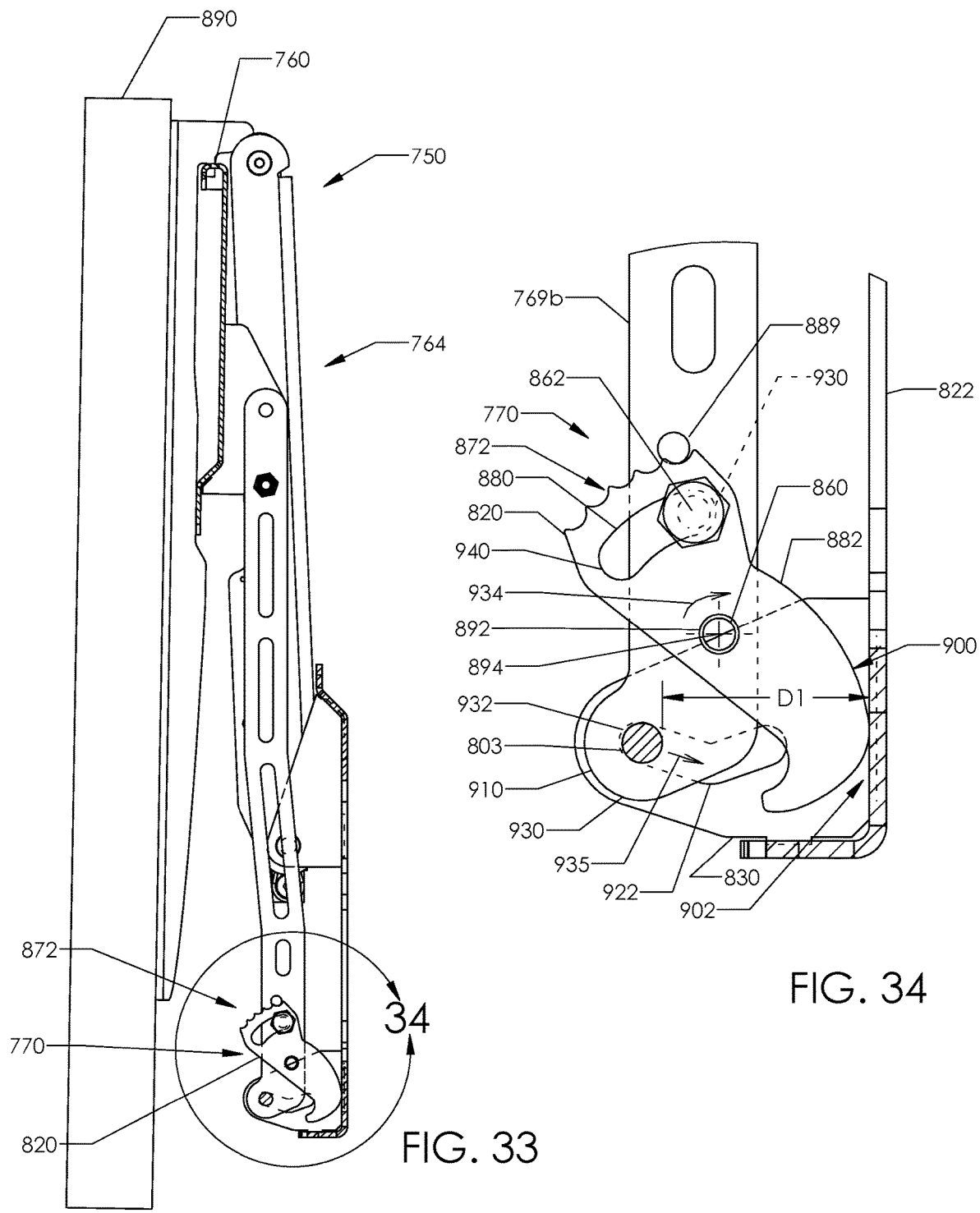

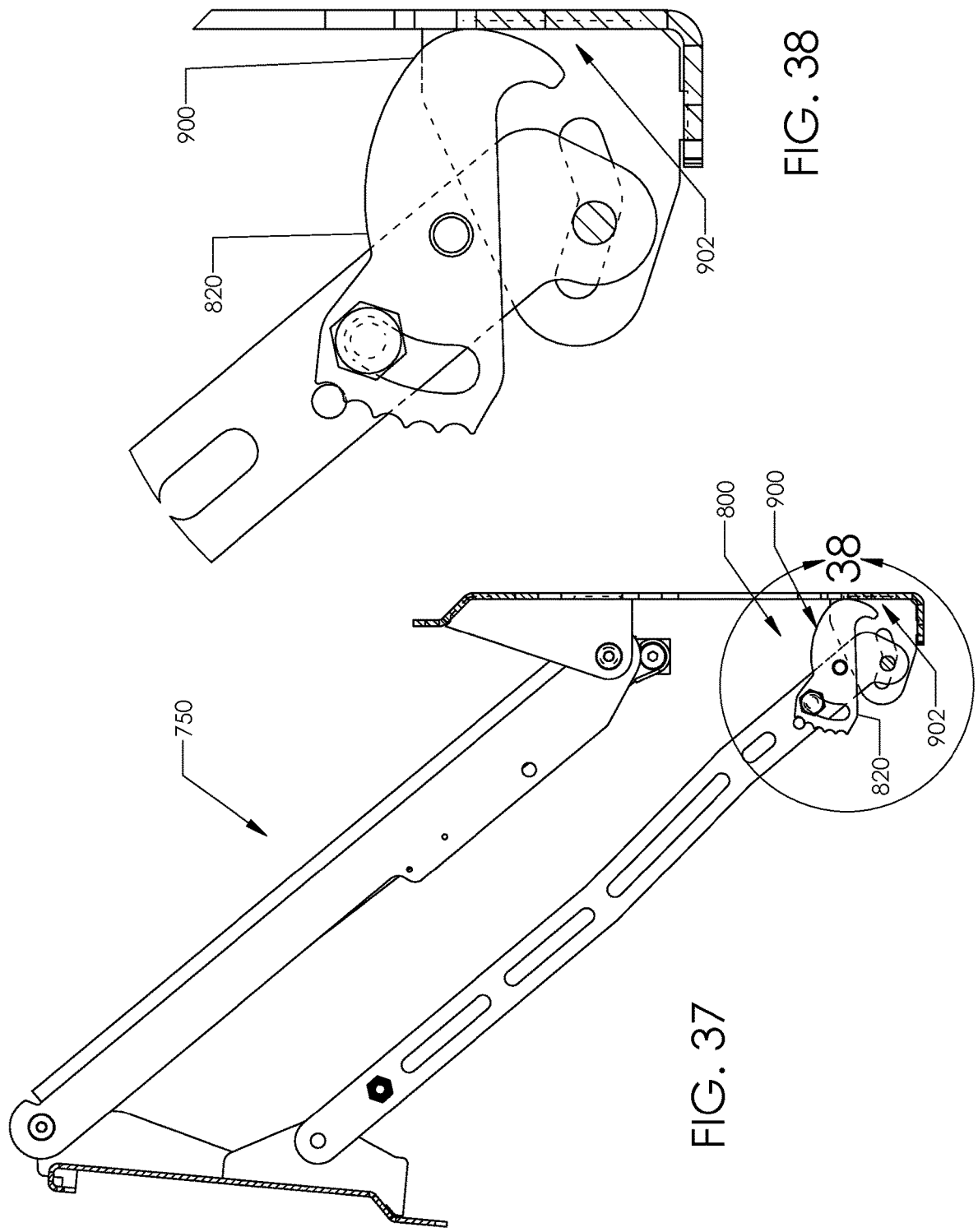

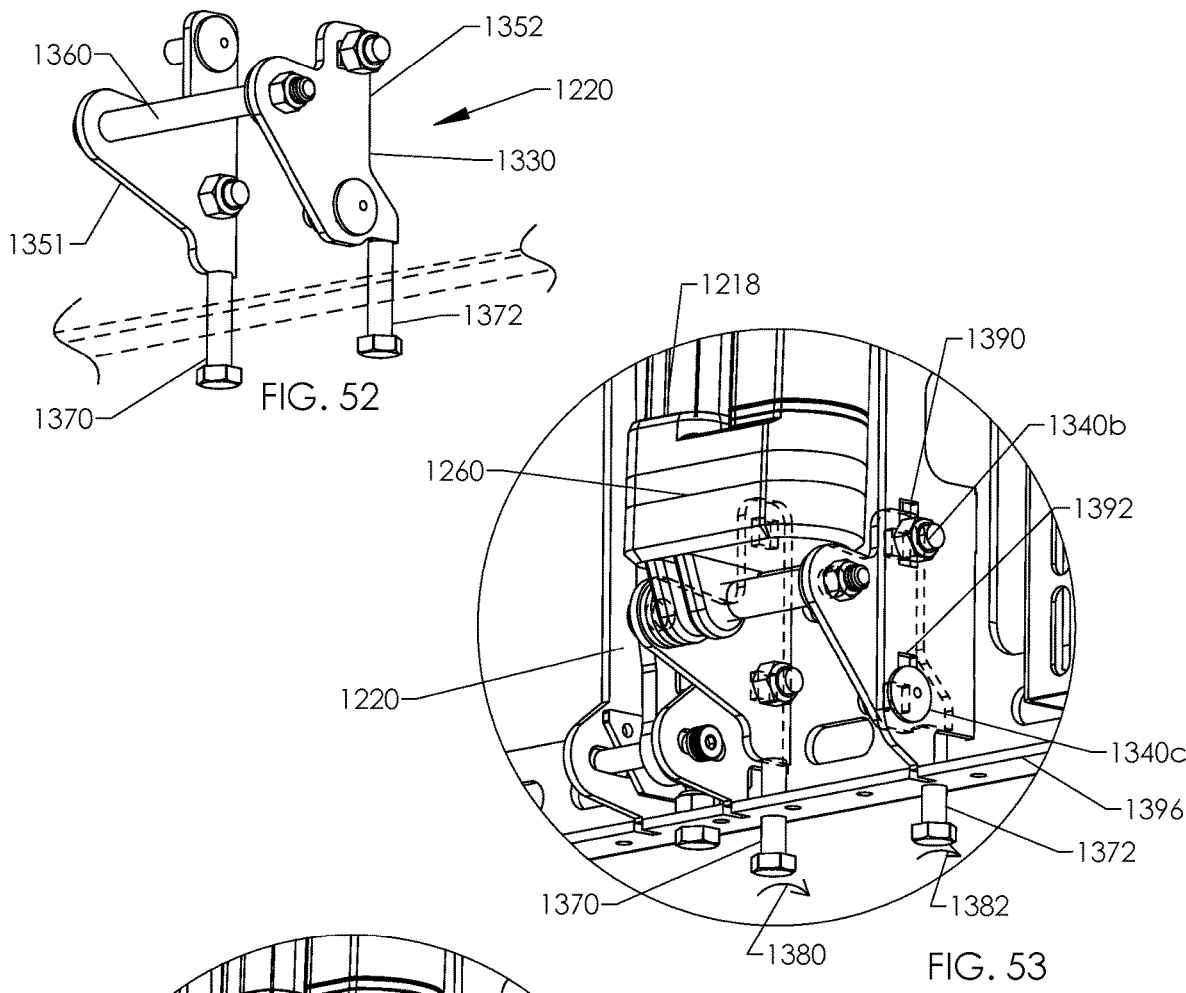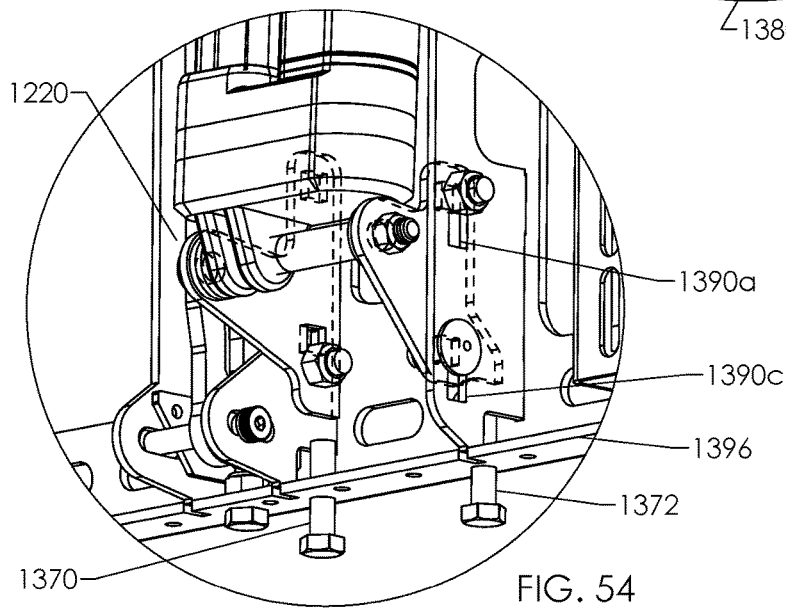

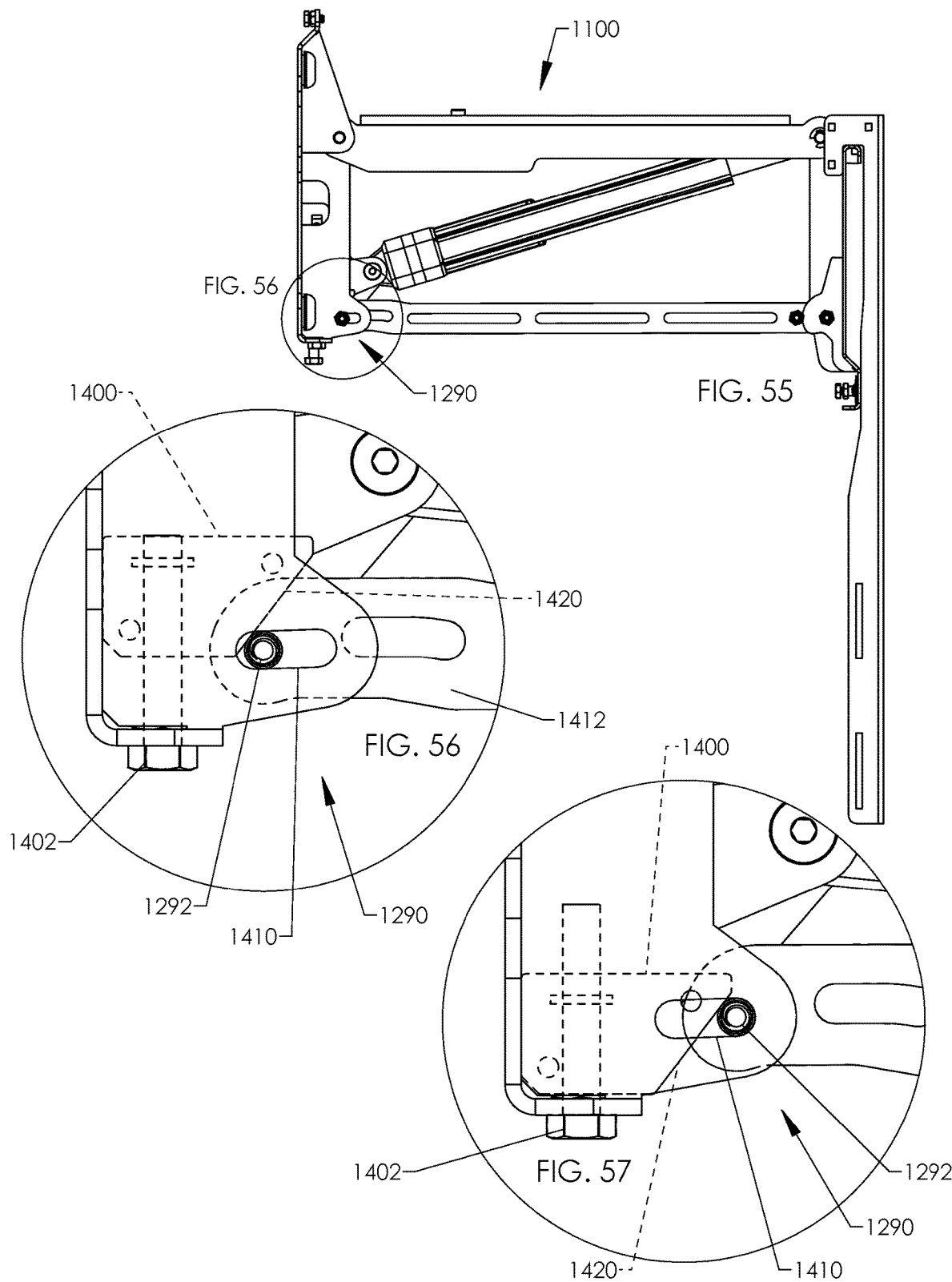

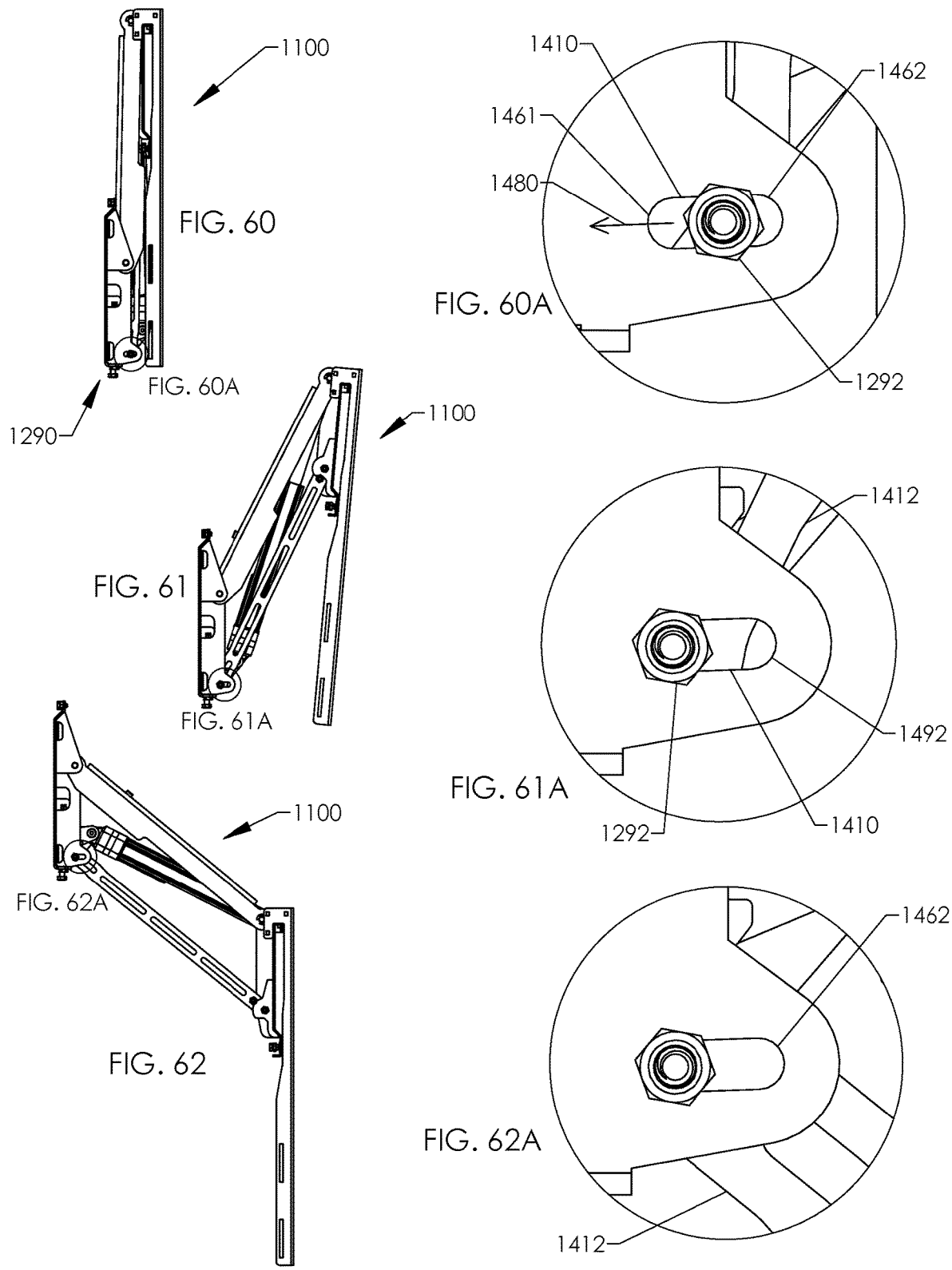

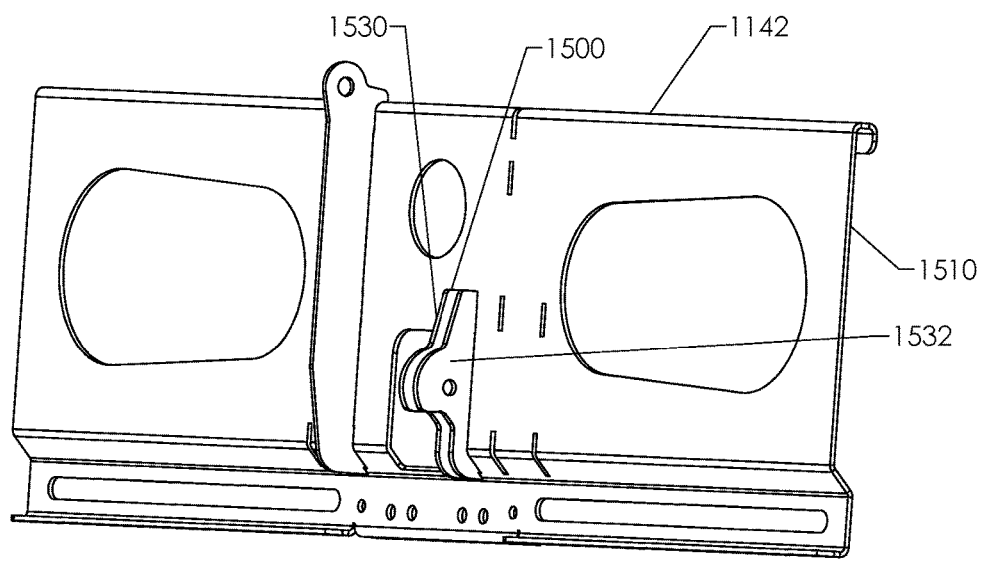
FIG. 63
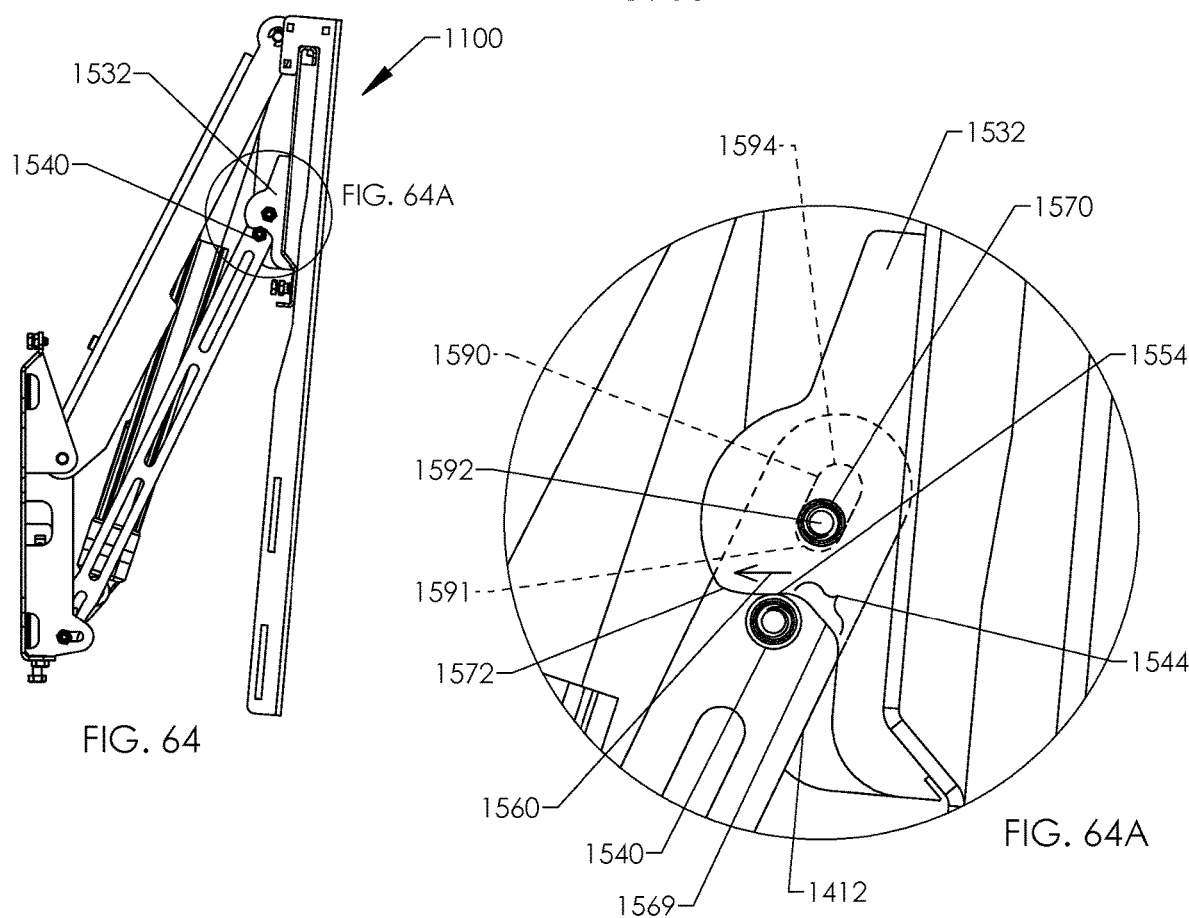
FIG. 64
FIG. 64A

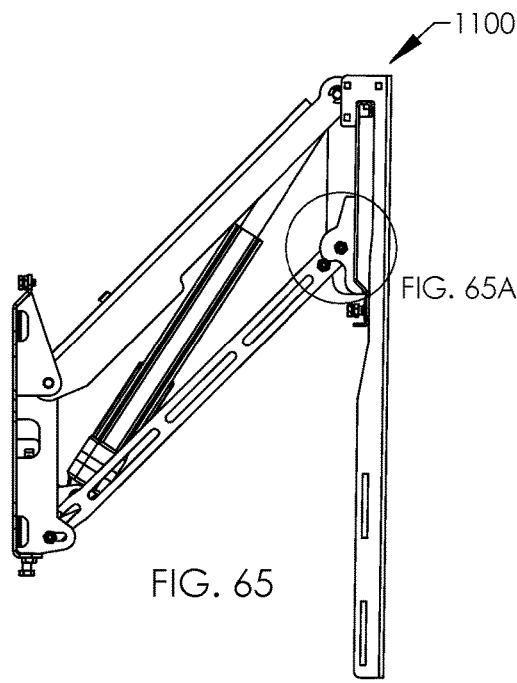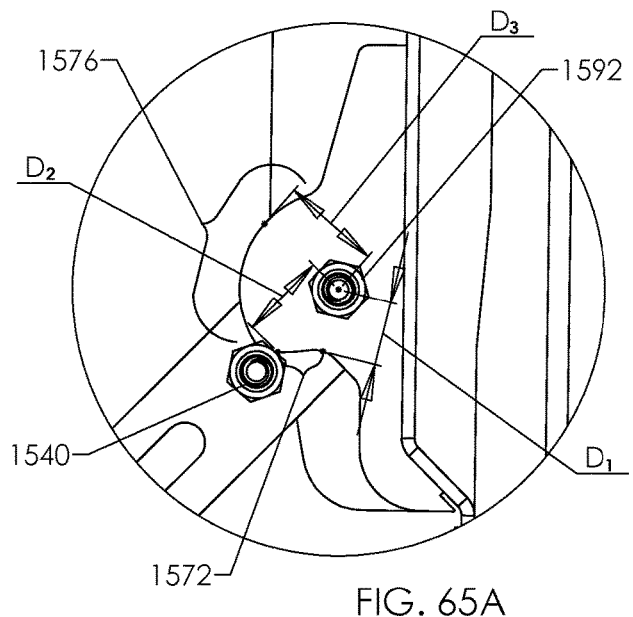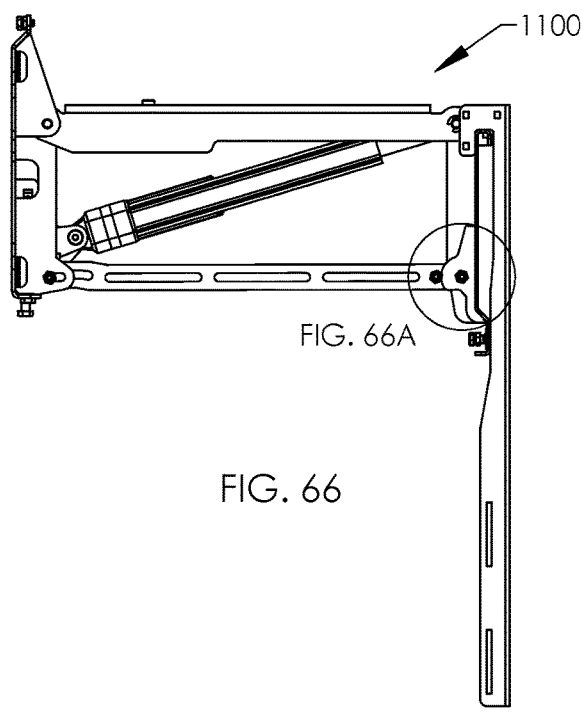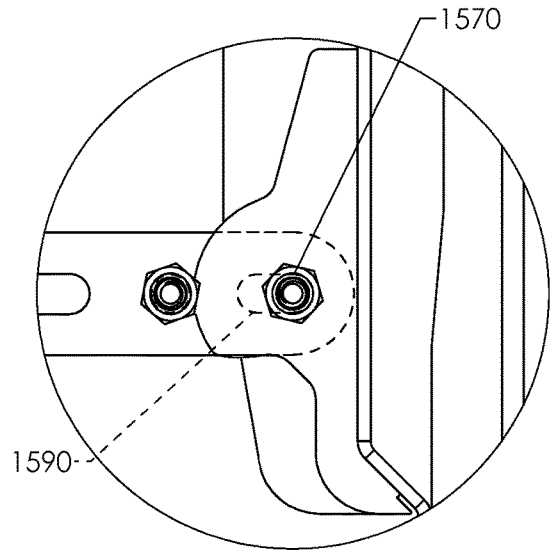
FIG. 65
FIG. 65A
FIG. 66
FIG. 66A

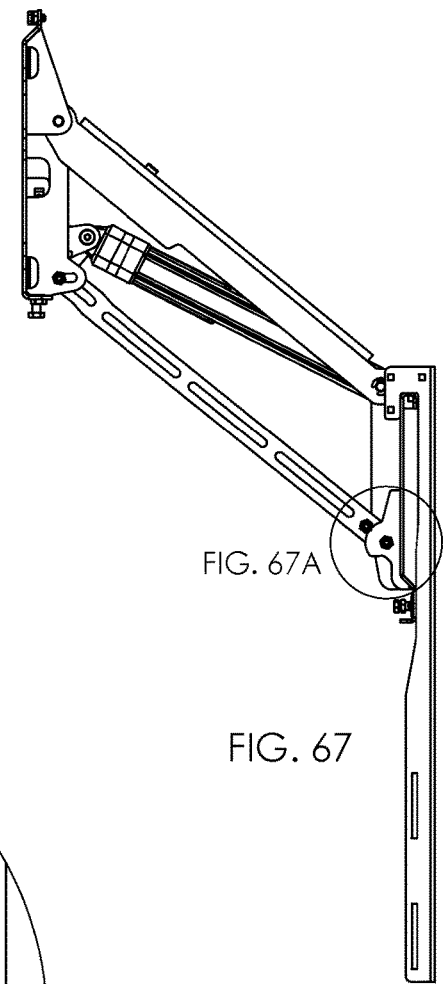
FIG. 67A
FIG. 67
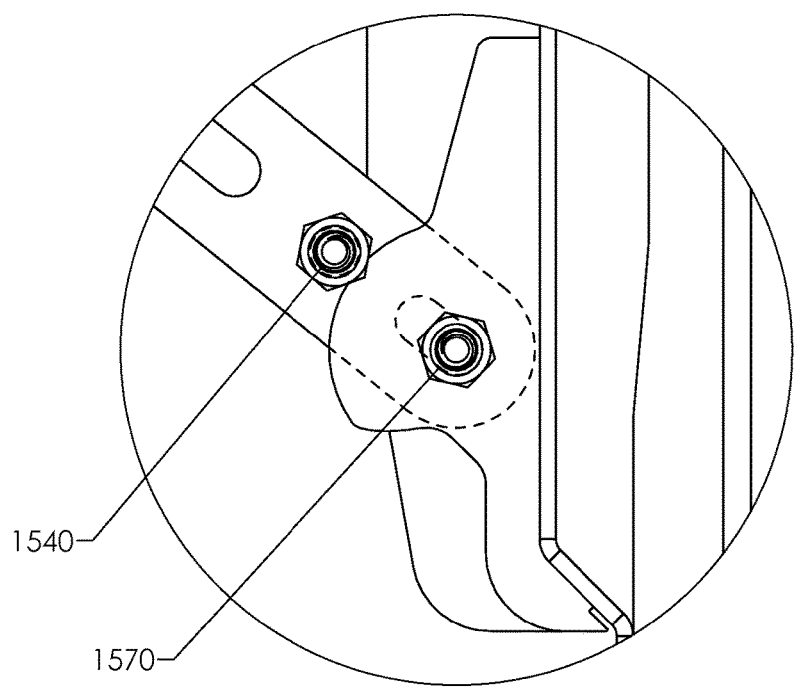
FIG. 67A

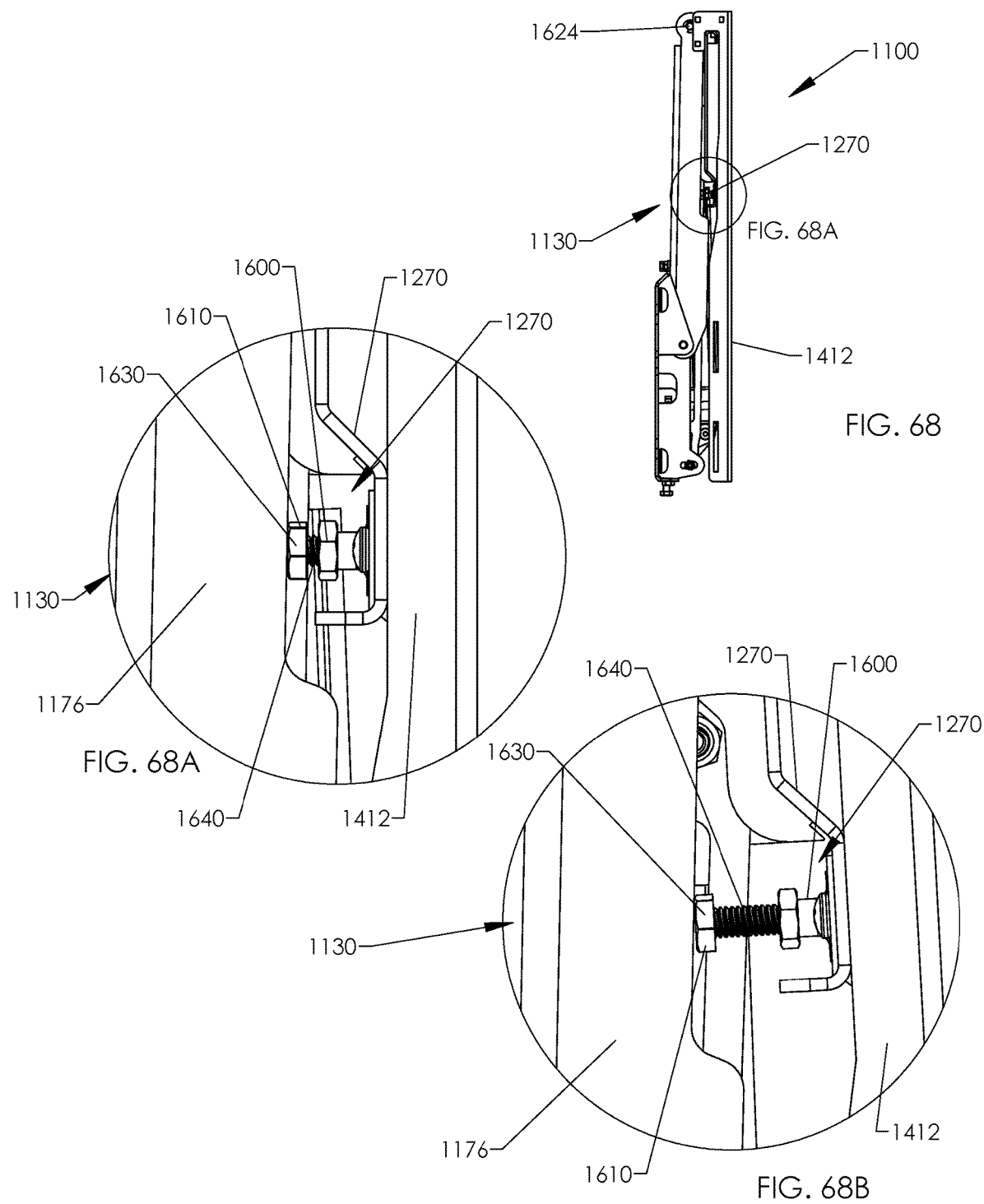

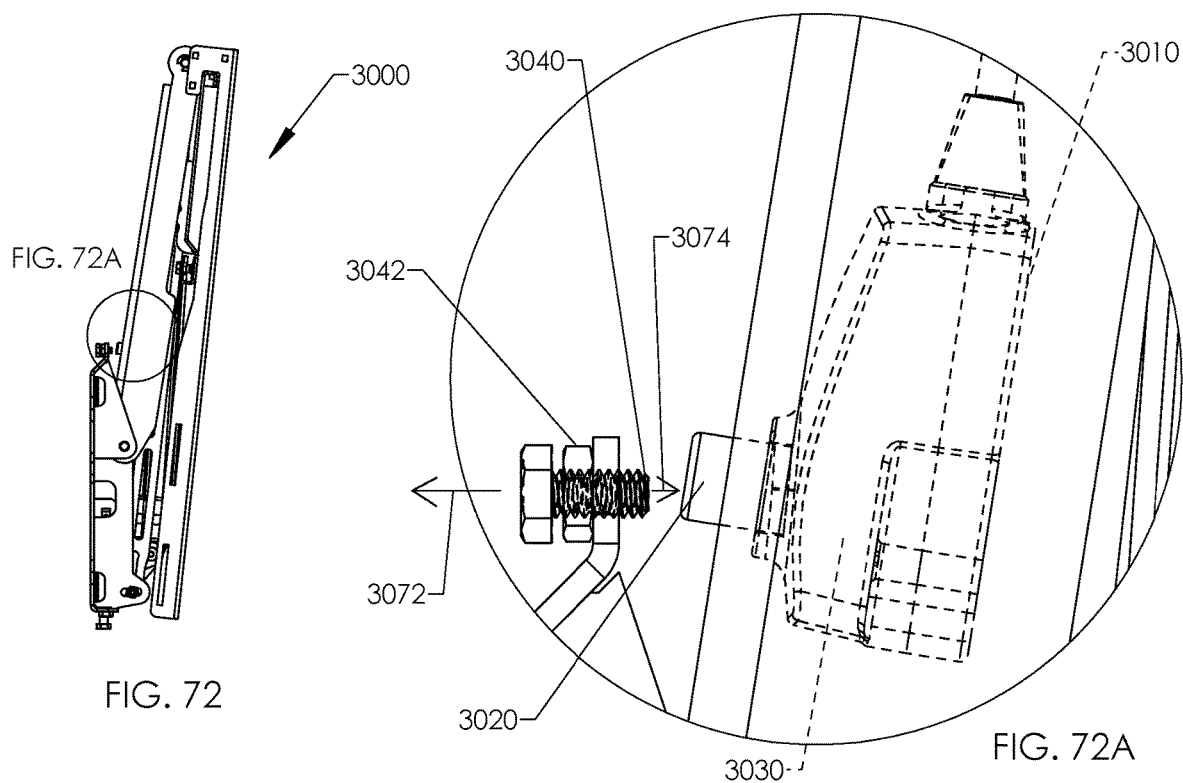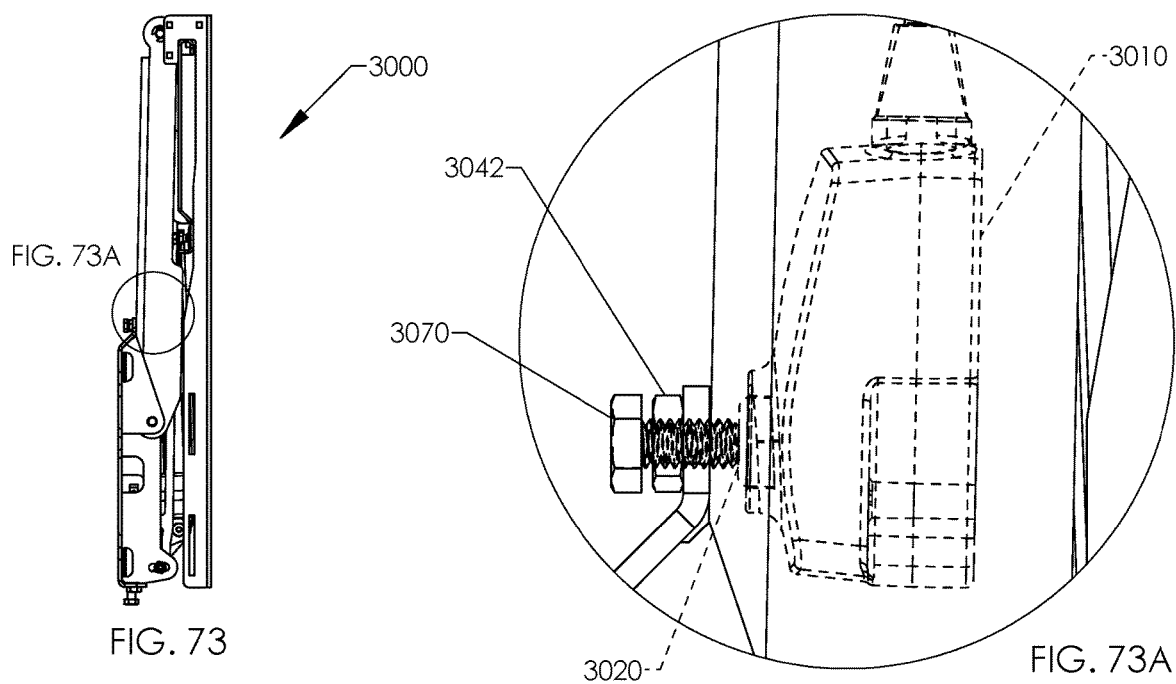

ADJUSTABLE MOUNTING SYSTEMS FOR TELEVISIONS

CROSS-REFERENCE TO RELATED APPLICATIONS

This application is a continuation of U.S. patent application Ser. No. 16/370,854, filed Mar. 29, 2019, which is a continuation of U.S. patent application Ser. No. 15/489,596, filed Apr. 17, 2017 (now U.S. Pat. No. 10,281,080), which is a continuation-in-part of U.S. patent application Ser. No. 14/563,842, filed Dec. 8, 2014 (now U.S. Pat. No. 9,625,091), which claims the benefit under 35 U.S.C. § 119(e) of U.S. Provisional Patent Application No. 61/913,195, filed Dec. 6, 2013. U.S. patent application Ser. No. 15/489,596 is also a continuation-in-part of U.S. patent application Ser. No. 14/229,780, filed Mar. 28, 2014 (now U.S. Pat. No. 9,876,984), which is a continuation of U.S. patent application Ser. No. 13/118,297, filed May 27, 2011 9 (now U.S. Pat. No. 8,724,037), which claims the benefit under 35 U.S.C. § 119(e) of U.S. Provisional Patent Application No. 61/396,850, filed Jun. 4, 2010. All of the above-referenced applications are incorporated herein by reference in their entireties.

TECHNICAL FIELD

The present invention relates generally to mounting systems. More specifically, the present disclosure generally relates to adjustable mounting systems for mounting objects to structures.

BACKGROUND

Televisions are often mounted directly to walls using wall mounts. Tilting wall mounts and full motion wall mounts are two types of mounts that allow movement of televisions. Tilting wall mounts often allow tilting only about a horizontal axis of rotation. Unfortunately, if tilting wall mounts are installed at relatively high locations, there may be limited viewing because ideal viewing often requires that the center of the screen be generally level with a viewer's eyes. Full motion wall mounts often allow the television to be moved horizontally away from walls, swiveling of the television, and/or tilting of the television. Because a viewer looks up at the television, it may result in uncomfortable viewing. If either a tilting wall mount or a full motion wall mount is installed at a high location (e.g., above a fireplace, a piano, furniture, etc.), the mounted television is often much higher than a sitting viewer's eyes and, thus, may not be suitable for comfortable viewing.

SUMMARY

At least some embodiments are directed to mounting apparatuses capable of holding an object at a relatively high location to keep the object out of the way when stowed. The object can be conveniently moved to different locations. In certain embodiments, a mounting apparatus can hold an electronic display in the form of a television and can include components for adjusting the position of the television to provide desired viewing of the television. The mounting apparatus can automatically move the television to a desired viewing position and can include, without limitation, one or more components for allowing a user to smoothly raise or lower the television. Such components can include one or more springs, pistons (e.g., gas pistons), actuators, tilt adjustment mechanisms, or combinations thereof. Tilt adjustment mechanisms can move the television to a desired angle of tilt for a particular viewing height. As the television is raised and lowered, it can be gradually tilted for optimal viewing.

The mounting apparatus can be installed above, for example, a fireplace, a piano, furniture, or at an aesthetically pleasing location. A user can manually or automatically lower the television such that a viewer's eyes are at an appropriate position relative to the television. For example, the viewer's eyes can be generally level with the screen (e.g., level with the center of the screen). The television can be panned, tilted (e.g., rotated about a generally horizontal axis), and/or swiveled (e.g., rotated about a generally vertical axis) to accommodate different viewing positions. Pivots, swivels (e.g., swivel brackets), joints, or the like can be used to provide the desired motion. The television can range in weight from about 20 pounds to about 110 pounds, for example.

A mounting system, in some embodiments, comprises a mounting apparatus including a bracket configured to hold an object, a fixed support bracket coupleable to a vertical support structure, and a linkage assembly. The linkage assembly has a low-profile stowed configuration in which the object is held close to the support structure. The linkage assembly is movable to reposition the object at different heights. One or more tilt setting mechanisms can be used to change the orientation of links to adjust the tilt of the object. If the object is an electronic display held at a relatively high position, tilt setting mechanisms can be used to angle the electronic display downwardly. For example, the electronic display can be angled such that a viewer's line of sight is substantially perpendicular to a screen of the electronic display. As the electronic display is lowered, the screen can be gradually tilted to keep the screen generally perpendicular to the viewer's line of sight.

A biasing mechanism can facilitate movement of the object and, in some embodiments, can provide a fixed or variable counterbalance force that may be different at the beginning, middle, and/or end of travel. In one embodiment, the biasing mechanism can include one or more springs, counterbalance biasing mechanisms (e.g., a piston, a gas spring, etc.), and/or other force generating devices. The biasing mechanism can provide an initial counterbalance force when compressed and another counterbalance force when it extends. For example, the biasing mechanism can include a spring that can be compressed as the mounting apparatus initially moves. As the spring is compressed, the counterbalance biasing mechanism can provide substantially no counterbalance force. After compressing the spring, the counterbalance biasing mechanism can provide a counterbalance force for a majority of the travel of the television. The counterbalance force provided by the counterbalance biasing mechanism can be greater than the force provided by the biasing mechanism due to compression of the spring. The television can be moved by applying a gradually increasing force for smooth movement.

In some embodiments, a mounting system includes a multi-bar linkage configured to store an object at a raised, low profile position close to the wall (e.g., within 3 inches, 4 inches, 5 inches of the wall). The mounted object can be moved away from the raised, low profile position along a path (e.g., an arcuate path, a partially circular path, a curved path, a partially elliptical path, or the like). The multi-bar linkage can include a main linkage that connects a support bracket to a display bracket. The mounting system can include a tilt adjustment mechanism that adjusts the position of at least one adjustable link relative to a main linkage and/or the support bracket to adjust the tilt of the display bracket.

The mounting system can include a counterbalance assembly that can be adjusted to provide smooth controlled movement of the mounting system. The counterbalance assembly can include, without limitation, a force adjustment mechanism operable to increase and decrease a counterbalance force. In one embodiment, the force adjustment mechanism can provide a relatively low counterbalance force to allow initial movement of the television. The counterbalance force can be increased (e.g., gradually increased) as the television is further moved toward a desired position. In some embodiments, the counterbalance assembly can provide a relatively low counterbalance force to allow initial upward or downward movement of the television when the television is in the lowered or raised position, respectively.

In further embodiments, a television mounting apparatus has a raised configuration and a lowered configuration and comprises a display bracket, a fixed support bracket, and a linkage assembly. The fixed support bracket is configured to be coupled to a vertical support structure. The linkage assembly is rotatably coupled to the display bracket and rotatably coupled to the fixed support bracket such that a television carried by the display bracket is movable from a raised position to a lowered position by moving the television mounting apparatus from the raised configuration to the lowered configuration. A tilt adjustment mechanism can be used to set the configuration of the television mounting apparatus. The tilt adjustment mechanism, in some embodiments, can be used to increase or decrease tilt of one or more links of the linkage assembly relative to the fixed support bracket to adjust orientation (e.g., tilt) of the television.

In yet further embodiments, a television mounting apparatus for holding a television includes a display bracket, a fixed support bracket configured to couple to a wall, and an assembly rotatably coupled to the fixed support bracket and carrying the display bracket. The assembly is movable relative to the fixed support bracket to move the display bracket between different positions (e.g., a raised position, an intermediate position, a lowered position, etc.).

Some embodiments are a television mounting apparatus that includes a display bracket, a fixed support bracket, and an assembly rotatably coupled to the display bracket and movable relative to the fixed support bracket to move (e.g., raise, lower, pan, etc.) the display bracket. In one embodiment, the television mounting apparatus can include a counterbalance assembly with a counterbalance biasing mechanism configured to provide a biasing force and a force adjustment mechanism operable to increase and decrease the biasing force provided by the counterbalance biasing mechanism.

In some embodiments, a mounting apparatus includes a cam mechanism with different states for controllably tilting a display bracket. For example, the cam mechanism can have a camming state for causing a display bracket to move (e.g., tilt rearward or forward) when the mounting apparatus is reconfigured. In a non-camming or neutral state, the cam mechanism allows the mounting apparatus to move without changing the orientation at the display bracket. This allows the display bracket to translate with either substantially no rotation or with controlled rotation. In the camming state, the cam mechanism can cause the display bracket to rotate forward. Once the display bracket is at the desired orientation, the display bracket can be further lowered while the cam mechanism operates to keep the display bracket at a viewing orientation. This allows the display bracket to remain in substantially the same vertical orientation. When the mounting apparatus is raised back to the raised position, the passive cam mechanism can operate to allow the display bracket to return to its stowed position. The configuration of the passive cam mechanism can be selected to provide the desired amount of tilting of the display bracket for a specific range of travel.

In yet further embodiments, a television mounting apparatus includes a support bracket, a display bracket configured to hold a television, a linkage assembly extending between the support bracket and the display bracket. The linkage assembly can include a link. The television mounting apparatus can further include a support pivot rotatably coupling the linkage to the support bracket, a display pivot rotatably coupling the linkage to display bracket, and a passive cam mechanism. The passive cam mechanism includes a cam and a cam follower that travels along the cam such that (1) the display bracket tilts forward as the linkage assembly moves away from a raised position, (2) the display bracket tilts rearwardly to a viewing orientation as the linkage assembly is lowered, and (3) the display bracket remains substantially at the viewing orientation as the linkage assembly is moved toward a fully lowered position. In some installations, the display bracket remains at a vertical orientation (±5 degrees) as the linkage assembly is moved toward a fully lowered position. In one embodiment, the cam follower can be a passive cam follower that travels along a first section of the cam as the display bracket tilts forward, a second section of the cam as the display bracket remains tilted forward, a third section of the cam as the bracket tilts rearwardly toward the viewing orientation, and a fourth section of the cam as the display bracket remains substantially at the viewing orientation. Additional sections of the cam can provide other motion.

BRIEF DESCRIPTION OF THE DRAWINGS

Non-limiting and non-exhausting embodiments are discussed with reference to the following drawings. The same reference numerals refer to like parts or acts throughout the various views, unless specified otherwise.

FIG. 5 is a top plan view of the mounting system of FIG. 4.

FIG. 6 is a side elevational view of the mounting system of FIG. 4.

FIG. 23 is a side elevational view of the mounting system of FIG. 18 holding a television at a lowered position.

FIG. 24 is a detailed view of the positioner.

FIG. 31 is a side view of the mounting system of FIG. 29.

FIG. 32 is a detailed view of a tilt adjustment mechanism of FIG. 31.

FIG. 33 is a cross-sectional view of the mounting system taken along a line 33-33 of FIG. 30.

FIG. 34 is a detailed view of the tilt adjustment mechanism of FIG. 33.

FIG. 37 is a side elevational view of the mounting system in a partially raised configuration.

FIG. 38 is a detailed view of the tilt adjustment mechanism of FIG. 37.

FIG. 52 is an isometric view of a carriage and a carriage positioner in accordance with one embodiment.

FIGS. 53 and 54 show the carriage in different positions.

FIG. 55 is a side view of a mounting system at an intermediate position in accordance with one embodiment.

FIGS. 56 and 57 are detailed views of a bottom tilt mechanism in different configurations in accordance with one embodiment.

FIGS. 60 to 62A illustrate a mounting system in different configurations in accordance with one embodiment.

FIG. 63 is an isometric view of a display bracket in accordance with one embodiment.

FIG. 64 is a side view of a mounting system moved from a stowed configuration, and FIG. 64A is a detailed view of a cam mechanism in accordance with one embodiment of the technology.

FIG. 65 is a side view of a mounting system being lowered, and FIG. 65A is a detailed view the cam mechanism in accordance with an embodiment of the technology.

FIG. 66 is a side view of the mounting system at a horizontal configuration, and FIG. 66A is a detailed view of the cam mechanism in accordance with one embodiment of the technology.

FIG. 67 is a side view of the mounting system at a lowered configuration, and FIG. 67A is a detailed view of the cam mechanism in accordance with one embodiment of the technology.

FIG. 68 is a side view of a mounting system in a raised position in an accordance with one embodiment.

FIGS. 68A and 68B are detailed views of a top or stowed tilt mechanism in different configurations.

FIG. 72 is a side view of a mounting system in accordance with another embodiment.

FIG. 72A is a detailed view of the mounting system of FIG. 72.

FIG. 73 is a side view of a mounting system in a fully raised configuration.

FIG. 73A is a detailed view of the mounting system of FIG. 72.

DETAILED DESCRIPTION

Figure 1:
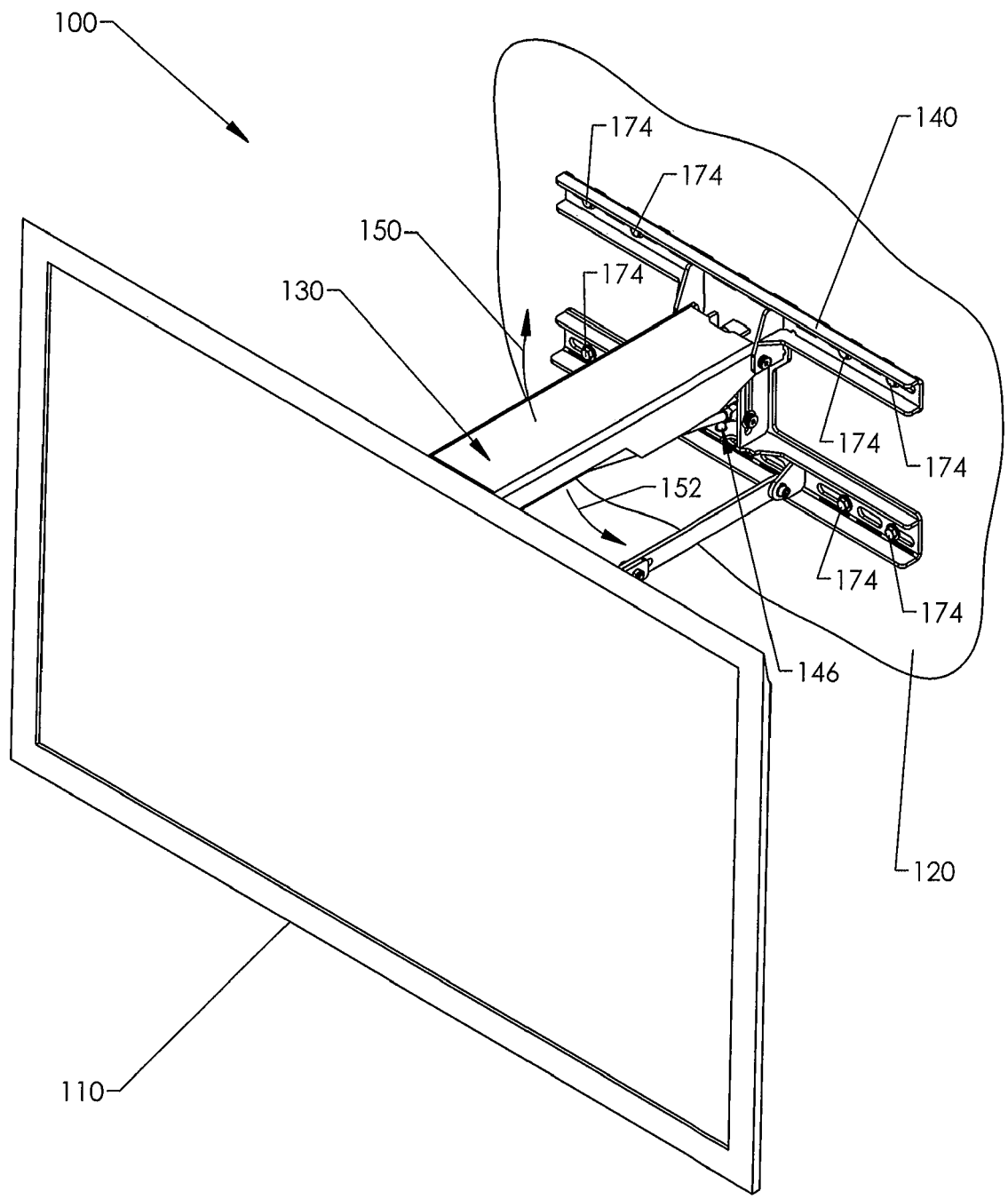
FIG. 1 is an isometric view of a television held by a mounting system connected to a wall.

FIG. 1 shows a mounting system in the form of a television mounting apparatus or wall mount 100 ("wall mount 100") carrying an electronic display in the form of a flat screen television 110. A collapsible linkage assembly 130 is connected to a support mount or bracket 140 that is mounted to a support structure in the form of a wall 120. The linkage assembly 130 can swing upwardly (indicated by arrow 150) or downwardly (indicated by arrow 152). An adjustment mechanism 146 is operable to adjust a biasing force provided by a biasing mechanism to allow for controlled movement of the television 110. Once the television 110 is at a desired position, the biasing mechanism keeps the television 110 stationary.

Figure 2:
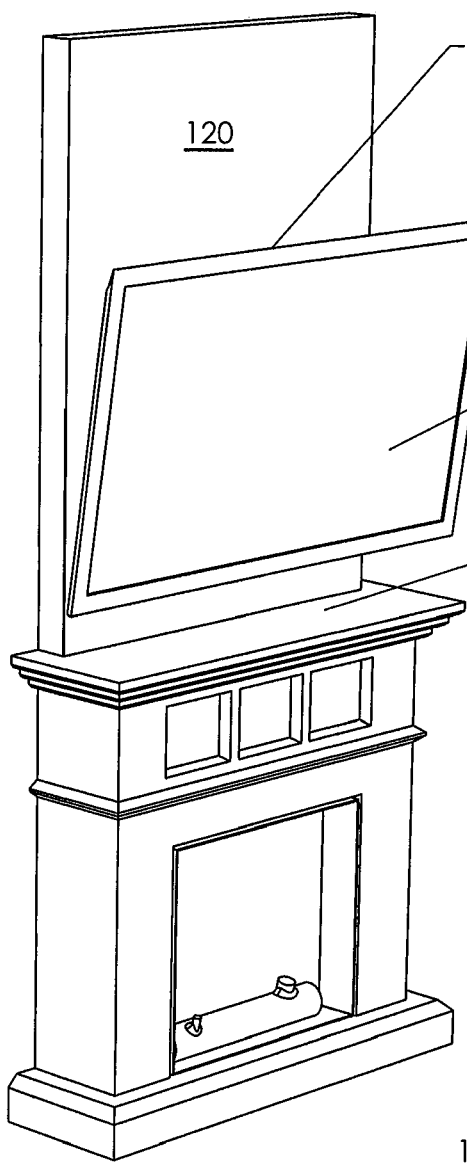
FIG. 2 shows a television installed above a fireplace.

FIG. 2 shows the television 110 in a raised, stowed position and very close to the wall 120. The wall mount 100 is hidden from view of someone in front of the television 110 for an aesthetically pleasing appearance. Advantageously, it may be difficult for small children to reach up and pull down on the television 110. The illustrated stowed television 110 is positioned above a fireplace to avoid occupying usable space and to reduce the likelihood of unwanted inadvertent contact by people moving about the room. If the fireplace includes a hearth, it may be difficult for small children, or other individuals, to inadvertently contact the television 110.

Figure 3:
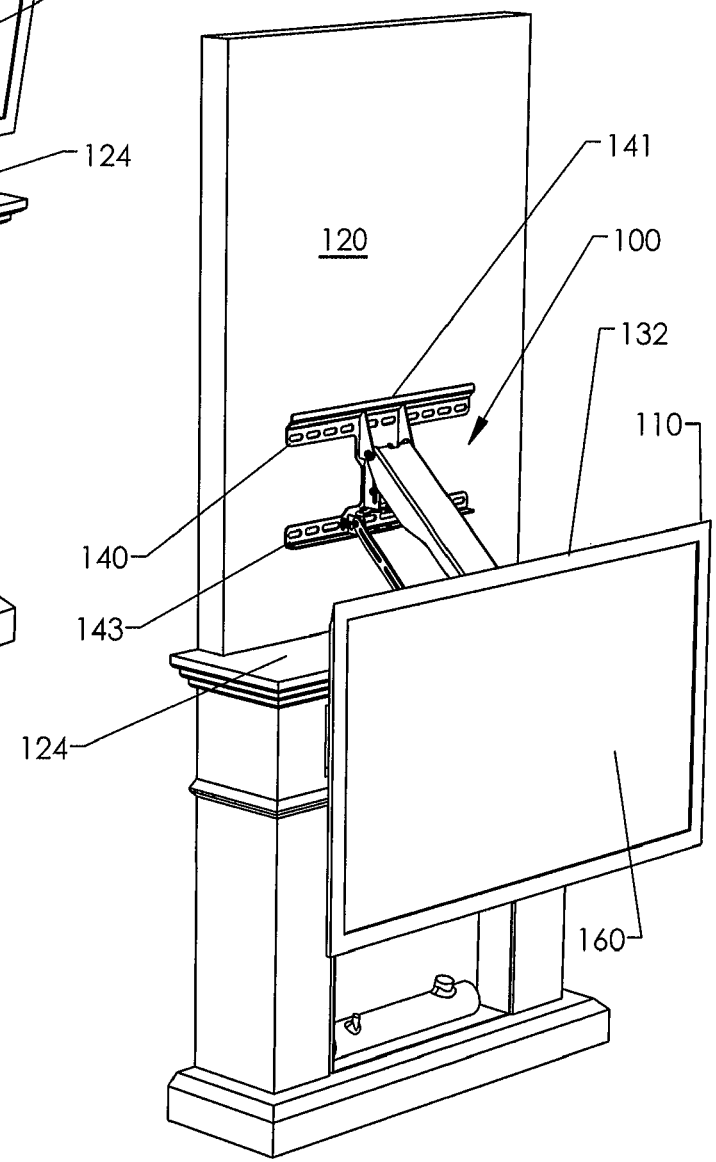
FIG. 3 shows the television in a lowered position in front of the fireplace.

The television 110 can swing downwardly and, if desired, can be positioned in front of the fireplace, as shown in FIG. 3. The lowered television 110 can be positioned very close to the front of the fireplace. A viewer's eyes can be generally level with the center of the screen 160. The lowered television 110 is especially well suited for viewing when someone is positioned near the television 110, for example, to play a game system (e.g., Xbox 360, PlayStation®, PlayStation®2, PlayStation®3, Nintendo game system, or the like) or to provide convenient viewing while sitting, for example, on furniture or on the floor. After viewing, the television 110 can be returned to the stowed position.

Referring again to FIG. 2, a top 132 of the stowed television 110 can be angled forwardly such that the screen 160 is substantially perpendicular to a sitting viewer's line of sight. Alternatively, the television 110 can be flat against the wall 120 (e.g., parallel to the wall 120) to minimize or limit unwanted reflections from the screen 160 that may be directed to someone sitting on furniture in front of the television 110, especially when the television 110 is turned OFF. The wall mount 100 can automatically tilt the television 110 as the television 110 moves vertically. As the television 110 is lowered, it can gradually tilt to keep the screen 160 substantially perpendicular relative to the viewer's line of sight. Once the television 110 is at a desired position, the television 110 can be further tilted using an automatic or manual tilt mechanism, if needed or desired.

In some manually deployable embodiments, a user can conveniently grasp and pull the television 110 away from the wall 120. The television 110 will move forward a significant distance before it starts to move down such that the television 110 can be brought down and in front of a protruding object below the support bracket 140, illustrated in FIGS. 2 and 3 as a fireplace mantel or shelf 124. The top 132 of the television 110 can be lower than a top 141 of the support bracket 140 and, in some embodiments, is positioned lower than a bottom 143 of the support bracket 140. One or more adjustable fixed stops can be used to prevent contact with the mantelshelf 124 or to achieve repeatable positioning, or both.

The wall mount 100 can be coupled to a wide range of different types of support structures, such as vertical support structures in the form of walls of a dwelling (e.g., a house, an apartment, etc.), an office, a lobby, a bar (e.g., a sports bar), or the like and can be mounted to vertical walls or non-vertical walls, including, without limitation, angled walls, non-planar walls, or other structures sturdy enough to handle the load of the wall mount 100 and any attached object(s).

The television 110 can be, without limitation, a liquid crystal display (LCD) television, a plasma television, a light emitting diode (LED) television, or other type of flat screen television, as well as other types of wall mountable televisions. The weights of such televisions are often in a range of about 20 lbs to about 110 lbs and often have a maximum thickness less than about 5 inches. Advantageously, large screen televisions have a screen with a length (measured diagonally) equal to or greater than about 30 inches and can hide the entire wall mount 100, as shown in FIG. 2. The wall mount 100 can also hold small or medium screen televisions. Other types of electronic displays (e.g., monitors) or objects can be carried by the wall mount 100. Exemplary mountable objects include, but are not limited to, screens suitable for use with front projectors, boards (e.g., a chalk board, a dry erase board, etc.), containers (e.g., a basket or a bin), or the like.

Figure 4:
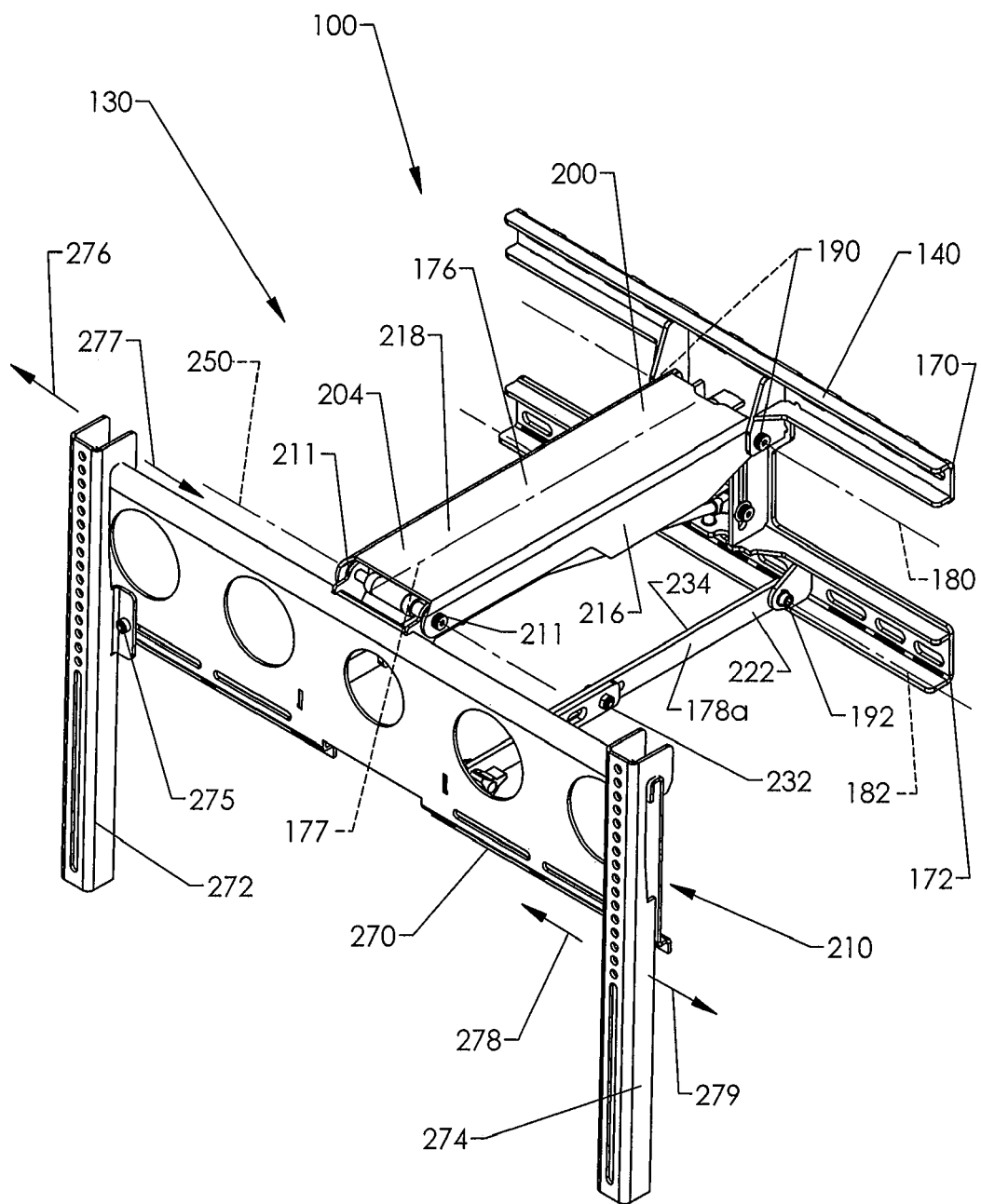
FIG. 4 is an isometric view of a mounting system in accordance with one embodiment.

FIGS. 4-6 show the support bracket 140, a display bracket 210, and the linkage assembly 130 that cooperate to define a four bar linkage. The support bracket 140 can include a pair of spaced apart elongate members 170, 172, each including a plurality of apertures for receiving fasteners, such as fasteners 174 in FIG. 1. As used herein, "bracket" is a broad term that includes one-piece or multi-piece structural supports configured to be coupled (e.g., fixedly coupled) to a support surface or structure. Brackets can be made, in whole or in part, of metal (e.g., steel, aluminum, etc.), composites, plastic, polymers, combinations thereof, or the like. In one-piece embodiments, a bracket can be formed using a stamping process, a machining process, or the like. In multi-piece embodiments, separate pieces can facilitate packaging for shipping. The pieces can be assembled after unpacking. Other types of one-piece or multi-piece brackets can be used, if needed or desired.

Referring to FIGS. 4 and 5, wall mount 100 is symmetrical with respect to a center plane 173 and, thus, may be described with reference to one side. A main bearing member in the form of an upper link 176 is rotatable about an upper axis of rotation 180 defined by support pivots 190. A pair of lower links 178a, 178b (collectively "178") are rotatable about a lower axis of rotation 182 defined by support pivots 192. The axes of rotation 180, 182 can lie in an imaginary plane which is substantially parallel to the wall 120.

The upper link 176 can include a support end 200 and an opposing bracket end 204. Pivots 190 couple the support end 200 to the bracket 140. Pivots 211 couple the bracket end 204 to the display bracket 210 and can serve as display pivots. The upper link 176 has a fixed length and a generally U-shaped transverse cross-section taken generally perpendicular to its longitudinal axis 177. Sidewalls 216, 217 are connected to an upper plate 218.

The lower links 178 are generally similar to one another and, accordingly, the description of one lower link applies equally to the other, unless indicated otherwise. The lower link 178a includes a support bracket end 222 rotatably coupled to the support bracket 140 by the pivot 192. FIG. 6 shows a pivot 230 coupling the display bracket end 224 to the display bracket 210 and defining an axis of rotation 183.

With reference to FIG. 6, the link 178a includes rigid slotted members 232, 234 and pins extending through the members 232, 234. The slotted members 232, 234 are slidable relative to one another. An adjustment mechanism in the form of a tilt adjustment mechanism 240 is slidably retained in a slot of the member 232 and a hole in the member 234. A handle 242 can be rotated to lock and unlock the link 178a. To lengthen the link 178a, the handle 242 is rotated counter-clockwise and the member 232 is slid away from the support bracket 140, as indicated by an arrow 246. The length of the link 178a can be increased to rotate the display bracket 210 clockwise (indicated by an arrow 254) about a tilt axis of rotation 250 (FIG. 5) defined by the pivots 211. The display bracket 210 can be rotated counter-clockwise about the tilt axis of rotation 250 (indicated by an arrow 256) by sliding the member 232 in the opposite direction. After the television 110 is in the desired orientation, the handle 242 is rotated clockwise to securely hold the member 232 between the member 234 and the handle 242. The dimensions (e.g., the longitudinal lengths) of the slots can be increased or decreased to increase or decrease the amount of tilt. Other locking mechanisms can include, without limitation, one or more rollers, slides (e.g., linear slides), locks, clamps, pins, ratchet mechanisms, or combinations thereof that cooperate to prevent, limit, or inhibit relative movement between components.

Referring to FIGS. 4 and 5, display bracket 210 includes a rail 270 and elongate arms 272, 274 hanging on the rail 270. The arms 272, 274 can be slid along the rail 270, as indicated by arrows 276, 277, 278, 279, to accommodate different sized objects. Fasteners 275, 276 fixedly couple the elongate arms 272, 274 to the rail 270. Fasteners can pass through apertures in the elongate arms 272, 274 to hold the television 110. Other types of display brackets can also be used. The configuration, size, and design of the display bracket can be selected based on the configuration, size, and design of the television or other object to be mounted.

Figure 7:
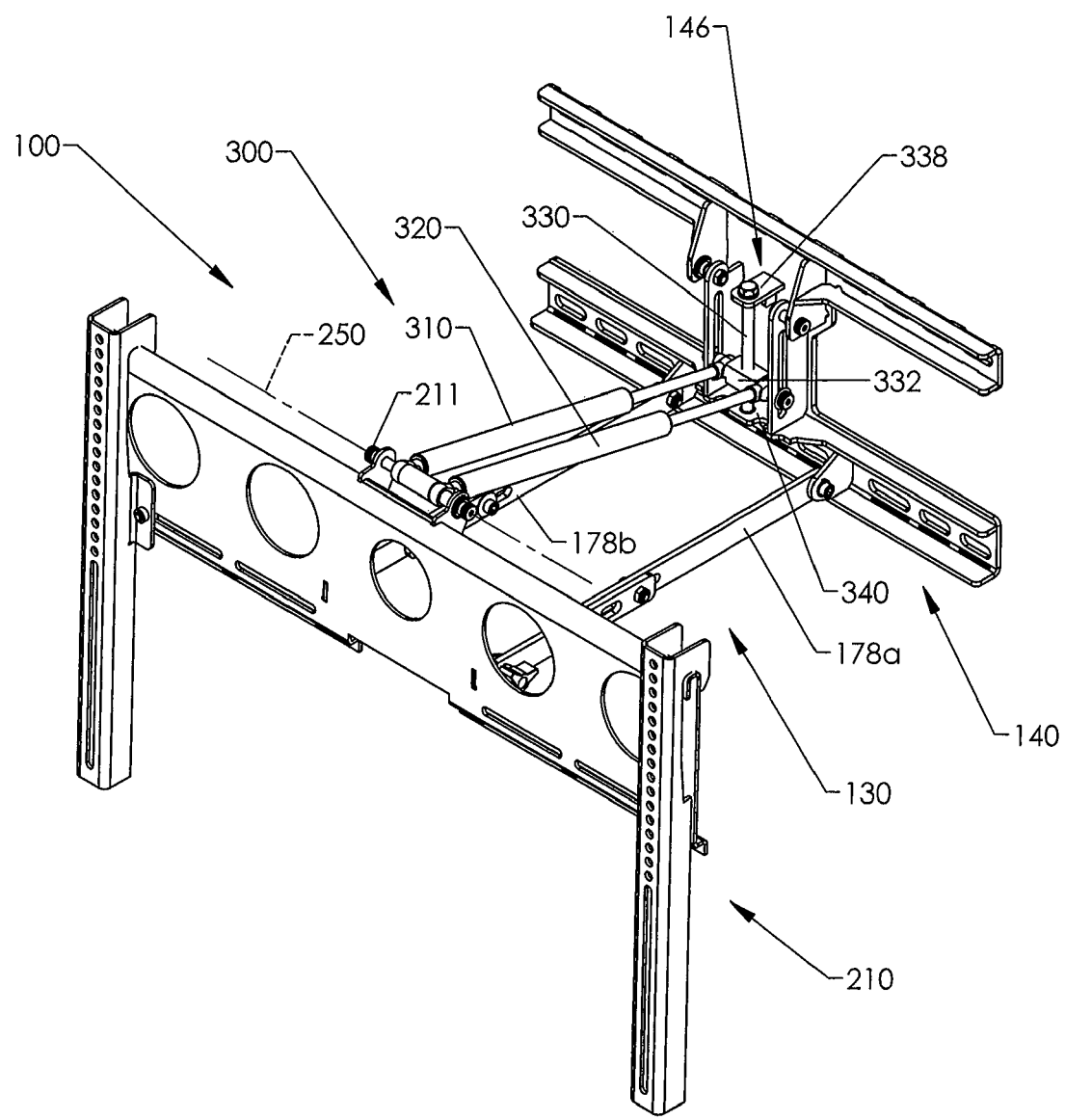
FIG. 7 is an isometric view of the mounting system with an upper arm shown removed.

FIG. 7 shows the wall mount 100 with the upper link removed. A biasing mechanism in the form of a counterbalance mechanism 300 cooperates with the linkage assembly 130 to allow a user to effortlessly move the television to different positions but prevents or inhibits movement of the television when the user does not apply a force. The television can be moved using a force that is less than a threshold force. The threshold force can be about 2 lbf., 3 lbf., 5 lbf., 10 lbf., or 20 lbf., as well as any other suitable threshold force. In some embodiments, counterbalance mechanism 300 counterbalances the weight of the television and the weight of the suspended components in order to allow movement with a desired amount of resistance (e.g., a minimal amount of resistance, a threshold amount of resistance, etc.). The counterbalance mechanism 300 can include force balancing devices, illustrated as pistons 310, 320 rotatably coupled to the display bracket 210 and support bracket 140. The pistons 310, 320 can be gas pistons, pneumatic pistons, or other type of biasing devices capable of providing a desired force, including, without limitation, a substantially constant force, variable force, or the like.

Figure 8:
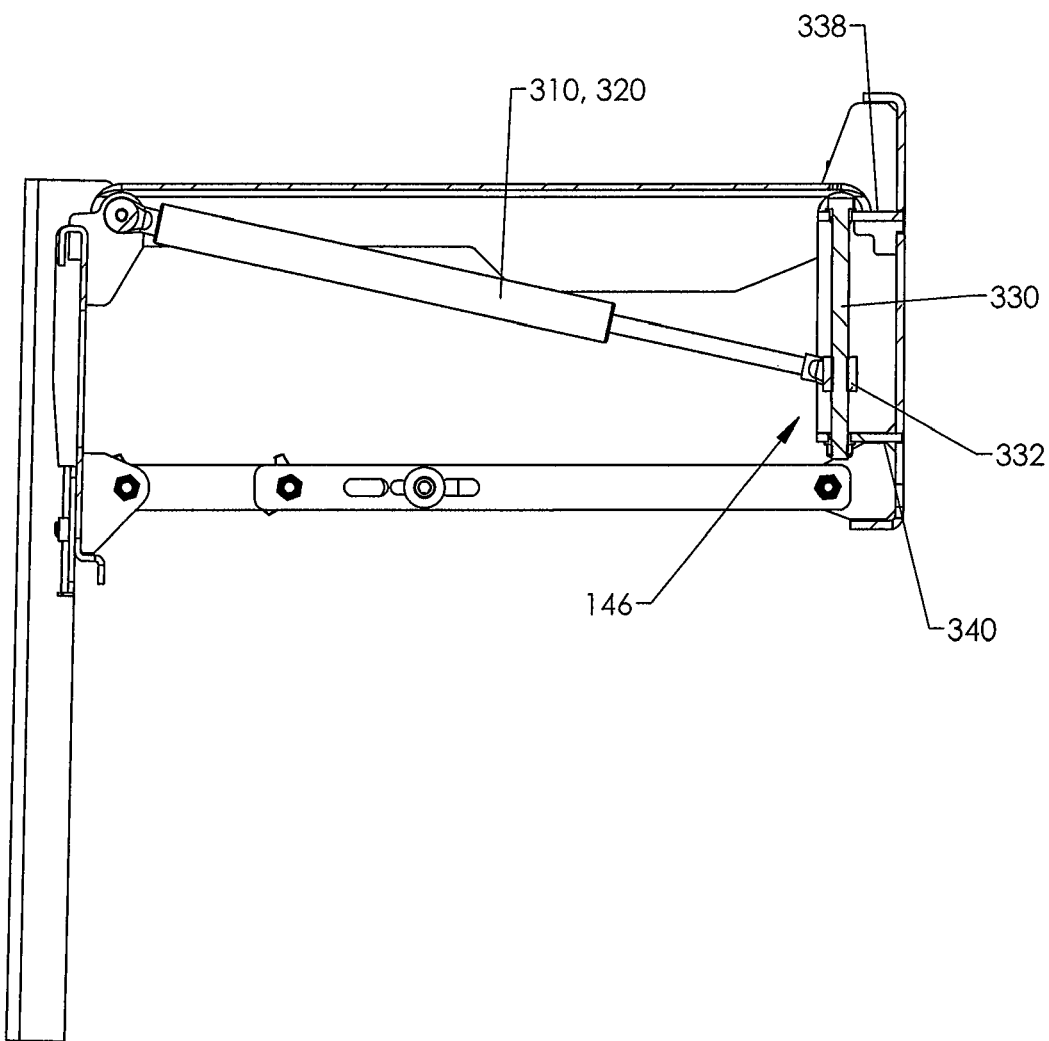
FIG. 8 is a cross-sectional view of the mounting system taken along a line 8-8 of FIG. 5.

Referring to FIGS. 7 and 8, force adjustment mechanism 146 includes a threaded rod 330 held by holders 338, 340 of the support bracket 140. The rod 330 can be rotated to move a carriage or block 332 upwardly or downwardly. The carriage 332 is rotatably coupled to the counterbalance mechanism 300 and can be in a first position such that the counterbalance mechanism 300 is in a first setting or configuration to provide a first balancing force. The carriage 332 can be moved to a second position such that the counterbalance mechanism 300 is in a second setting or configuration to provide a second balancing force that is substantially different from the first balancing force. For example, the first balancing force can counterbalance a television that weighs about 100 pounds wherein the second balance force can counterbalance a television that weighs about 40 pounds. Other types of force adjustment mechanisms can include, without limitation, one or more motors (e.g., stepper motors), linear slides, threaded rods, pulleys, combinations thereof, or the like.

Figure 10:
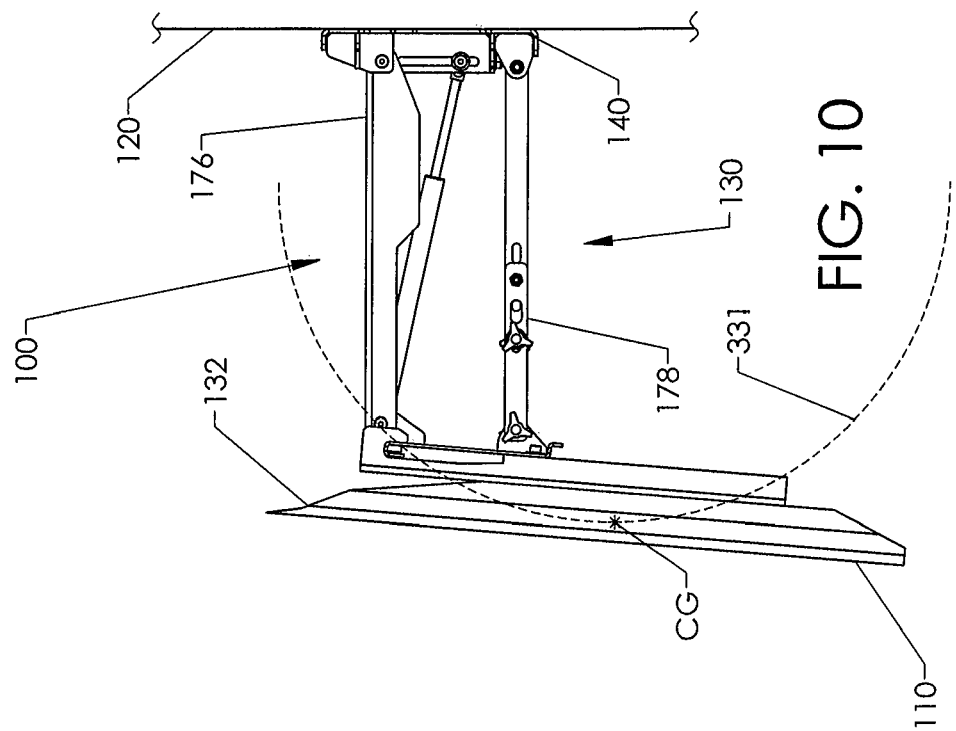
FIG. 10 is a side elevational view of the mounting system in a deployed expanded configuration.
Figure 9:
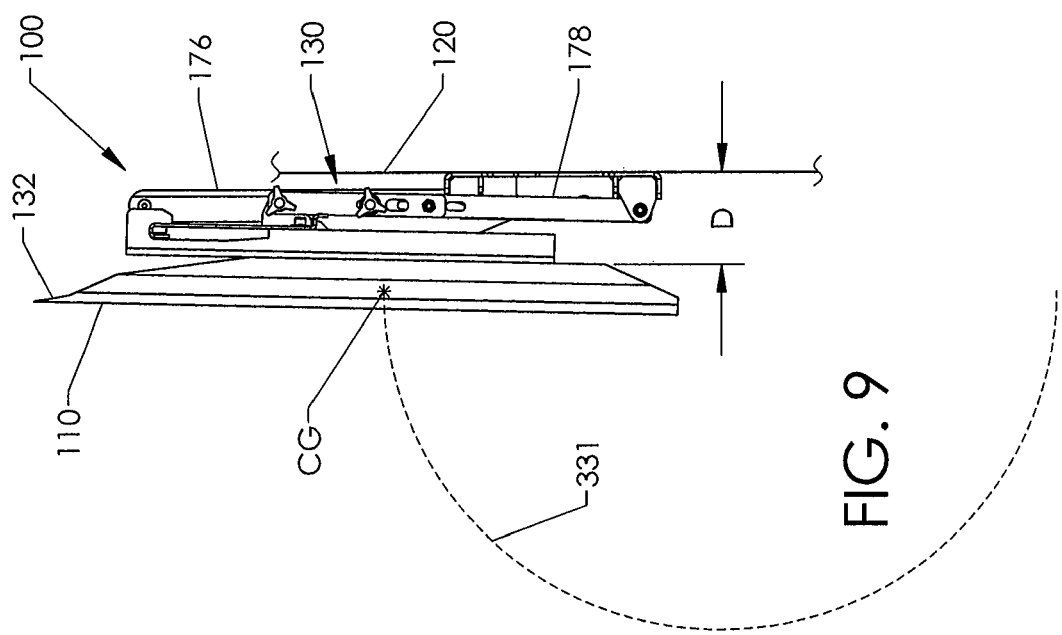
FIG. 9 is a side elevational view of the mounting system in a stowed configuration.
Figure 11:
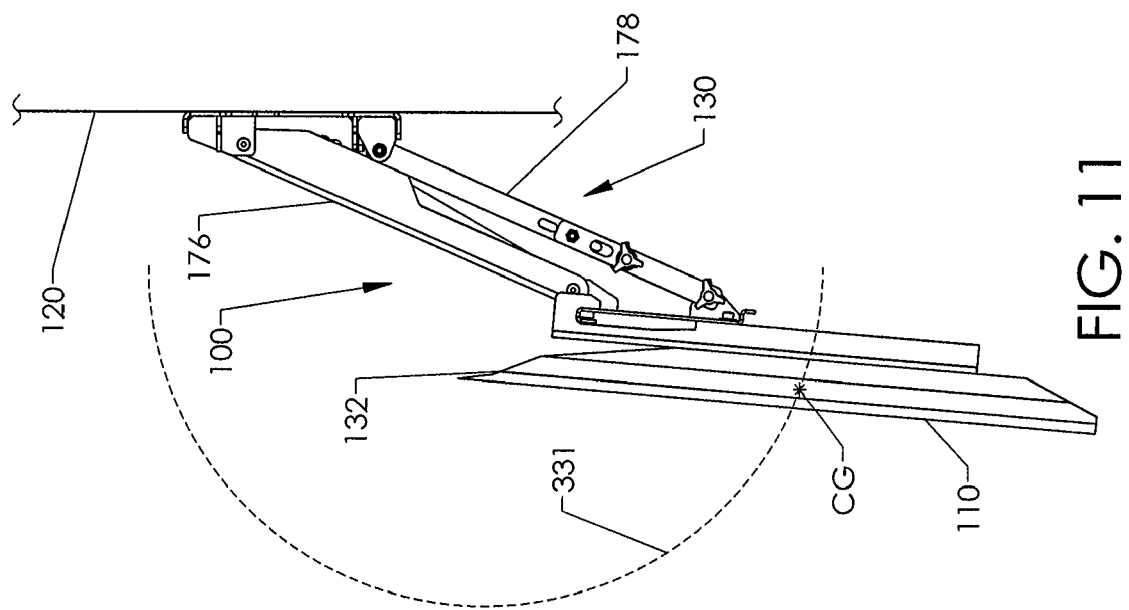
FIG. 11 is a side elevational view of a television in a lowered position.
Figure 12:
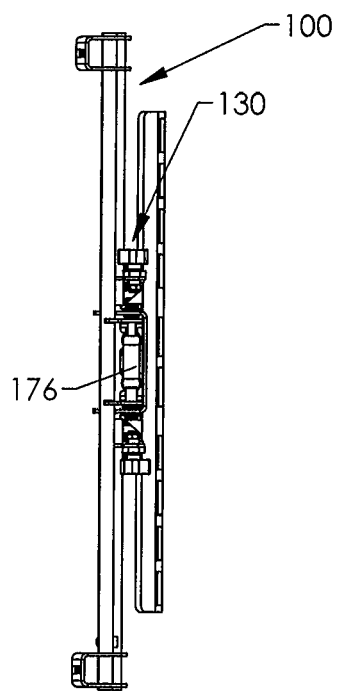
FIG. 12 is a top plan view of the stowed mounting system.

FIGS. 9, 10, and 11 show the television 110 in a stowed position, an intermediate position, and a lowered position, respectively. The linkage assembly 130 of FIG. 9 is in a substantially upright position. The lower links 178 move away from and remain substantially parallel to the upper link 176 as the television 110 moves away from the wall 120. FIG. 10 shows the linkage assembly 130 in an expanded configuration and extending substantially horizontally away from the support bracket 140. FIG. 11 shows the linkage assembly 130 in a lowered configuration and extending downwardly away from the support bracket 140. Details of the illustrated positions are discussed below.

Referring to FIG. 9, wall mount 100 has a relatively low-profile configuration to minimize a distance D between the television 110 and the support surface 120. In some embodiments, distance D is less than about 8 inches, 6 inches, 5 inches, 4 inches, or 2 inches. Other distances D are also possible. The upper link 176 and lower links 178 nest together to provide a space saving and aesthetically pleasing low profile configuration.

As the television 110 is moved downwardly along a predetermined path 331, it can tilt backwardly (e.g., rotate clockwise as viewed from the side) such that the screen is angled upwardly, as illustrated in FIGS. 10 and 11. The wall mount 100 can also be modified to be a five bar linkage to provide such motion. The television 110 of FIG. 11 is especially well positioned for viewers with their heads positioned slightly above the center of the screen. Alternatively, television 110 can be moved along the path 331 without appreciably changing the tilt setting. For example, the center gravity (CG) of the television 110 can travel along the generally arcuate path 331 without appreciable rotation or angular displacement of the television 110. Thus, television 110 can be translated or rotated, or both.

The upper link 176 and lower links 178 can rotate about respective axes of rotation 182, 180 from about 130 degrees to about 180 degrees. In some embodiments, the upper link 176 and lower links 178 rotate about the respective axes of rotation 182, 180 about 160 degrees. If the television 110 is mounted above a fireplace, upper link 176 and lower links 178 can rotate about respective axes of rotation 182, 180 an angle in a range of about 90 degrees to about 160 degrees. Other angles are also possible, if needed or desired.

Figure 14:
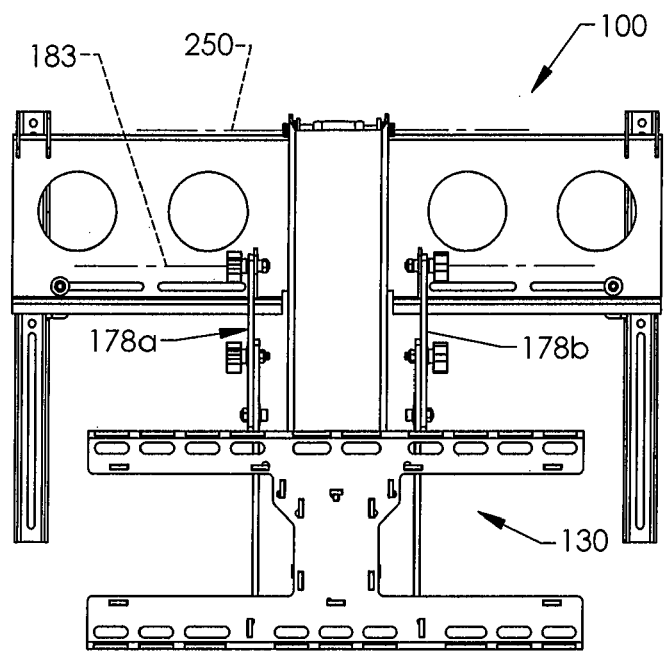
FIG. 14 is a back elevational view of the stowed mounting system of FIG. 12.
Figure 13:
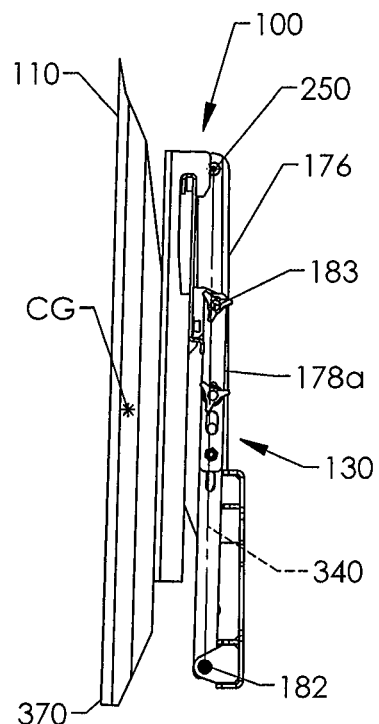
FIG. 13 is a side elevational view of the stowed mounting system of FIG. 12 holding a television.
Figure 15:
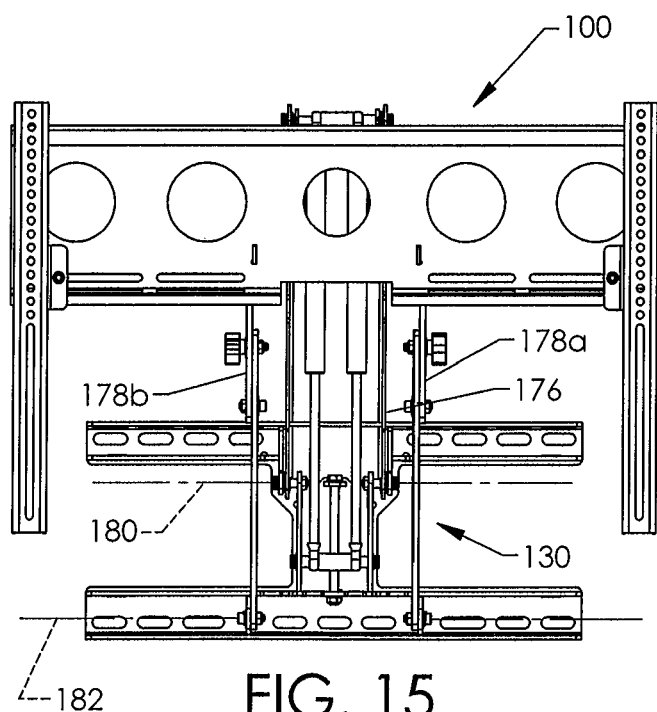
FIG. 15 is a front elevational view of the stowed mounting system of FIG. 12.

FIGS. 12-15 show the linkage assembly 130 in a substantially upright position. The lower links 178 are alongside and laterally adjacent to the upper linkage 176. FIG. 13 shows at least a portion of the lower link 178a positioned in front of the upper link 176 as viewed along the lower axis of rotation 182. As shown in FIGS. 14 and 15, upper link 176 is positioned between the lower links 178a, 178b. Such a nested arrangement provides a relatively low profile to position the mounted object very close to a wall.

Figure 16:
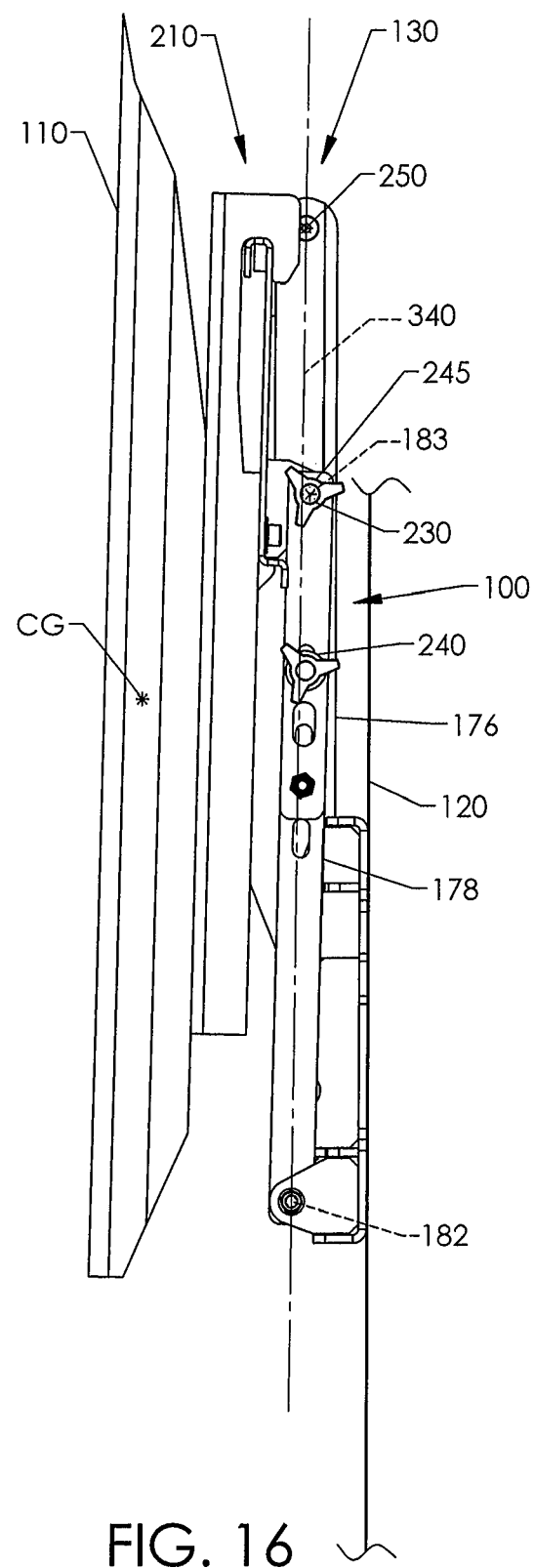
FIG. 16 is a side elevational view of the stowed mounting system holding a television generally parallel relative to a wall.
Figure 17:
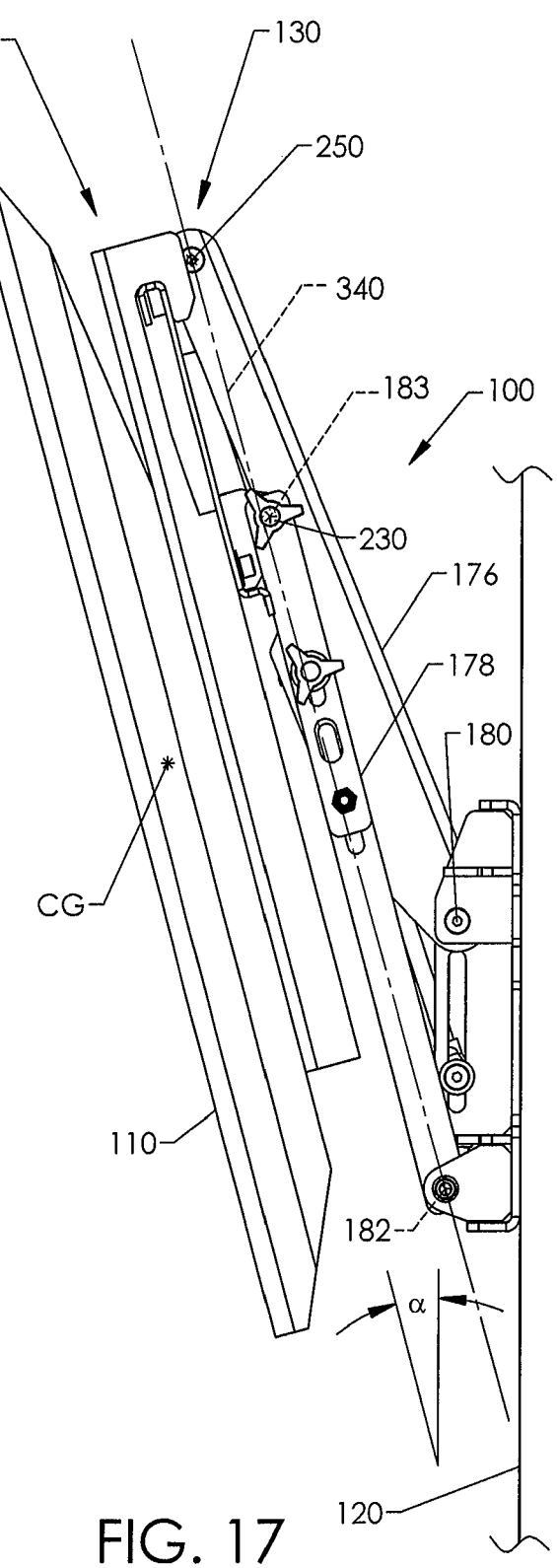
FIG. 17 is a side elevational view of the stowed mounting system holding a television tilted downwardly.

FIGS. 13, 16, and 17 show the linkage assembly 130 in an over-center configuration. The CG of the television 110 and the axis of rotation 183 are on opposite sides of an imaginary plane 340. The lower inner axis of rotation 182 and tilt axis of rotation 250 lie in the imaginary plane 340. Gravitational force acting on the television 110 causes the pivots 230 to be pushed towards the wall 120 to keep the linkage assembly 130 in the stowed configuration. A locking mechanism 245, illustrated as a locking knob mechanism, can be tightened to ensure that the linkage assembly 130 remains locked. The locking mechanism 245 can comprise a handle with a threaded member. The handle can be rotated to press the link 178 against a portion of the bracket 210 to prevent or inhibit relative movement between the link 178 and the bracket 210. In other embodiments, the locking mechanism 245 can be in the form of a fine tune tilt adjustment mechanism and can include one or more gears, ratchet mechanisms, or other features that allow controlled tilting.

When the linkage assembly 130 is in an unlocked state, the bottom of the television 110 can be pulled away from the support bracket 140 to move the pivots 230 away from the wall 120 and across the imaginary plane 340. Once the pivots 230 move across the imaginary plane 340, the linkage assembly 130 is released, thus allowing lowering of the television 110.

The lengths of the links 178 of FIG. 16 may be decreased to rotate the television 110 counterclockwise about the axis of rotation 250 so as to move the bottom of the television 110 rearwardly. The links 178 of FIG. 17 can be lengthened to tilt the top of the television 110 rearwardly. In various embodiments, television 110 can be tilted an angle α (FIG. 17) of about ±5 degrees to about ±55 degrees. In certain embodiments, a tilt angle α of about 15 degrees can be achieved.

Figure 18:
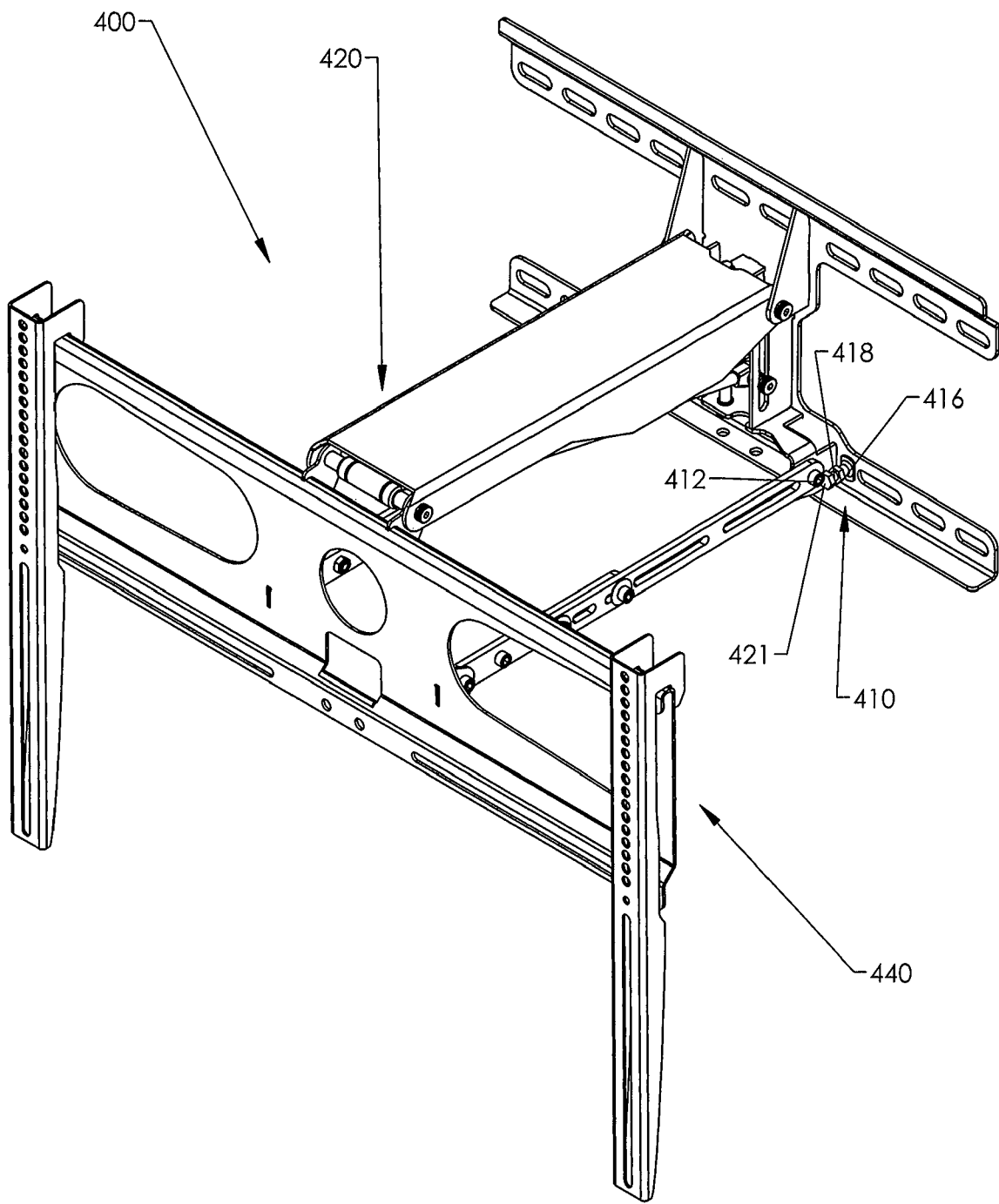
FIG. 18 is an isometric view of a mounting system, in accordance with another embodiment.
Figure 19:
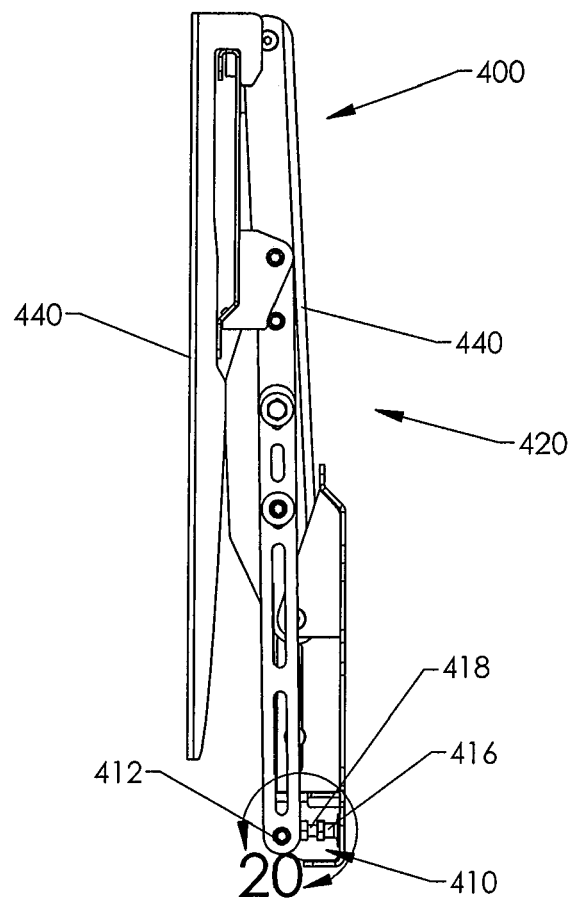
FIG. 19 is a side elevational view of the mounting system of FIG. 18 in a stowed configuration.
Figure 20:
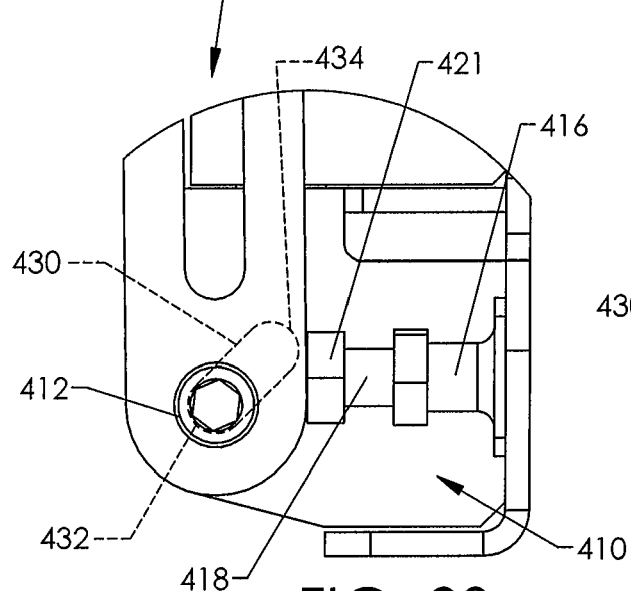
FIG. 20 is a detailed view of a positioner of FIG. 19.

FIGS. 18 and 19 show a mounting system 400 that is generally similar to the mounting system 100 discussed in connection with FIGS. 1-17, except as detailed below. A positioner 410 includes a base 416 and a movable member in the form of an adjustment screw 418. The adjustment screw 418 has external threads that engage internal threads along a passageway in the base 416. A head 421 can limit travel of a pivot 412 along a slot 430, illustrated in phantom line in FIGS. 20 and 20A.

Figure 21:
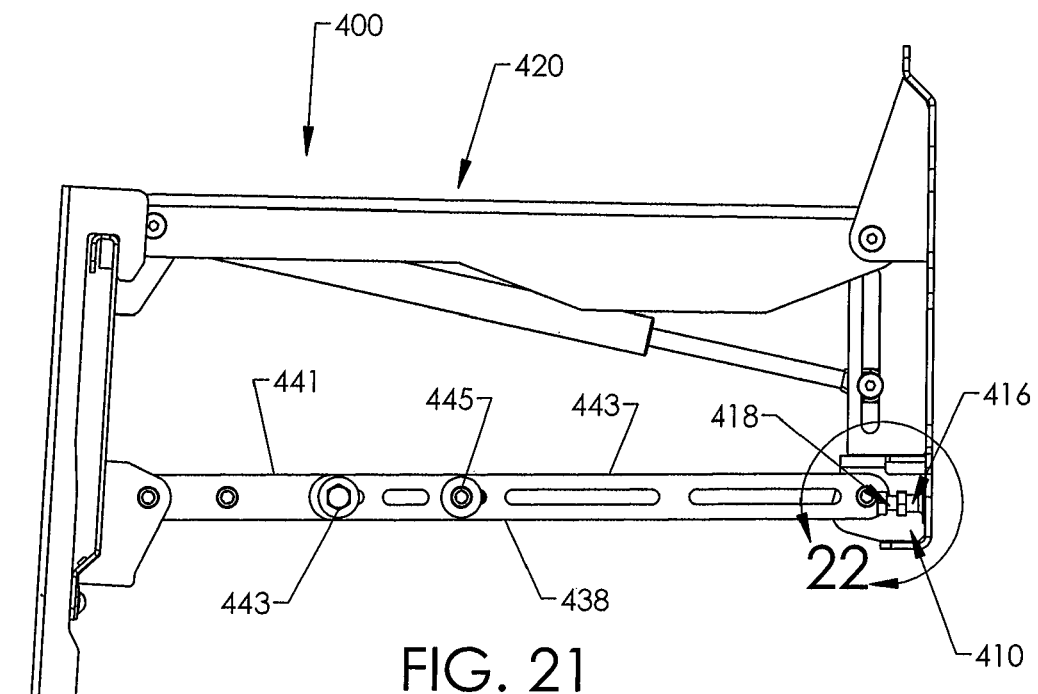
FIG. 21 is a side elevational view of the mounting system of FIG. 18 in a deployed configuration.
Figure 22:
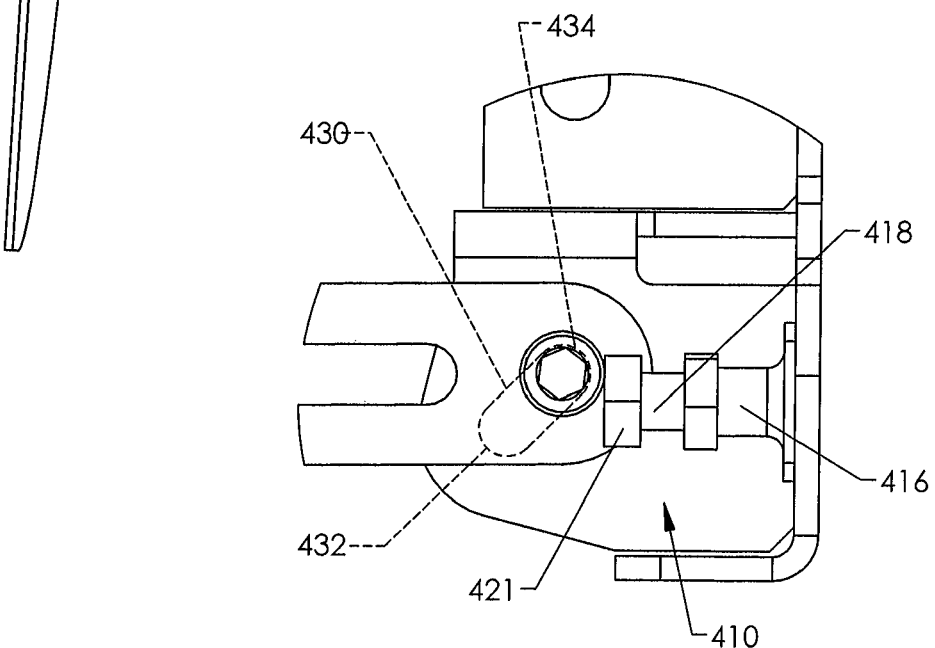
FIG. 22 is a detailed view of the positioner of FIG. 21.

Referring again to FIG. 19, linkage assembly 420 is in a stowed configuration. Pivot 412 is forced towards a forward lower end 432 of the slot 430. As a display bracket 440 is moved downwardly, pivot 412 can slide rearwardly and upwardly along the slot 430. FIGS. 21 and 22 show the pivot 412 positioned at a rearward upper end 434 of the slot 430. Referring to FIGS. 23 and 24, pivot 412 is at the rearward upper end 434 of the slot 430. The load applied by a mounted object pushes the pivot 412 towards the rearward upper end 434.

The illustrated head 421 can be moved by rotating the adjustment screw 418. By moving the adjustment screw 418 into and out of the base 416, tilt of the mounted object can be adjusted. For example, adjustment screw 418 can be moved outwardly away from the wall to tilt the display bracket 440 rearwardly. The link 438 has elongate members 441, 443 that can be moved relative to one another to provide large amounts of adjustment. A locking mechanism 443 can be tightened using a wrench or other tool to lock the linkage 438. In the illustrated embodiment, a pin 445 extends through a slot in the elongate member 443 and a hole in the elongate member 441.

Figure 20A:
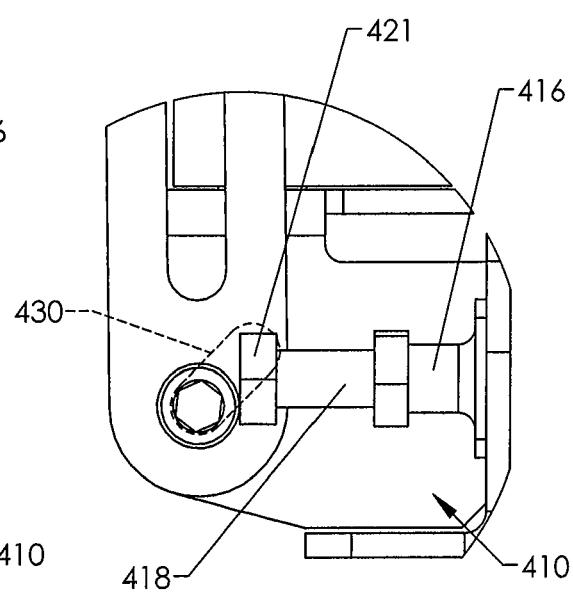
FIG. 20A is a detailed view of the positioner in an extended configuration.

The positioner 410 can function as a mode of operation selector to alternate the mounting system 400 between a four bar linkage system and a five bar linkage system. As shown in FIG. 20A, when the adjustment screw 418 is in an extended position, pivot 412 is translationally fixed. The mounting system 400 thus functions as four bar linkage system. When the adjustment screw 418 is moved into the base 416 to allow translation of the pivot 412 along the slot 430, the mounting system 400 functions as a five bar linkage system.

Figure 25:
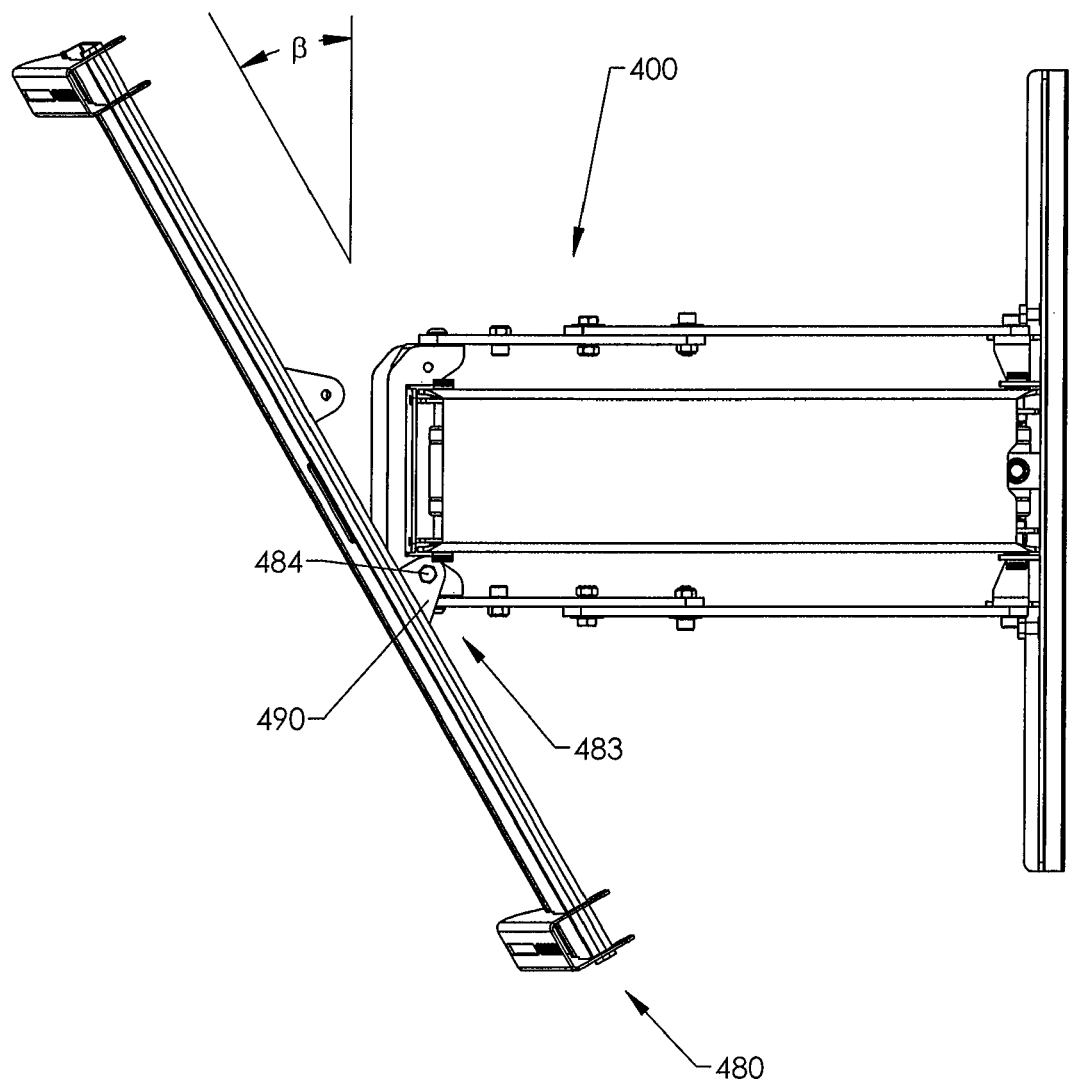
FIG. 25 is a top plan view of the mounting system of FIG. 18.
Figure 26:
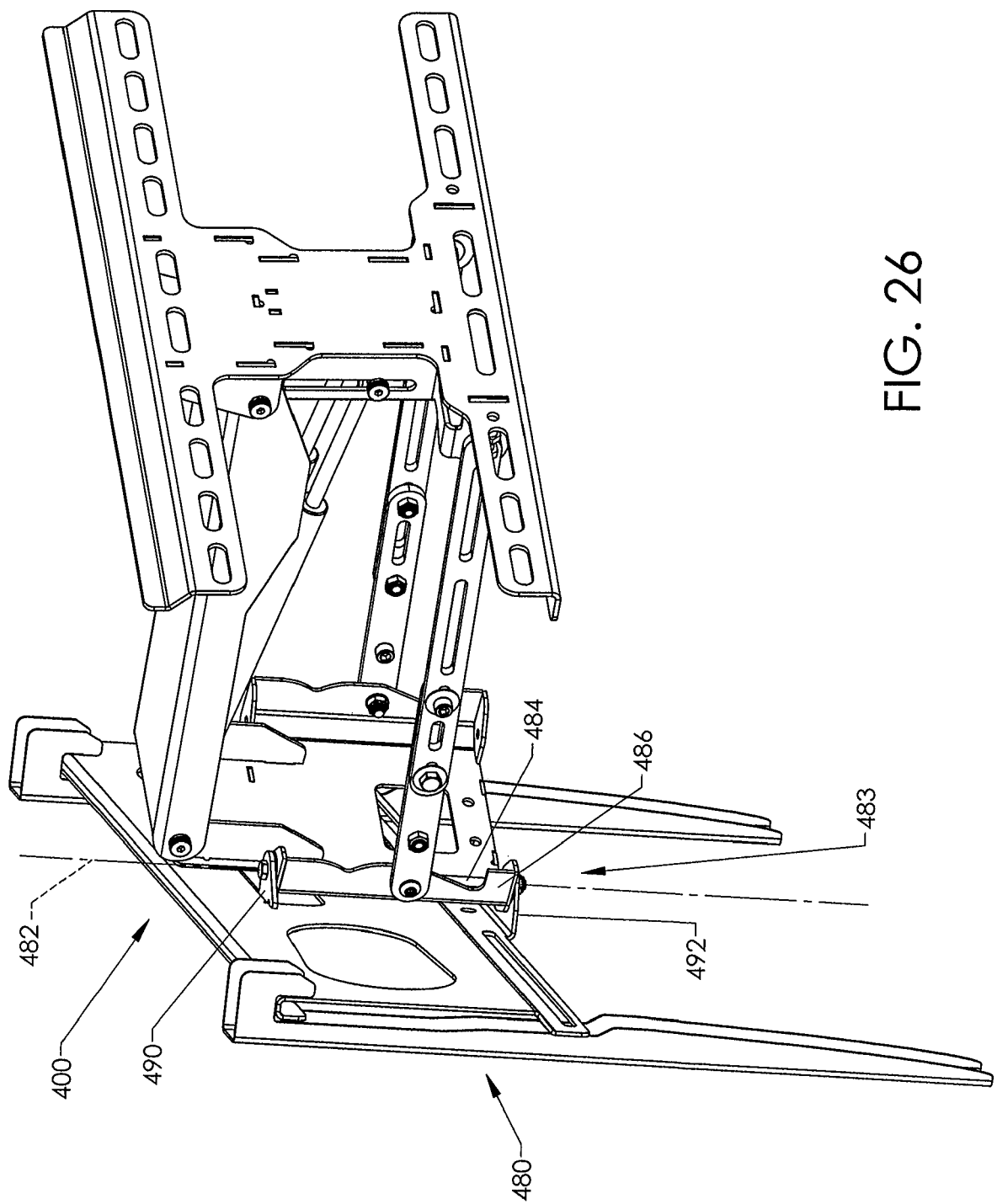
FIG. 26 is a rear, top, and left side isometric view of the mounting system of FIG. 18.

FIGS. 25 and 26 show a display bracket 480 rotatable about an axis of rotation 482, illustrated as a vertical axis of rotation, defined by a swivel mechanism 483. The swivel mechanism 483 includes a pin 484 held by a retainer 486 and mounts 490, 492. The mounts 490, 492 and/or retainer 486 can have slots, holes, or other types of features to allow different types of pivoting or swivel action. The display bracket 480 can be rotated to the left and right an angle ß of about ±5 degrees to about ±55 degrees.

Figure 27:
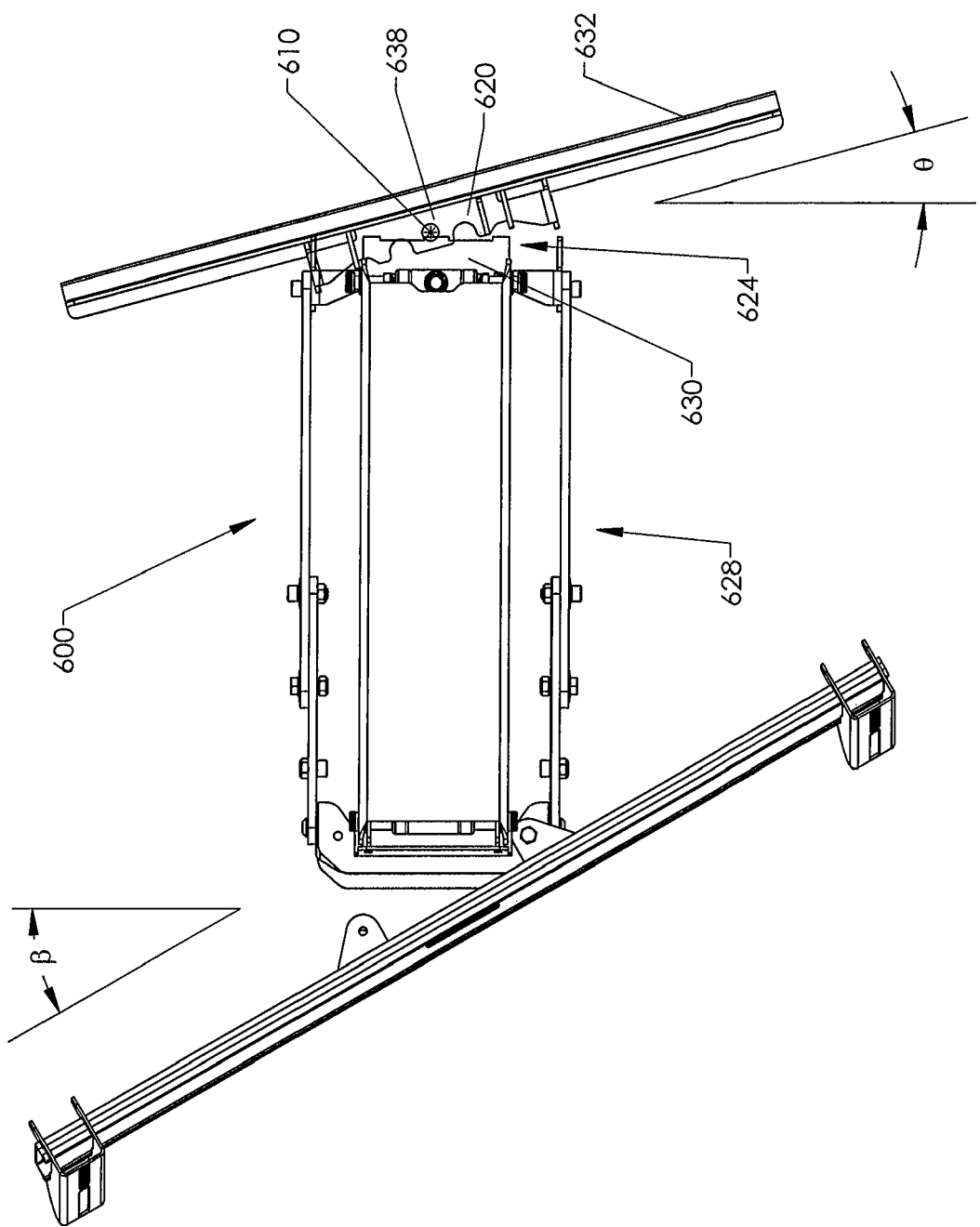
FIG. 27 is a top plan view of a mounting system in accordance with another embodiment.

Mounting systems can include any number of swivel mechanisms. For example, swivel mechanisms can couple links to the support bracket and can couple the links to the display bracket. The number, positions, and orientations of the swivel mechanisms can be selected to achieve the desired functionality. FIG. 27 shows a wall mount 600 that includes a swivel mechanism 624 that connects a linkage assembly 628 to a support bracket 632. The swivel mechanism 624 includes a pin 638 held by a mount 620. A retainer 630 pivots with respect to the pin 638 to rotate about an axis of rotation 610. The linkage assembly 628 can be rotated to the left and to the right an angle θ of about ±5 degrees to about ±30 degrees. Other angles are also possible, if needed or desired. Relevant description of the wall mount 600 applies equally to swiveling mounting systems discussed in connection FIGS. 69 and 70.

Figure 28:
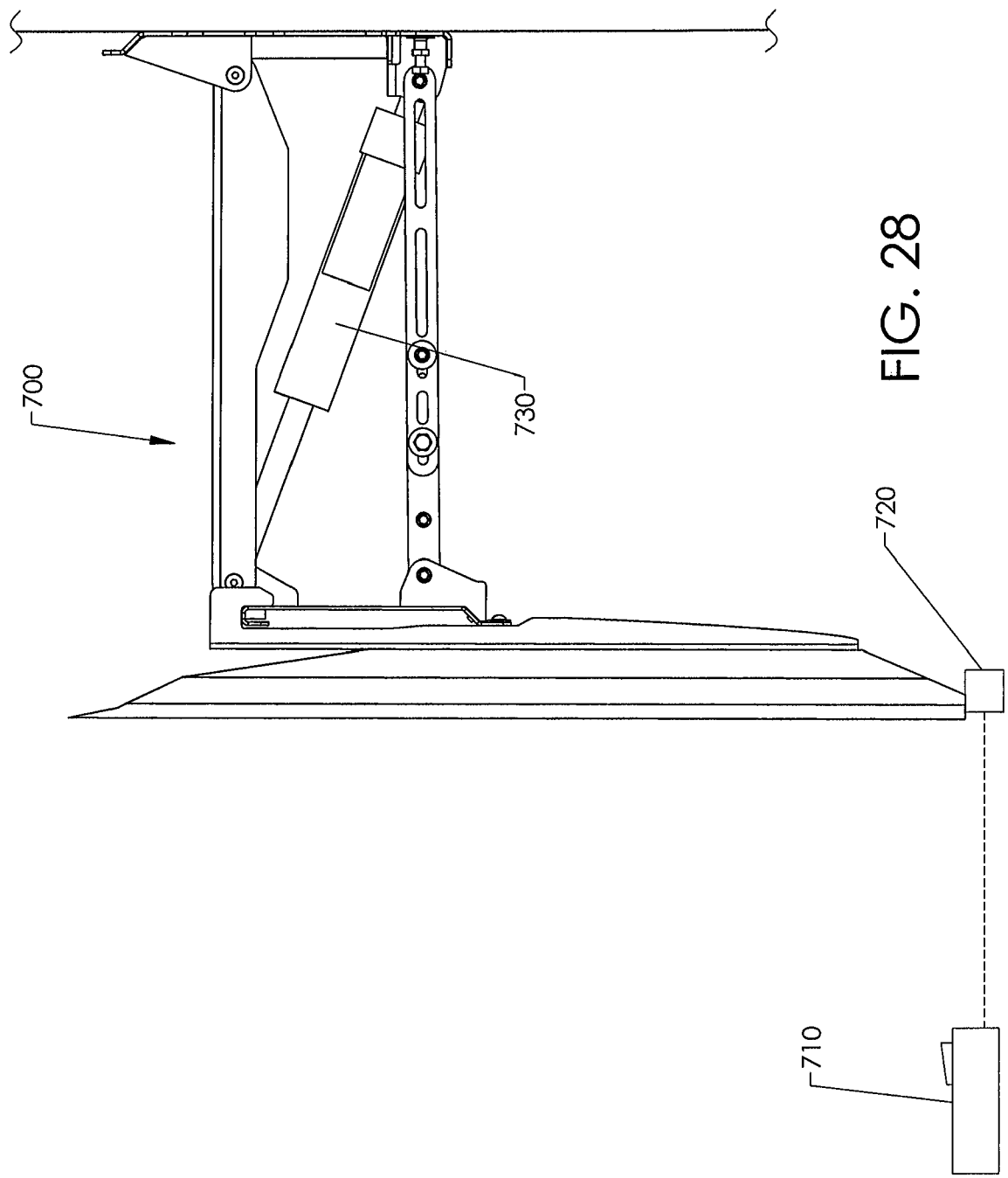
FIG. 28 is a side elevational view of a motorized mounting system in accordance with one embodiment.

FIG. 28 shows an automated mounting system 700 that can be moved using a controller 510 that communicates with a control device 720. A motorized actuator 730 raises and lowers the television. The control device 720 can include a receiver that is communicatively coupled (e.g., wirelessly coupled, capacitively coupled, inductively coupled, or the like) to a transmitter of the controller 710. The control device 720 can store information in memory 721 and can include one or more computing devices or processors. Memory can include, without limitation, volatile memory, non-volatile memory, read-only memory (ROM), random access memory (RAM), and the like. Stored information can include, but is not limited to, settings, weight of mounted object, or the like. Settings can include, but are not limited to, position settings (e.g., stowed positions, lowered positions, intermediate positions, or the like), times (e.g., times to automatically move the object), or the like.

The controller 710 can be a wireless controller with artificial intelligence functionality or other suitable functionality. For example, the controller 710 can include or be compatible with hubs or automation devices (e.g., Google Home, Amazon's Alexa, etc.), or suitable device for receiving input from users. Voice commands can be used to raise and lower the mounting system, set mounting system positions, program mounting systems, or the like. In some embodiments, the controller 710 can communicate wirelessly or via a wired connection with another device, such as an IoT hub or digital assistant (e.g., Google Home, Microsoft Cortana, Amazon Alexa, etc.). Wireless communication can be via a local network (e.g., WiFi network) or other suitable network. Additionally or alternatively, the control device 720 can communicate with a hub, router, or electronic controller, such as Google Home, Amazon Echo, or the like. In some embodiments, the mounting system 700 can be controlled with one or more voice commands, such as "Siri" (Apple), "Alexa" (Amazon), "Cortana" (Microsoft), Xbox, "OK Google" Google, and so forth. A button on the controller 710 can be used to input voice commands. The control device 720 can have one or more voice detectors (e.g., microphones) that operates to receive voice commands.

The control device 720 can communicate directly with any number of communication devices and may include one or more sensors for detecting movement, position, temperatures, combinations thereof, or the like. By way of example, the control device 720 can include motion sensors configured to detect motion, such as gestures. Position sensors can be used to detect the position of obstacles. The control device 720 can have proximity sensors for detecting the position of viewers, motion, or the like. Viewer motion and position can be tracked to identify command gestures, positional information (e.g., optimum viewing positions), and so forth. In one embodiment, the control device 720 includes one or more cameras for determining the position of viewers, identifying objects, etc., and the control device 720 can determine the optimal display location using viewing algorithms. Identification software (e.g., facial recognition software) can be used to identify different people and to retrieve appropriate positions. Viewers can have different preferred positions stored in memory 721.

Microphones can receive audible information. The control device 720 can be programmed to operate in response to the audible input (e.g., voice commands), determine the location of obstacles, and/or avoid striking obstacles (e.g., shelves, pianos, furniture, or other obstacles). Additionally or alternatively, one or more safety sensors can be utilized and can be incorporated into components of the wall mount system. Additionally or alternatively, the control device 720 can be programmed to move the display to various locations based upon, for example, the location of viewers, time settings, schedules, or voice commands. A timer can be used to determine when to automatically raise or lower the display. In some embodiments, authentication can be required to move the display. For example, the mounting system 700 can be actuated only when an authorization password or other identifier is provided. This way children or other individuals cannot move the display.

Operation of the mounting system 700 can be coordinated with media content, including music, television show, movie, video game, or other suitable media. In one mode of operation, the mounting system 700 can identify the start of the media (e.g., a movie, sports game, etc.) and can automatically position the display at a suitable viewing position. At the end of the content (e.g., completion of the movie, game, etc.), the wall mount 700 can automatically be raised to the stowed position. When one mounting system 700 is moved, it can send data to one or more other mounting systems. The data can include setting information, instructions, commands, or the like.

Mounting systems can be programmed to have coordinated operation. Each control device can have stored instructions and can communicate with each other via wired or wireless connections. In some embodiments, the mounting systems communicate with each other via a local network. Control devices can be programmed to move mounting systems according to one or more cycles or events. In commercial settings, mounting systems can periodically move to attract attention at, for example, a restaurant, a sports bar, or the like.

If the mounting system 700 is mounted above a mantelshelf, the control device 720 can be programmed to ensure that the mounting system does not strike the mantel (e.g., an upper surface of the mantelshelf) as a television is lowered downwardly past the mantelshelf. At a predetermined time (e.g., after a selected bed time), the mounting system 700 can be automatically moved to the stowed configuration such that children cannot easily reach and pull on the television the next morning. In some embodiments, the mounting system 700 can be automatically returned to the stowed configuration after the television has been turned OFF for a certain period of time.

The control device 720 can be programmed to move the television to different positions, each having a different indicator (e.g., number, code, etc.). The indicator can be entered using the controller 710. Additionally or alternatively, control device 720 can include input devices, such as a touch pad, a touch screen, a keyboard, or the like. A user can use the input device to move the mounting system 700 into different positions without utilizing any remote. If the control device 720 is hidden behind a television, the user can reach behind the television to access the control device 720 and position the television as desired. The controller 710 can be a phone (e.g., Smartphone), tablet, computer, or other suitable electronic device for controlling motorized tilt mechanisms, motorized swivels, or other components.

Figure 29:
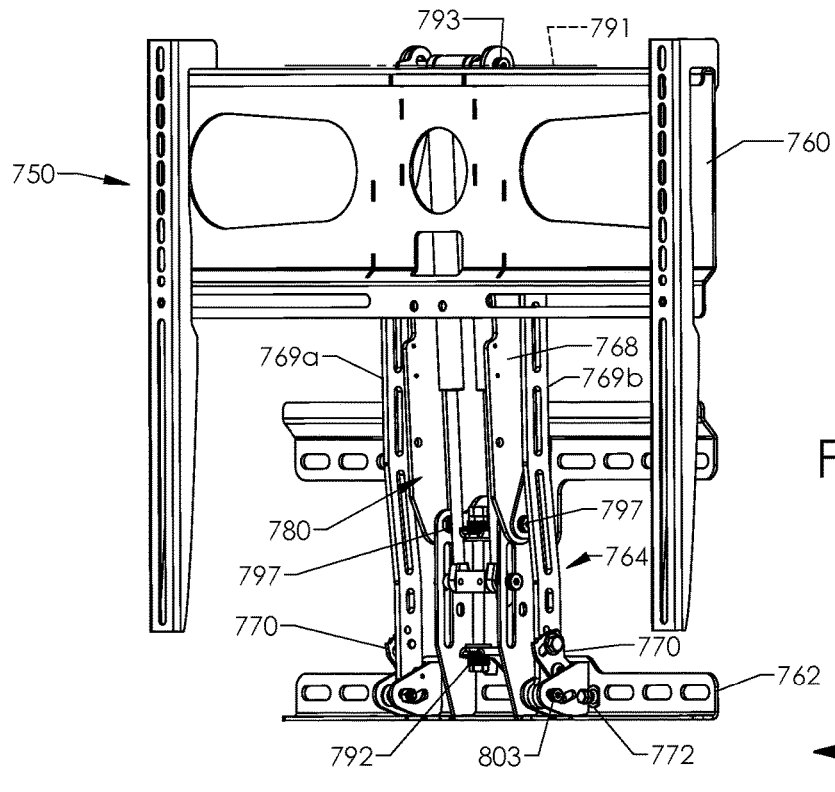
FIG. 29 is an isometric view of a mounting system with a counterbalance assembly and tilt adjustment mechanisms in accordance with one embodiment.
Figure 30:
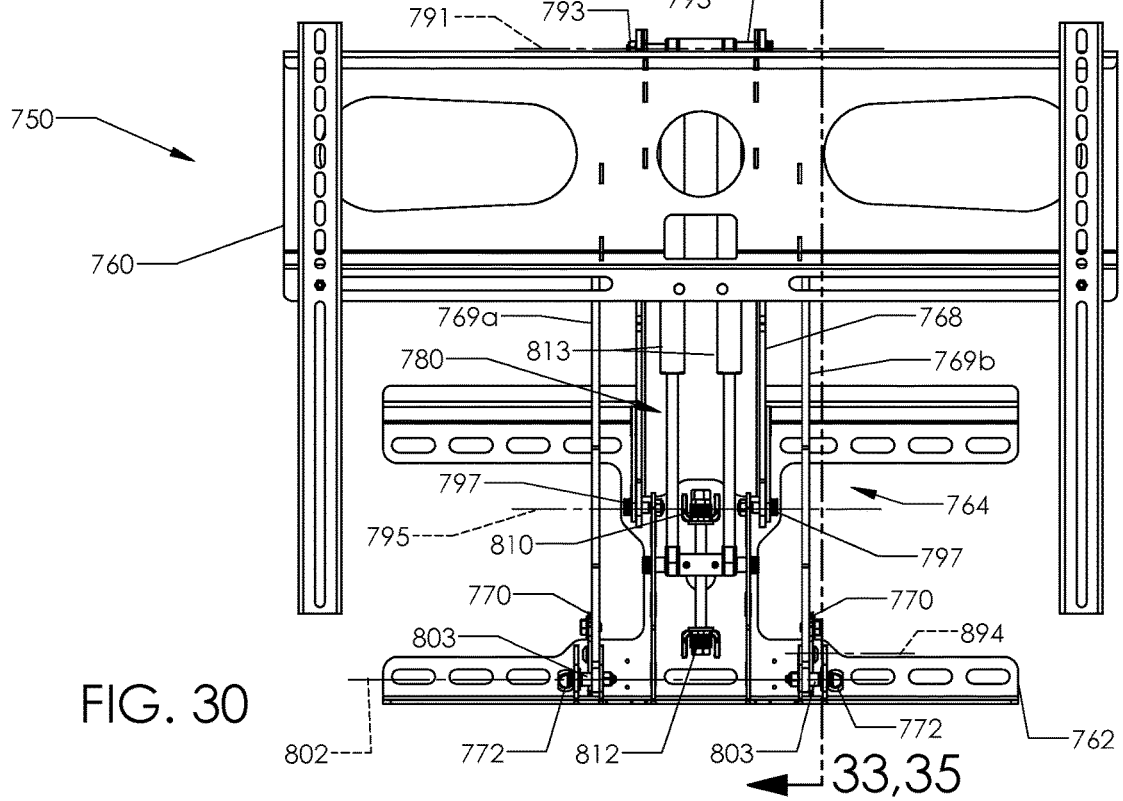
FIG. 30 is a front view of the mounting system of FIG. 29.

FIGS. 29 and 30 are isometric and side views, respectively, of a mounting system 750 in accordance with another embodiment. The mounting system 750 is generally similar to the mounting systems discussed in connection with FIGS. 1-28. The mounting system 750 can be a television mounting apparatus that includes a display bracket 760, a fixed support bracket 762, and a collapsible linkage assembly 764. The display bracket 760 can be configured to hold an electronic display, and the fixed support bracket 762 can be coupled to a mounting structure, such as a vertical wall. The linkage assembly 764 is coupled to the display bracket 760 and the fixed support bracket 762 and can include links that provide, for example, four-bar linkage action, five-bar linkage action, or other types of action. In some embodiments, the linkage assembly 764 includes a main upper link 768 ("upper link 768") and links 769a, 769b (collectively "links 769"). The upper link 768 is rotatable relative to the display bracket 760 about an upper axis of rotation 791 defined by upper pivots 793 and is rotatable about a lower axis of rotation 795 (FIG. 30) defined by lower pivots 797. The links 769 are rotatable relative to the display bracket 760 about an upper axis of rotation 808 (FIG. 31) defined by upper pivots 809 (FIG. 31) and are rotatable about a lower axis of rotation 802 (FIG. 30) defined by lower pivots 803.

FIGS. 29 and 30 show the mounting system 750 including tilt adjustment mechanisms 770, 772 and a biasing mechanism in the form of a counterbalance mechanism 780. The tilt adjustment mechanisms 770, 772 can be used to adjust the positions of the pivots 793, 797, 803 (FIG. 30) and/or 809 (FIG. 31) to position the display bracket 760. The tilt adjustment mechanisms 770, 772 can be operated independently of one another to independently set the tilt of the television at the raised and lowered positions.

Figure 36:
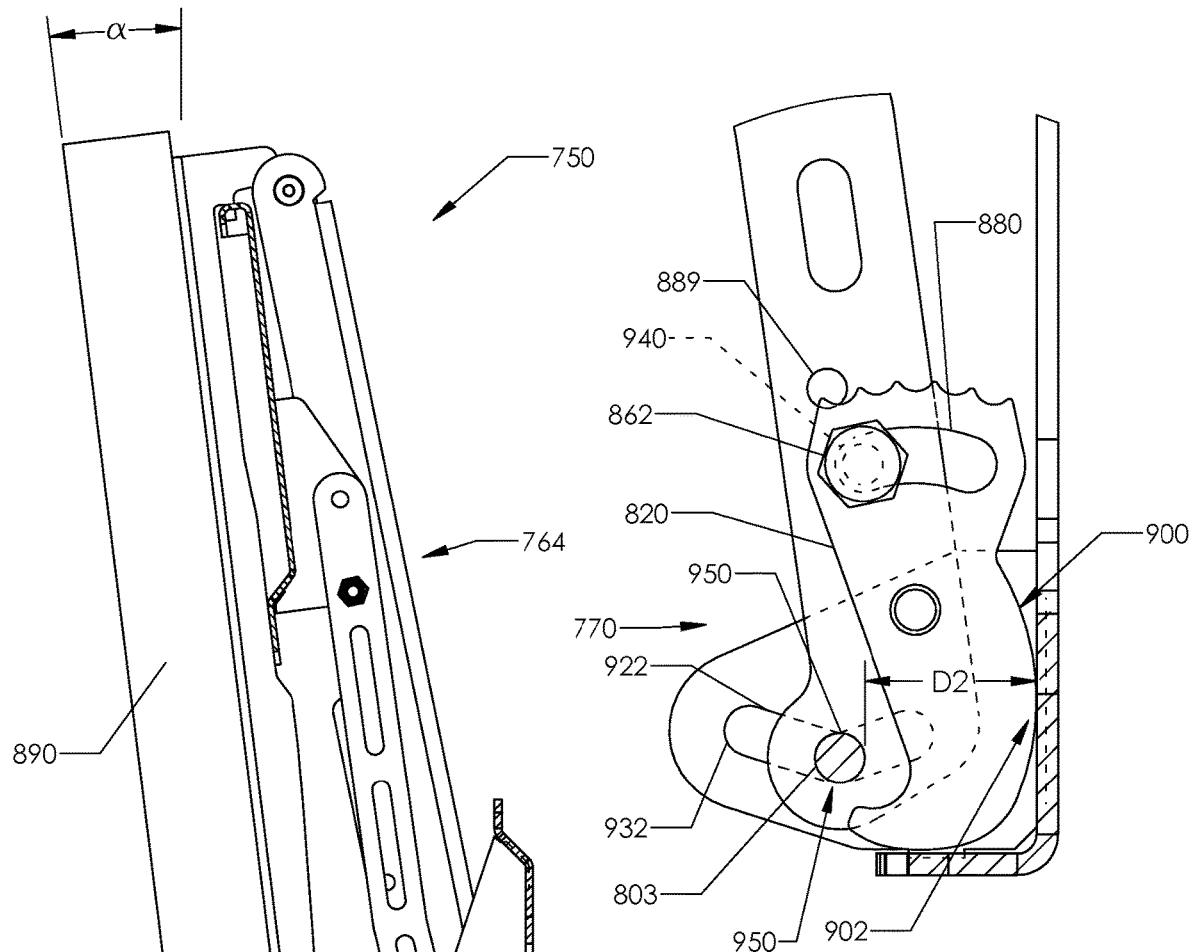
FIG. 36 is a detailed view of the tilt adjustment mechanism of FIG. 35.
Figure 35:
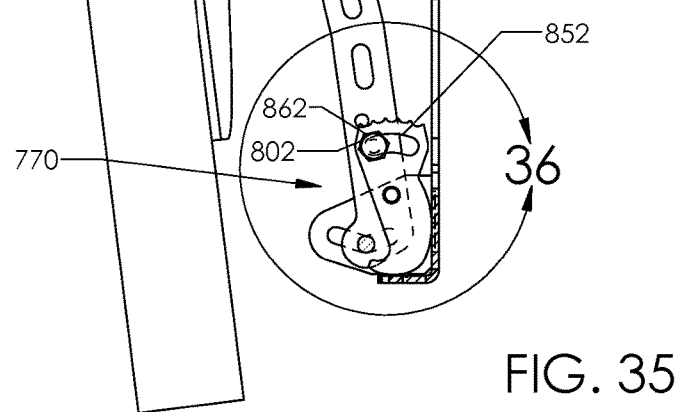
FIG. 35 is a cross-sectional view of the mounting system taken along a line 35-35 of FIG. 30. The mounting system is in a downward tilt position.

The two tilt adjustment mechanisms 770 are operable to set the tilt of the television in the raised position, and the two tilt adjustment mechanisms 772 are operable to set the tilt of the television in the lowered position. For example, a viewer's eyes may be positioned much lower than the television when the mounting system 750 is in a raised or stowed configuration. The tilt adjustment mechanisms 770 can be used to move the pivots 803 to tilt the television downwardly to provide a desired or convenient viewing angle. FIGS. 31-34 show the tilt adjustment mechanism 770 at a minimum top tilt setting to provide a minimum tilt angle of a television 890 (FIGS. 31 and 33). FIGS. 35 and 36 show the tilt adjustment mechanism 770 at a maximum top tilt setting to provide a maximum tilt angle of the television 890. As the television 890 is lowered, it can gradually tilt to ensure that its screen remains at a desired orientation relative to viewer(s) (e.g., generally perpendicular to a viewer's line of sight).

FIGS. 29 and 30 show the counterbalance mechanism 780 configured to provide a counterbalance force that allows a user to conveniently raise and lower the television but prevents or inhibits movement of the television when the user does not apply a force. The counterbalance mechanism 780, in some embodiments, provides variable resistance to allow a user to smoothly move the television. For example, the counterbalance mechanism 780 can provide a relatively low counterbalance force to allow initial upward or downward movement of the television. Referring to FIG. 30, the counterbalance mechanism 780 can include springs 810, 812 (FIG. 30) that are compressed in response to initial movement of the television. After compressing one of the springs 810, 812, one or more gas spring 813 of the counterbalance mechanism 780 can operate to allow further movement of the television.

FIG. 31 is a side view of the mounting system 750. FIG. 32 is a detailed side view of the tilt adjustment mechanism 770. Referring to FIGS. 31 and 32 together, the tilt adjustment mechanism 770 can include a cam 820 and a tilt adjustment element in the form of a bolt 862 ("tilt adjustment bolt 862") for locking the cam 820. The cam 820 is positioned between a bracket 830 of the fixed support bracket 762 and the link 769b and can contact a back plate 822 of the support bracket 762. Referring now to FIG. 32, the cam 820 can rotate about a pin 860. By way of example, the tilt adjustment bolt 862 can be rotated clockwise such that a bolt head 901 securely holds the cam 820 against the link 769b. The bolt 862 can be rotated counterclockwise (indicated by arrow 903) to release the cam 820. The cam 820 can then be rotated about the pin 860, and once the cam 820 is at the desired position, the bolt 862 can be rotated clockwise to lock the cam 820. Other types of components and mechanisms can be used to lock and unlock the cam 820.

FIG. 33 is a cross-sectional view of the mounting system 750 taken along a line 33-33 of FIG. 30. FIG. 34 is a detailed side view of the tilt adjustment mechanism 770 at the minimum top tilt setting. Referring to FIGS. 33 and 34, the cam 820 can include alignment features 872, an arcuate cam slot 880, and a main body 882. The alignment features 872 can be recesses, notches, indicia (e.g., printed marks), or other features alignable with an alignment feature 889 of the link 769b. The main body 882 can have an opening 892 through which the pin 860 extends to define the axis of rotation 894 (see FIG. 30).

As shown in FIG. 34, the main body 882 can include a contact surface 900. As the television moves upwardly, the contact surface 900 can be brought into contact with a surface 902 of the plate 822 to push a lower end 930 of the link 769b away from the surface 902. The pivot 803 can slide along a curved or V-shaped slot 922 of the bracket 830 to change the orientation (e.g., tilt) of the link 769b. FIG. 34 shows the bolt 862 at an end 930 of the cam slot 880 while the pivot 803 is at an end 932 of the slot 922. The cam 820 can be rotated (indicated by arrow 934) about the pin 860 to allow the pivot 803 to translate (indicated by arrow 935) along the slot 922 and thereby reduce a distance D1 between the pivot 803 and the surface 902.

FIG. 35 is a cross-sectional view of the mounting system 750 taken along a line 35-35 of FIG. 30 after the cam 820 has been moved to a maximum top tilt setting by rotating the cam 820 until the bolt 862 (FIG. 36) is located at an end 940 of the cam slot 880. FIG. 36 is a detailed side view of the tilt adjustment mechanism 770 in the maximum top tilt setting. Referring to FIG. 36, the pivot 803 can be positioned at a lower angled section 950 of the slot 922. The distance D2 can be significantly less than the distance D1 of FIG. 34. For example, distance D2 of FIG. 36 can be equal to or less than 60%, 70%, 80%, 90%, or 95% of the distance D1 of FIG. 34.

FIG. 37 is a side elevational view of the mounting system 750 after it has been lowered (e.g., about seven inches) from its fully raised position. The cam 820 is configured and dimensioned to allow the mounting system 750 to be lowered while the surface 900 of the cam 820 is spaced apart from or engages (e.g., rolls, slides, etc.) along the back plate surface 902.

Referring again to FIGS. 31 and 32, the bottom tilt adjustment mechanism 772 is movable between tilt bottom settings. The tilt adjustment mechanism 772 in the maximum tilt bottom setting can cause the lowered display bracket 760 to be at maximum tilt bottom orientation, and the bottom tilt adjustment mechanism 772 in the minimum tilt bottom setting can cause the lowered display bracket 760 to be at a minimum tilt bottom orientation.

Figure 39:
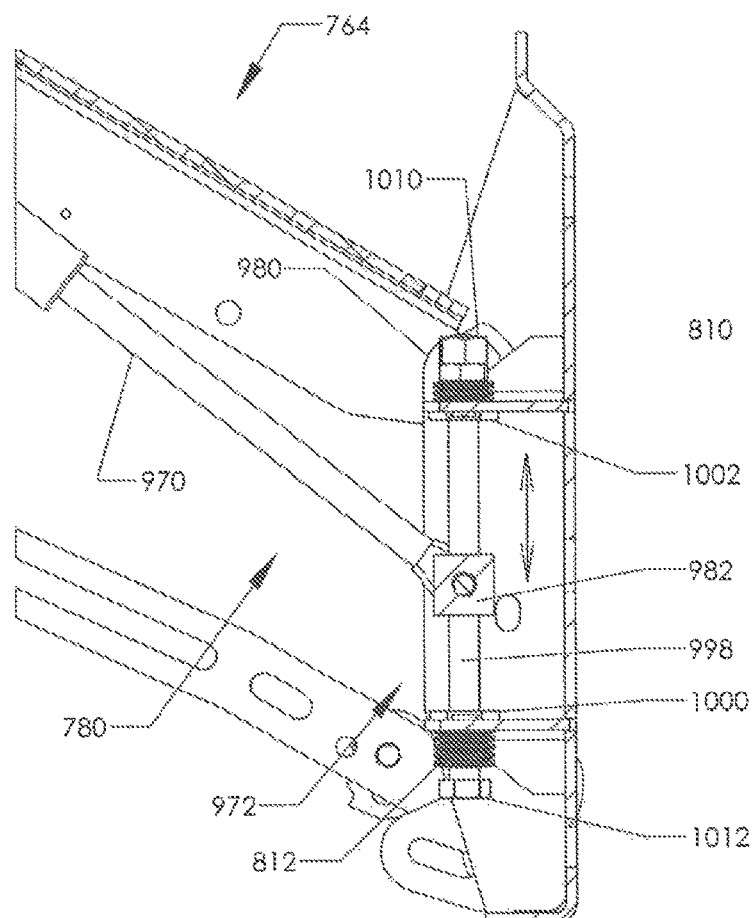
FIG. 39 is a side view of the mounting system in a partially raised configuration.
Figure 40:
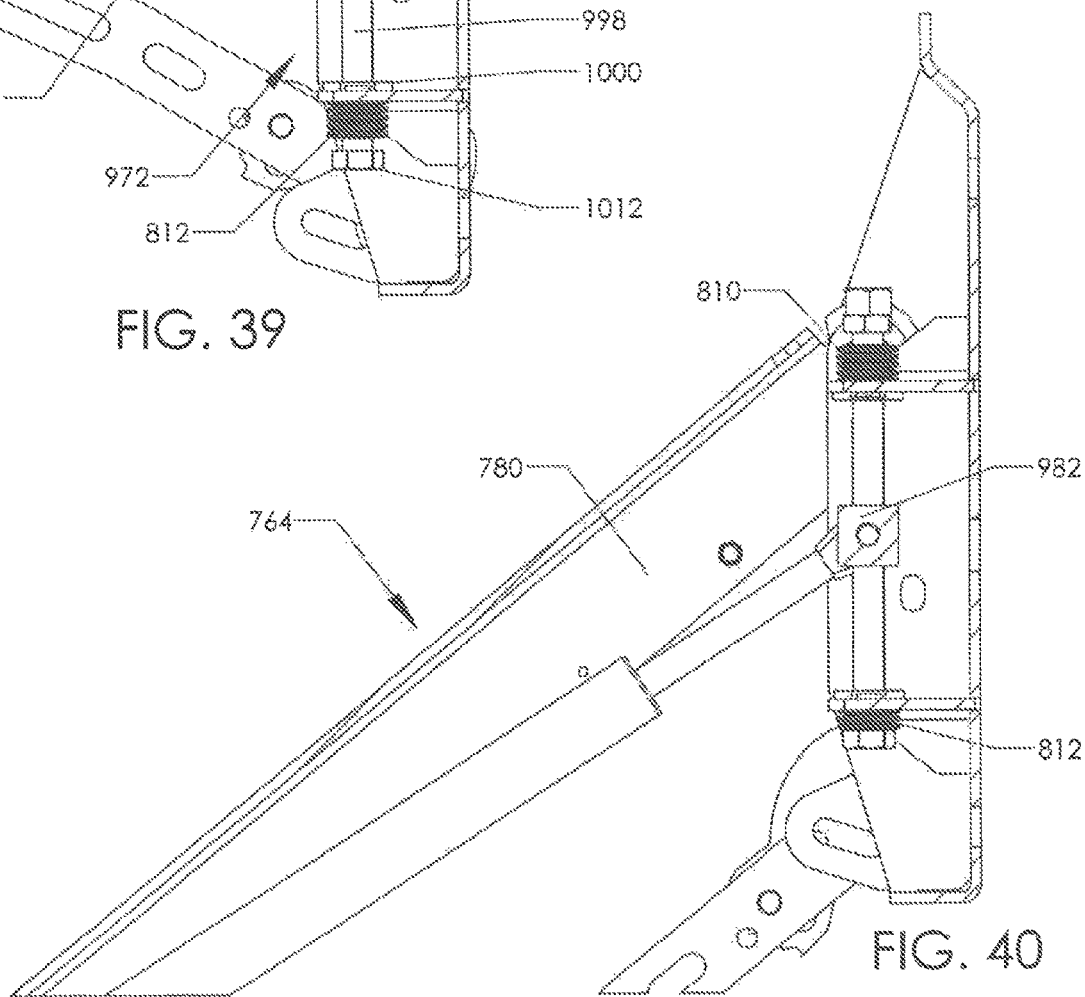
FIG. 40 is a side view of the mounting system in a partially lowered configuration.

FIGS. 39 and 40 show an embodiment of the counterbalance mechanism 780 that can include a counterbalance biasing mechanism 970 and a force adjustment mechanism 972. The counterbalance biasing mechanism 970 can be configured to counterbalance the weight of the television and, in some embodiments, can include a pair of gas springs. Other counterbalance biasing mechanisms can also be used.

The force adjustment mechanism 972 is operable to increase and decrease resistance provided by the counterbalance mechanism 780 and, in some embodiments, also allows movement of the television before extending/contracting the counterbalance mechanism 780. The force adjustment mechanism 972 can include a bolt assembly 980, a carriage or slider element 982 ("carriage 982") coupled to the bolt assembly 980, and springs 810, 812. The bolt assembly 980 can include an externally threaded bolt 998 (external threads are not illustrated) that can be rotated to move the carriage 982 upwardly or downwardly. When the carriage 982 is at a lowered position (e.g., adjacent to or against a lower stop 1000), the counterbalance mechanism 780 can provide a maximum counterbalance force. When the carriage 982 is at a raised position (e.g., adjacent to or against an upper stop 1002), the counterbalance mechanism 780 can provide a minimum counterbalance force. The carriage 982 can be moved to different positions between the stops 1000, 1002 to orient the counterbalance biasing mechanism 780.

The bolt assembly 980 can be moved vertically relative to the lower and upper stops 1000, 1002 to alternatingly compress the springs 810, 812. When the bolt assembly 980 moves downwardly, the upper spring 810 can be compressed between a bolt head 1010 and the upper stop 1002. FIG. 39 shows the spring 810 compressed and the spring 812 uncompressed. When the bolt assembly 980 moves upwardly, the spring 812 can be compressed between a bolt head 1012 and the lower stop 1000. FIG. 40 shows the spring 812 compressed and the spring 810 uncompressed.

Referring to FIG. 39, the upper spring 810 can be in a compressed state and the lower spring 812 can be in an uncompressed state when the linkage assembly 764 extends upwardly. The spring 810 can be further compressed when the mounting system 750 initially moves downward. During this initial movement, the biasing mechanism 970 can remain fixed (i.e., it does not extend/contract a significant amount). As such, the television can be moved due to compression of the spring 810. After fully compressing the spring 810, the biasing mechanism 970 can extend/contract to provide a counterbalance force for most of the travel of the television.

As shown in FIG. 40, when the linkage assembly 764 extends downwardly, the upper spring 810 can be uncompressed and the lower spring 812 is compressed. The carriage 982 can move upwardly to further compress the lower spring 812. The spring 812 can be further compressed when the mounting system 750 initially moves upward. The television can be initially moved due to compression of the spring 812. After fully compressing the spring 812, the biasing mechanism 970 can extend/contract to provide a counterbalance force for most of the travel of the television.

The counterbalance mechanism and any of its components of FIGS. 39 and 40 can be incorporated into any of the mount systems disclosed herein. Aspects of the embodiments can be modified, if necessary to employ concepts of the various patents, applications and publications to provide yet further embodiments. For example, U.S. Provisional Patent Application No. 61/913,195 filed Dec. 6, 2014, U.S. Provisional Patent Application No. 61/396,850 filed Jun. 4, 2010, U.S. patent application Ser. No. 13/118,297 filed May 27, 2011, U.S. patent application Ser. No. 14/562,842, U.S. patent application Ser. No. 14/229,780, and U.S. patent application Ser. No. 13/118,297 are all incorporated herein by reference in their entireties and can be combined with embodiments disclosed herein. Additionally, the description of the mounting systems 100, 400, 700, 750 applies equally to the mounting systems discussed in connection with FIGS. 41-71 unless indicated otherwise. Aspects of the mounting systems 1100 and 2000 can be modified to include components or employ concepts of the mounting systems 100, 400, 700, or 750. Additionally, aspects of the mounting systems 100, 400, 700, or 750 can be modified to include components or employ concepts of the mounting systems 1100 and 2000. Accordingly, various features of the mounting systems can be mixed and matched to achieve as desired.

Figure 41:
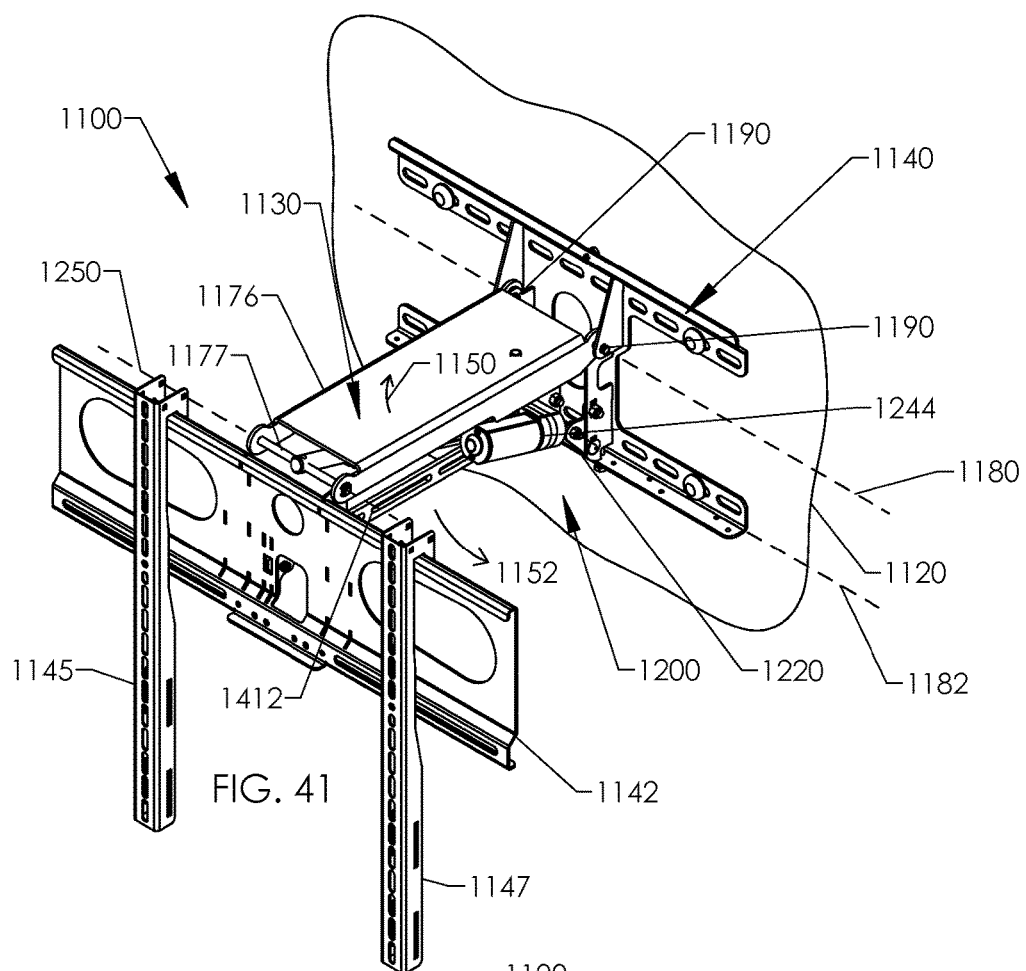
FIG. 41 is a front, top isometric view of a mounting system mounted on a wall in accordance with one embodiment.
Figure 42:
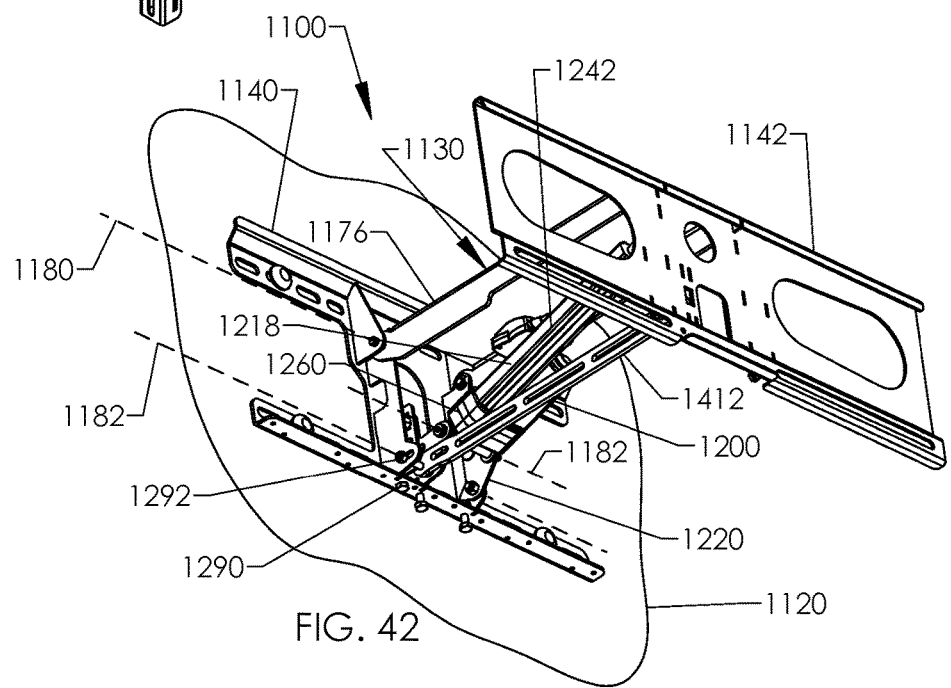
FIG. 42 is a front, bottom isometric view of the mounting system of FIG. 41 without display brackets.

FIGS. 41 and 42 show a mounting system in the form of a wall mount 1100 ("wall mount 1100") that includes a linkage assembly 1130, a support bracket 1140, and a display bracket 1142 with electronic display holders or brackets 1145, 1147 (shown removed in FIG. 42). The linkage assembly 1130 is rotatably coupled to the support and display brackets 1140, 1142 and can swing upwardly (indicated by arrow 1150 of FIG. 41) or downwardly (indicated by arrow 1152 of FIG. 41). The support bracket 1140 is mounted on a support structure 1120, which can be a vertical wall. The wall mount 1100 can include an actuator assembly 1200 operable to drive the display bracket 1142 to different positions. The display bracket 1142 can be tilted at certain points along its path of travel after it has been moved away from the support structure or wall. This allows the electronic display to be maintained at a suitable orientation with respect to a viewer's line of sight. As the electronic display is lowered, it can gradually tilt to remain at a suitable viewing orientation.

The linkage assembly 1130 can include a main member or upper link 1176 ("upper link 1176") and a lower link 1412. The upper link 1176 is rotatable about an upper axis of rotation 1180 defined by support pivots 1190. The lower link 1412 is rotatable about a lower axis of rotation 1182 defined by support pivot 1292 (FIG. 42). The axes of rotation 1180, 1182 can lie in an imaginary plane which is substantially parallel to the wall 1120. The display bracket 1142 can be rotatably coupled to the upper link 1176 by pivot 1177 (FIG. 41). The linkage assembly 1130 can have other configurations, number of linkages, and other suitable components (e.g., biasing mechanisms, counterbalances, etc.) that provide desired functionality.

Referring now to FIG. 42, an actuator assembly 1200 can include a linear actuator 1218, motor 1244 (FIG. 41), controller, processing units, combinations thereof, or the like. The linear actuator 128 can be rotatably coupled to the support bracket 1140 and the display bracket 1142. The motor 1244 (FIG. 41) can include one or more drive motors, stepper motors, or the like that are mounted on the linear actuator 1218, the mounting bracket 1142, or another suitable component. In some embodiments, a controller comprising one or more processing units is carried by the motor 1244. The configuration of components of the actuator assembly 1200 can be selected based on the desired functionality and modes of operation.

With continued reference to FIG. 42, the wall mount 1100 can also include an actuator positioner 1220 and a bottom tilt mechanism 1290. The actuator positioner 1220 can be used to move an end 1260 of the linear actuator 1218 relative to the linkage assembly 1130 to function as a force adjusting mechanism for increasing or decreasing the amount of force needed to, for example, raise and/or lower the display bracket 1142. This allows different electronic displays to be mounted on the display bracket 1042. The user can select the appropriate position of the actuator assembly 1200 based on the desired amount of flexing of components, weight of the display, or the like.

Figure 43:
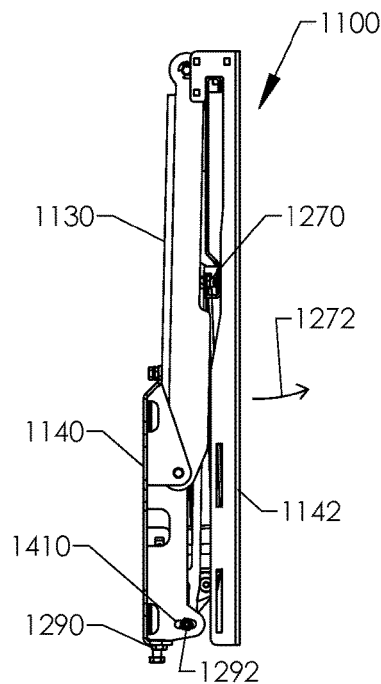
FIGS. 43-48 illustrate a mounting system in various positions.
Figure 44:
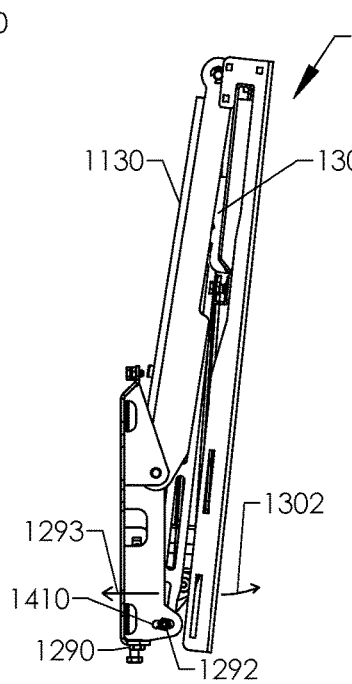

FIGS. 43-48 show the wall mount 1100 at different positions. When the wall mount 1100 is at or near the stowed position of FIG. 43, the display bracket 1142 can be moved away from the support bracket 1140. FIGS. 43 and 44 show the linkage assembly 1130 and display bracket 1142 initially moving together with substantially no relative movement therebetween. As shown in FIGS. 44-48, when the wall mount 1100 continues to move downward, the cam mechanism 1300 (labelled in FIGS. 44 and 45) causes rotation of the display bracket 1142 relative to linkage assembly 1130. Once the display bracket 1142 is at the desired orientation, the cam mechanism 1300 allows further deployment of the wall mount 1100 without further relative rotation of the display bracket 1142.

Referring again to FIG. 43, the raised wall mount 1100 can include a stowed tilt mechanism 1270 operable to move the display bracket 1142, as indicated by arrow 1272, when the wall mount 1100 is at or near the stowed position. In some embodiments, the wall mount 1100 can remain at an over-center position while the stowed tilt mechanism 1270 adjusts the position of the display bracket 1142. The bottom tilt mechanism 1290 can be used to adjust the position of the lower pivot 1292. For example, a user can manually operate the bottom tilt mechanism 1290 to set the position of the lower pivot 1292, so as to control or limit the amount of travel of the pivot 1292 along a slot 1410, as discussed in connection with FIGS. 55-62A.

Figure 45:
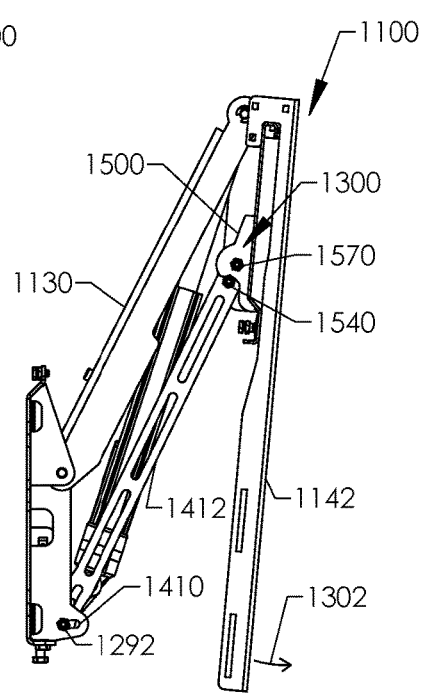

FIG. 44 shows the wall mount 1100 after it has been moved away from an over-center position. The lower pivot 1292 can move rearwardly (indicated by arrow 1293) to maintain an appropriate distance between pivot points. FIG. 45 shows the pivot 1292 after it has been moved rearwardly along the slot 1410.

Figure 46:
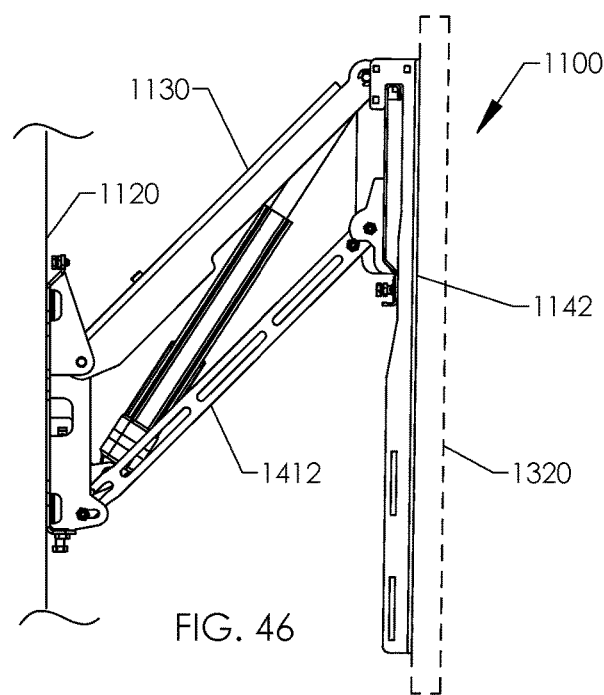
Figure 47:
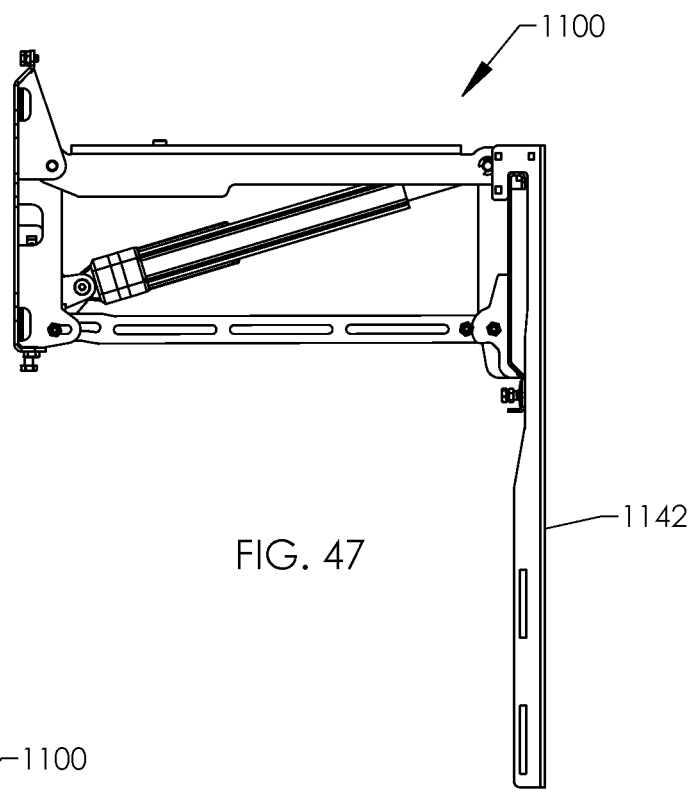
Figure 48:
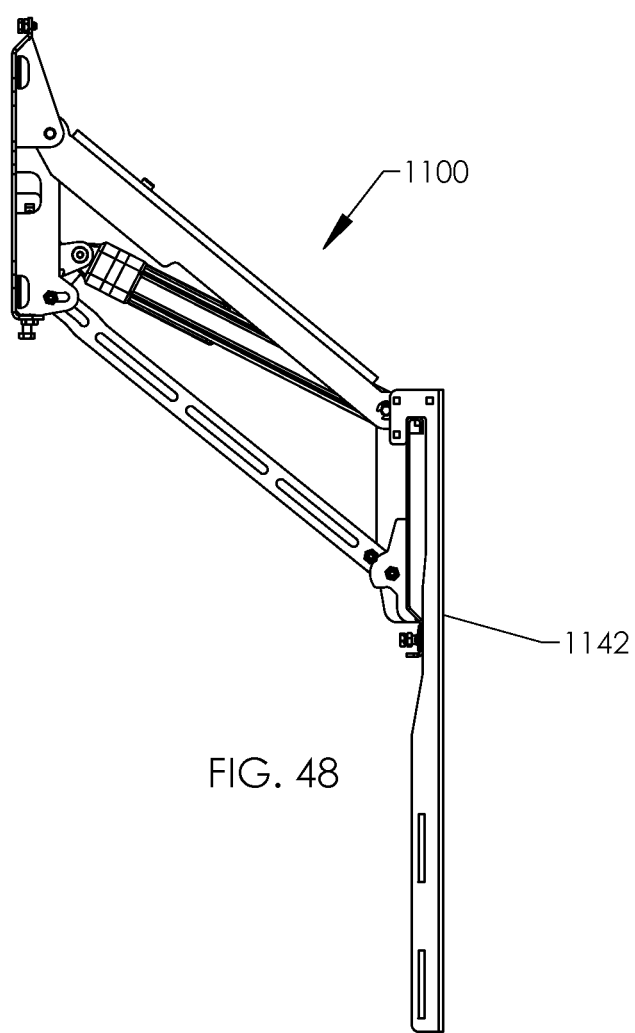

With reference to FIGS. 44 and 45, in some embodiments, the display bracket 1142 can angle downwardly as the wall mount 1100 is initially moved away from a wall. FIGS. 44 and 45 show the cam mechanism 1300 causing the bottom of the display bracket 1142 to rotate away from the lower linkage 1412, as indicated by arrow 1302. FIG. 46 shows display bracket 1142 after it has been tilted to a generally vertical orientation. FIGS. 46 to 48 show the display bracket 1142 at a generally vertical orientation to hold the display or television 1320 (illustrated in phantom line in FIG. 46) generally parallel to the support surface 1120 (FIG. 46).

Referring now to FIG. 45, the passive cam mechanism 1300 can include a passive tilt cam 1500 and a follower 1540 and has different states of operation, including a camming state (FIGS. 43 and 44), a non-camming or neutral camming state (FIG. 45), or other desired states. FIG. 46 shows the passive camming mechanism 1300 operating to keep the display bracket 1142 at a viewing orientation. The display bracket 1142 can be lowered while maintaining its orientation. The configuration of the cam mechanism 1300 can be selected to provide the desired amount of rotation/translation of the display bracket. Details of the components and operation of the passive cam mechanism 1300 are discussed in connection with FIGS. 63-67A.

Figure 49:
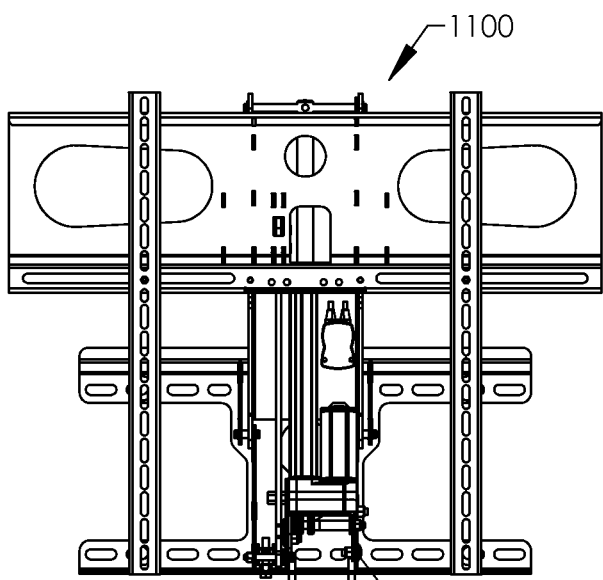
FIG. 49 is a front view of a mounting system in a raised configuration.
Figure 50:
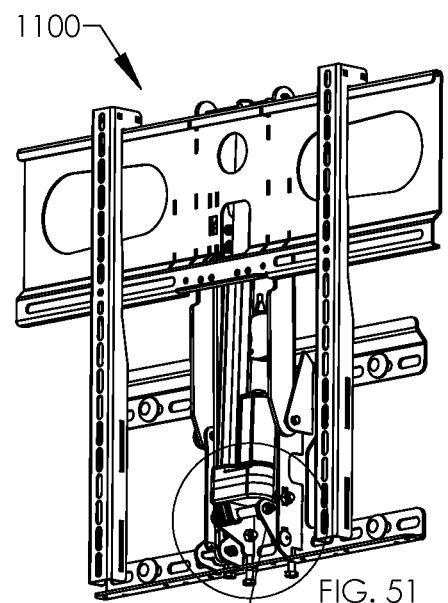
FIG. 50 is an isometric view of a mounting system in the raised configuration.
Figure 51:
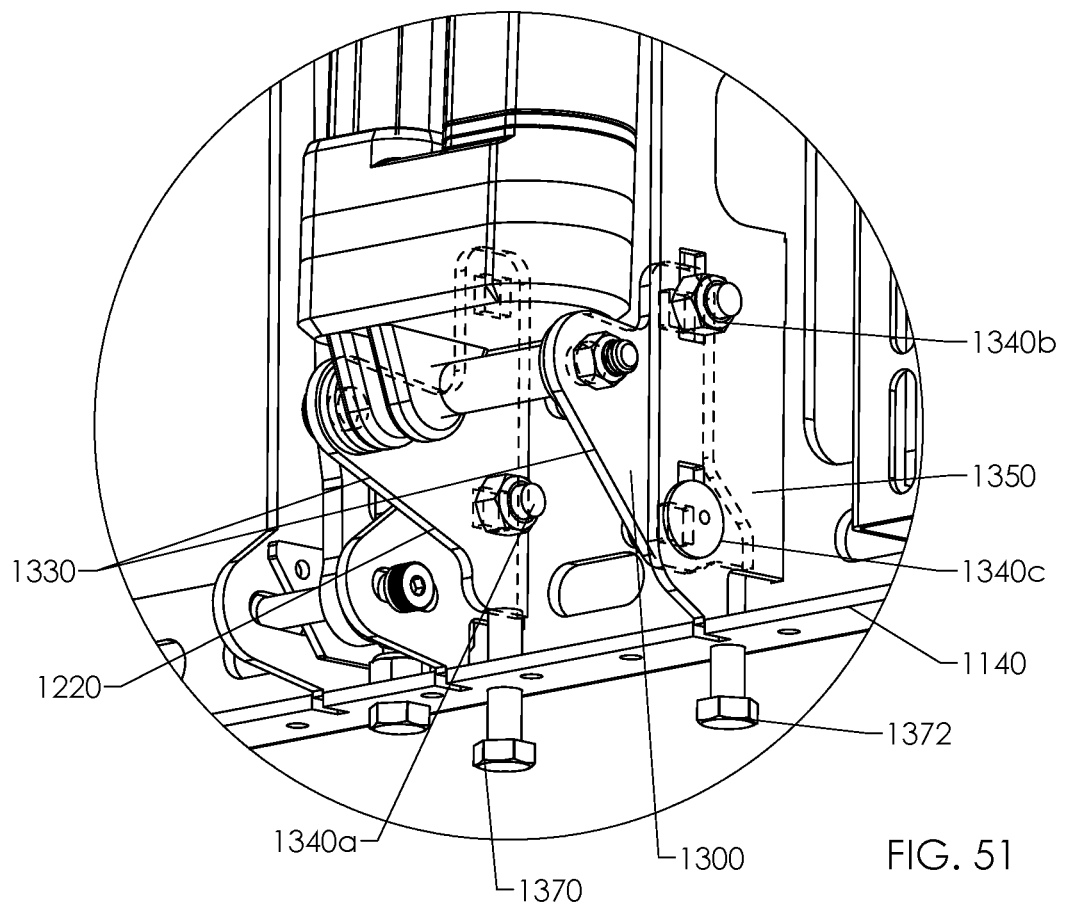
FIG. 51 is a detailed view of a carriage assembly in accordance with one embodiment.

FIG. 49 is a front view of the wall mount 1100 in a raised configuration, FIG. 50 is an isometric view of the wall mount 1100, and FIG. 51 is a detailed view of the actuator positioner 1220. The actuator positioner 1220 has a locked configuration for holding at least a portion of the end 1260 of the linear actuator 1218 stationary and an unlocked configuration for driving the end 1260 to another position. The actuator positioner 1220 can be used to set the position of the linear actuator 1218 to accommodate televisions of different weights, adjust flexing of components of the wall mount 1100, or the like.

Referring now to FIG. 51, the actuator positioner 1220 can include a carriage 1330 movable along a predetermined path, carriage positioners 1370, 1372 configured to move the carriage 1330, and carriage locking features 1340a, 1340b, 1340c (collectively "fasteners 1340") configured to lock the carriage 1330. The carriage locking features 1340 can include bolts, nut and bolt assemblies, pins, or combinations thereof and can extend through respective openings in fixed bracket members 1350 of the support bracket 1140.

FIG. 52 is an isometric view of the actuator positioner 1220 in accordance with one embodiment. The carriage 1330 can include spaced apart plates 1351, 1352 and a pin 1360 extending between the plates 1350, 1352. The pin 1360 can be rotatably coupled to the linear actuator end 1260 to allow the linear actuator 1218 to rotate freely and can include, without limitation, a pivot, bearings, threaded ends, pins, or other features for connecting components.

FIGS. 53 and 54 show carriage positioners 1370, 1372 that threadably engage internally threaded holes in a support member 1396. The carriage positioners 1370, 1372 can be bolts, screws, threaded members, plungers, or combinations thereof. The number, position, or configuration of the carriage positioners can be selected based on the selected number of contact points along the carriage.

Referring now to FIG. 53, the carriage positioners 1370, 1372 can be rotated clockwise (indicated by arrows 1380, 1382) to push the carriage 1330 upwardly. As the carriage positioners 1370, 1372 rotate, the fastener 1340b moves upwardly along slot 1390 and the fastener 1340c moves upwardly along a slot 1392. FIG. 54 shows the carriage 1330 after the carriage 1330 has been moved upwardly and the fasteners 1340b, 1340c are at the upper ends of the slots 1390, 1392, respectively.

FIG. 55 is a side view of the wall mount 1100 at a generally horizontal position. FIGS. 56 and 57 are detailed views of the bottom tilt mechanism 1290 in different configurations. Referring now to FIG. 56, the bottom tilt mechanism 1290 can include an adjustment element 1400 and an adjustment element positioner 1402. The adjustment element 1400 can contact and push the pivot 1292 along the slot 1410 in the linkage 1412. In some embodiments, the adjustment element 1400 has an angled contact or bearing edge 1420. When the adjustment element 1400 is moved from the raised position (illustrated in FIG. 56) to the lowered position (illustrated in FIG. 57), the bearing edge 1420 drives the pivot 1292 along the slot 1410. The pivot 1292 can be moved from a rearward position shown in FIG. 56 to a forward position shown in FIG. 57. The lowered adjustment element 1400 of FIG. 57 can limit or substantially prevent translation of the pivot 1292 along the slot 1410.

Figure 58:
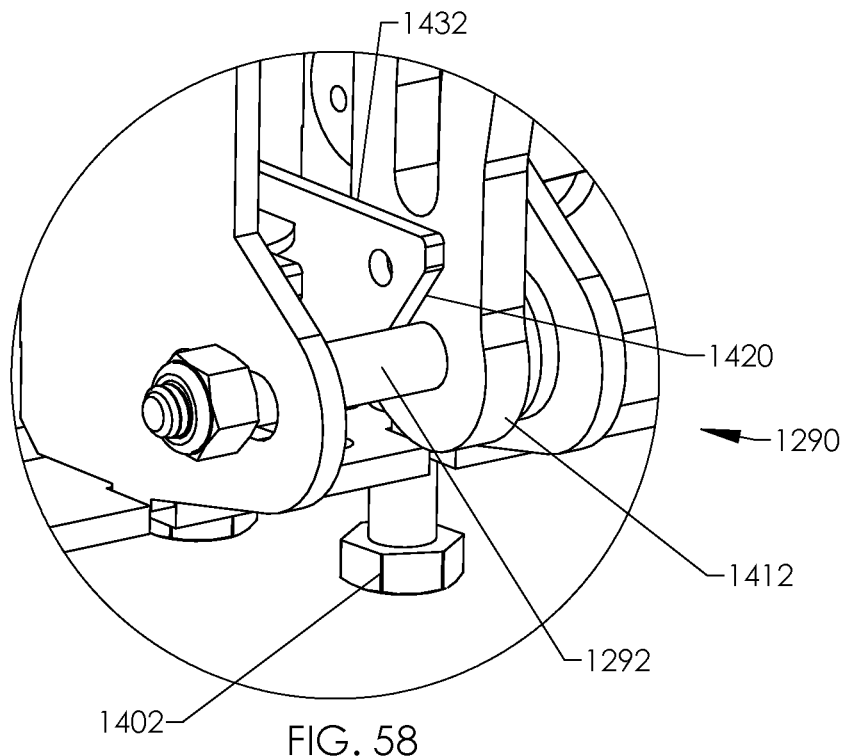
FIG. 58 is an isometric view of the bottom tilt mechanism in accordance with one embodiment.
Figure 59:
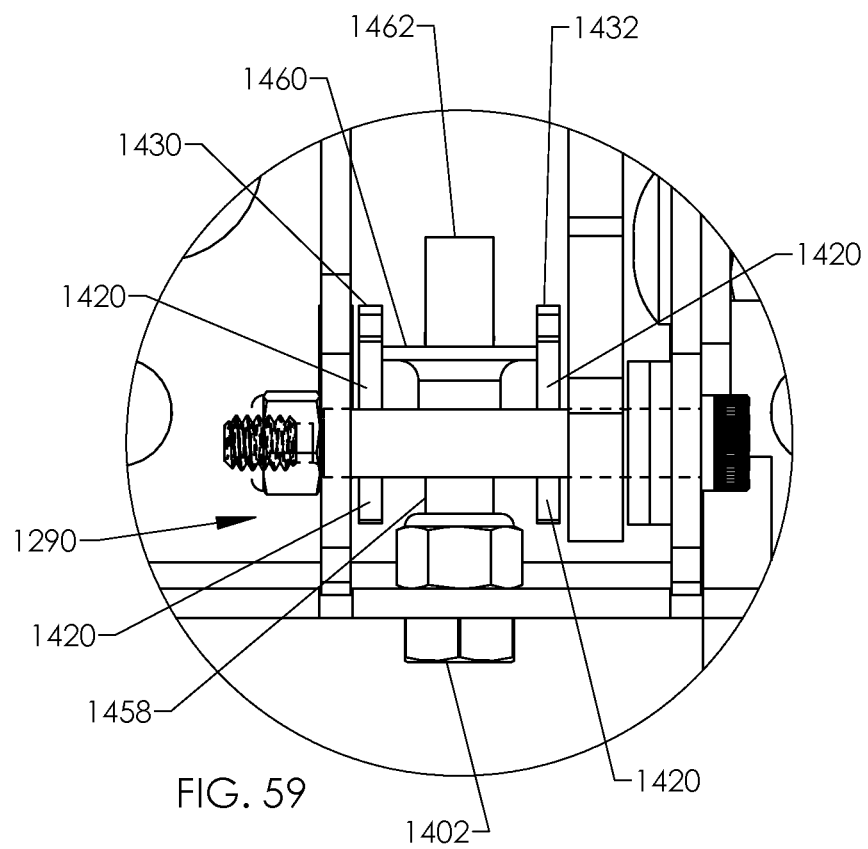
FIG. 59 is a front view of the bottom tilt mechanism of FIG. 58.

FIGS. 58 and 59 are isometric and front views, respectively, of the bottom tilt mechanism 1290. Referring now to FIG. 59, the adjustment element 1400 can include plates 1430, 1432 with edges 1420. The positioner 1402 can include an engagement element in the form of a disc or plate 1460 that extends through slots in the plates 1430, 1432. A threaded body 1458 of the adjustment element positioner 1402 can be rotated to translate the plate 1460. As the disc 1460 translates, it moves the plates 1430, 1432 upwardly or downwardly. The number, configuration, and position of the plates can be selected based on desired actuation capability.

FIGS. 60 to 62A illustrate the wall mount 1100 in accordance with one embodiment. FIGS. 60 and 60A show the pivot 1292 positioned generally midway between ends 1461, 1462 of the slot 1410. As the wall mount 1100 is lowered, the pivot 1292 moves along the slot 1410, as indicated by arrow 1480.

FIGS. 61 and 61A show the pivot 1292 located at the end 1461 (visible in FIG. 60A) of the slot 1410. As the wall mount 1100 continues to be lowered, the pivot 1292 can be translationally fixed. When the wall mount 1100 is at the fully lowered position, the pivot 1292 can remain translation fixed at the end 1461 (visible in FIG. 60A) of the slot 1410.

FIG. 63 is an isometric view of the display bracket 1142 in accordance with one embodiment. The passive tilt cam 1500 ("cam 1500") is secured to a main body 1510 and can include plates 1530, 1532 that are substantially geometrically congruent to one another.

FIGS. 64 to 67A illustrate the wall mount 1100 in accordance with one embodiment. When the wall mount 1100 is at the fully raised position, the cam follower 1540 can be positioned generally along a first recessed section or region 1544 (FIG. 64A) of the cam follower 1540, which can be fixedly coupled to the link 1142. As the lower link 1412 rotates, the follower 1540 and the pivot 1592 can be pushed apart from one another and the pivot 1592 moves along a slot 1590 in the lower link 1412. FIG. 64A shows the pivot 1592 at an end 1591 of the slot 1590.

As the wall mount 1100 moves downwardly, the cam follower 1540 can move along the edge 1572 of the tilt cam 1500, as indicated by arrow 1560. As the display bracket 1142 rotates in the counterclockwise direction, the pivot 1592 is pushed away from the follower 1540 by the cam 1500. This is because the distance between the pivot 1592 to the edge 1569 gradually increases from a second section or region 1554 to a third section or region 1572. As the follower 1540 and link 1412 are pushed away from the pivot 1592, the pivot 1592 moves along a slot 1594.

With reference to FIG. 65A, the distance D2 is greater than D1. The difference between D2 and D1 corresponds to the amount of translation of the pivot 1570. Once the follower 1540 moves along the fourth section or region 1576, the distance D2 remains generally constant to distance D3. Accordingly, the distance between the follower 1540 and the pivot 1592 remains generally constant as the follower 1540 moves along the fourth region 1576, as shown in FIGS. 67 and 67A.

FIG. 68 is a side view of the wall mount 1100 in the raised position in an accordance with one embodiment. FIGS. 68A and 68B are detailed views of the top tilt mechanism 1270 including a base 1600 and extendable member 1610. FIG. 68A shows the member 1610 within the base 1600 such that the display bracket 1412 is at a generally vertical orientation. FIG. 68B shows the display bracket 1412 after it has been tilted by the member 1610 moving out of the base 1600. The member 1610 can have an externally threaded body 1640 that threadably engages a threaded base in the base 1600. The member 1610 can be extended to tilt the bracket 1142. In some embodiments, the member 1610 is a threaded bolt with a head 1630 that bears against at least a portion of the linkage assembly 1130. The bolt 1610 can be rotated in one direction (e.g., clockwise) to move the member 1610 into the base 1600 and rotated the other direction (e.g., counterclockwise) to move it out of the base 1600. The distance the member 1610 extends out of the base 1600 can be increased or decreased to increase or decrease tilt of the display bracket 1412. In other embodiments, the base 1600 can be attached to the linkage assembly 1310, and the member 1610 can bear against the display bracket 1142. Other tilt mechanisms can be used to adjust the position of the display bracket 1142 at the raised or stowed position.

Figure 69:
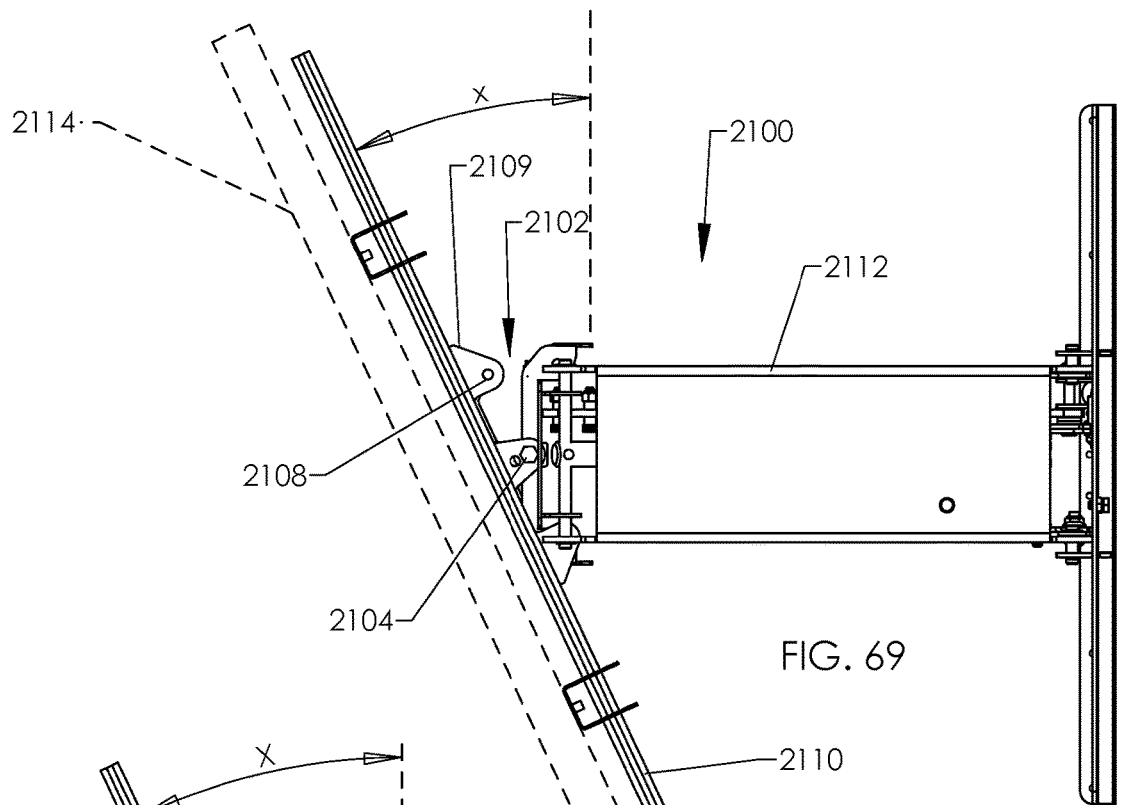
FIGS. 69 and 70 are top views of mounting systems with swivelable display brackets.

FIG. 69 is a top view of a mounting system 2100 with a swivel mechanism 2102. The mounting system 2100 can include a pivot 2104 about which a display bracket 2110 rotates relative to a linkage assembly 2112. A user can manually rotate the bracket 2110 an angle X to position a display 2114 (shown in phantom line). The angle X can be in the range of about 5 degrees to 45 degrees, 10 degrees to 30 degrees, or other suitable ranges. In other installations, the pivot 2104 can be positioned within an opening 2018 of a swivel bracket 2109. This allows the display bracket 2110 to rotate in the opposite direction.

Figure 70:
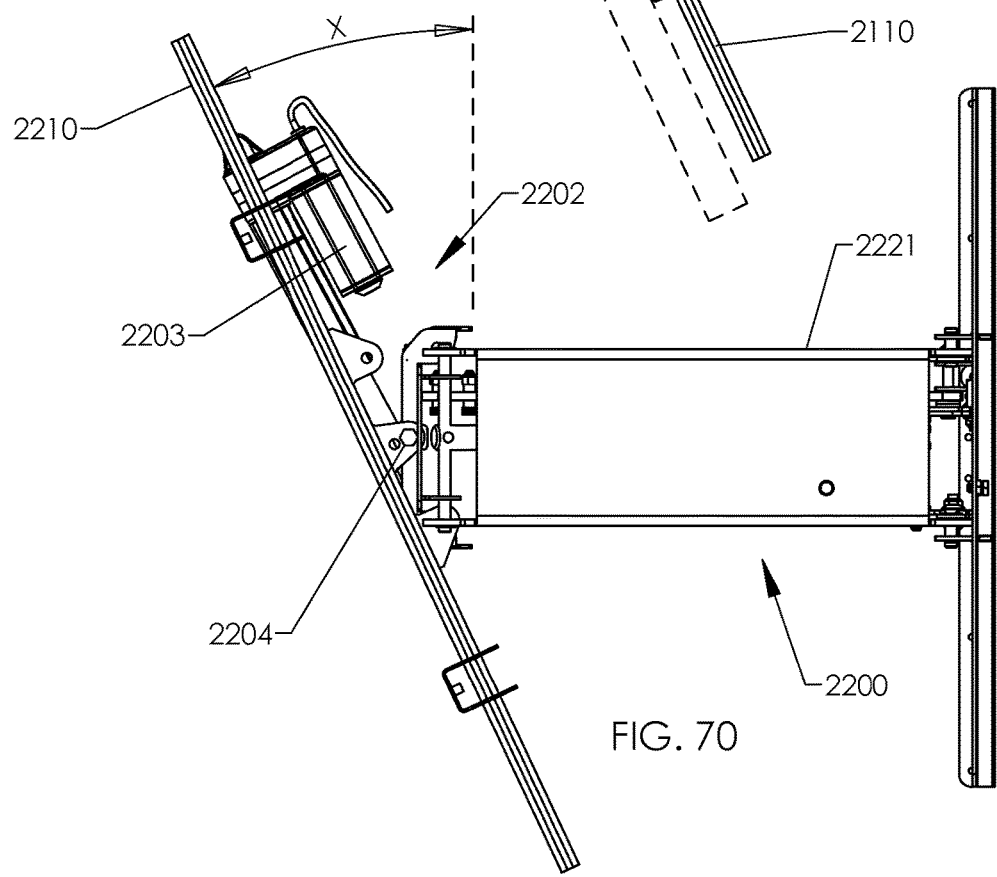

FIG. 70 is a top view of a mounting system 2200 with a motorized swivel mechanism 2202. The motorized swivel mechanism 2202 can include a swivel actuator 2203 configured to drive a display bracket 2210 about an axis of rotation defined by the pivot 2204. The swivel actuator 2203 can include, without limitation, one or more motors, solenoids, or combinations thereof and can be connected to a linkage assembly 2221 via one or more connectors, such as rods, chains, and/or belts. In other embodiments, the swivel actuator 2203 can be mounted on the linkage assembly 2221 and connected to the display bracket 2210 via one or more connectors.

Figure 71:
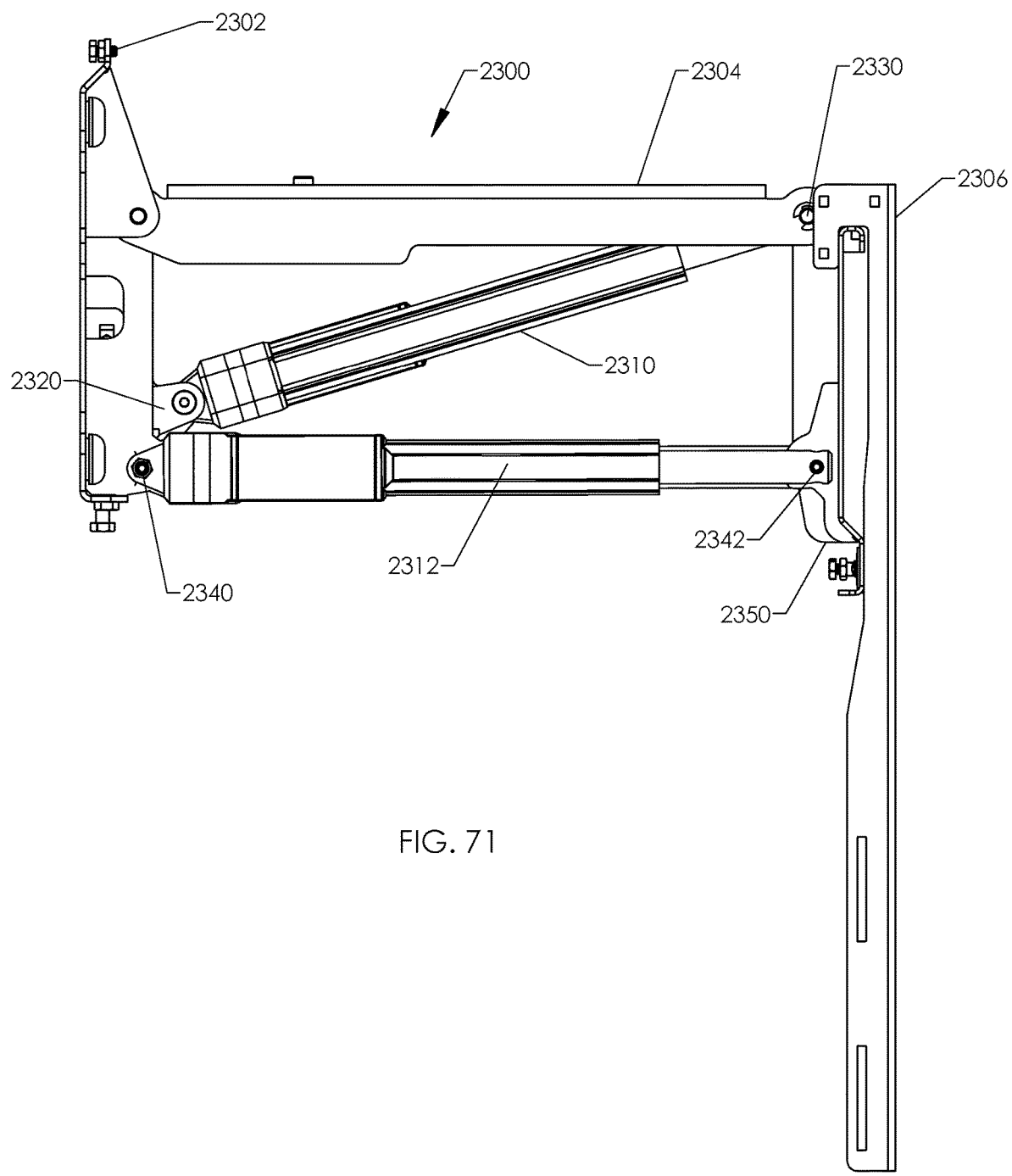
FIG. 71 is a side view of a mounting system in accordance with one embodiment.

FIG. 71 is a side view of a mounting system in accordance with one embodiment. The mounting system is in form of wall mount 2300, that can include a wall support 2302, a linkage assembly 2304, and display bracket 2306. The linkage assembly 2304 can include a plurality of actuators 2310, 2312 that cooperate to provide relative motion between the brackets 2302, 2306. The actuator 2310 extends from and is pivotally coupled to a carriage assembly 2320 and an upper pivot 2030. The lower actuator 2312 extends between a lower pivot 2340 held by the support bracket 2302 and a pivot 2342, which is coupled to a member 2350 of the display bracket 2306. The actuators 2310, 2312 can extend or contract to raise, lower, tilt, or otherwise move the display bracket 2306. For example, the actuator 2312 can adjust its length to tilt the display bracket 2306 without raising/lowering the display bracket 2306. Other mounting systems disclosed herein can include multiple actuators to provide desired functionality.

FIG. 72 is a side view of a mounting system 3000 in accordance with another embodiment. FIG. 72A is a detailed view of a portion of the mounting system of FIG. 72. The relevant description of the mounting system 1100 discussed in connection with FIGS. 41-68B applies to the mounting system 3000, except as indicated otherwise. The mounting system 3000 includes a switch assembly 3010 (FIG. 72A) configured to control operation of the mounting system. The switch assembly 3010 can be mounted on a display bracket or other suitable component and can control driving provided by the motorized actuator when the mounting system 3000 near to or at the top position. This provides repeatable operation independent of the weight of the display being carried.

Referring to FIG. 72A, the switch assembly 3010 can include an actuatable plunger 3020 and a main body or switch 3030. An adjustable switch point 3040 movable away from or toward the plunger 3020. A switch point element 3060 can be a locknut or another suitable element rotatably to move a bolt 3070, as indicated by arrows 3072, 3074. The switch point element 3060 is carried by the linkage assembly or another component. The bolt 3070 can be extended or retracted to adjust the location of the fully raised position.

FIG. 73 is a side view of the mounting system 3000 in a fully raised configuration. FIG. 73A is a detailed view of the mounting system 300 with the plunger 3020 in a depressed position. A motorized actuator can raise the linkage assembly until the plunger 3020 is depressed a desired amount. The number, configuration, and functionality of the switches can be selected based on the desired operation of the mounting system 3000. For example, the switches can be contact switches, proximity switches, or the like.

Various methods and techniques described above provide a number of ways to carry out the invention. Of course, it is to be understood that not necessarily all objectives or advantages described may be achieved in accordance with any particular embodiment described herein and may depend on the use of the mounting systems. Thus, for example, those skilled in the art will recognize that the methods may be performed in a manner that achieves or optimizes one advantage or group of advantages as taught herein without necessarily achieving other objectives or advantages as may be taught or suggested herein. Furthermore, the skilled artisan will recognize the interchangeability of various features from different embodiments disclosed herein and disclosed in U.S. patent application Ser. No. 14/563,842; U.S. Provisional Patent Application No. 61/913,195; U.S. patent application Ser. No. 14/229,780; U.S. patent application Ser. No. 13/118,297; and U.S. Provisional Patent Application No. 61/396,850. For example, cam mechanisms, tilting features, panning features, counterbalancing features, controllers, motors, etc. can be incorporated into linkage assemblies, support brackets, display brackets, or the like. All of these applications are incorporated herein by reference in their entireties. Similarly, the various features and acts discussed above, as well as other known equivalents for each such feature or act, can be mixed and matched by one of ordinary skill in this art to perform methods in accordance with principles described herein.

Although the invention has been disclosed in the context of certain embodiments and examples, it will be understood by those skilled in the art that the invention extends beyond the specifically disclosed embodiments to other alternative embodiments and/or uses and obvious modifications and equivalents thereof. Accordingly, it is not intended that the invention be limited, except as by the appended claims.

What is claimed is:

1. A collapsible television mounting system for moving a television between a raised position and a lowered position, the television mounting system comprising:
   a support bracket configured to couple to a wall;
   a display bracket configured to hold a television;
   a collapsible linkage assembly pivotally coupled to the support bracket and movable between a raised configuration for holding the television at a raised position and a lowered configuration to hold the display bracket at a lowered position, the linkage assembly includes
      an upper arm rotatable about an upper axis of rotation to move relative to the support bracket, and
      a lower arm rotatable about a lower axis of rotation to move relative to the support bracket;
   an actuator holder including
      a pair of spaced apart plates coupled to the support bracket,
      a pin extending between the pair of the spaced apart plates and positioned generally between the lower axis of rotation than the upper axis of rotation; and a motorized actuator assembly having a first end coupled to the pin and a second end rotatably coupled to the linkage, wherein the motorized actuator assembly is configured to extend to move the linkage assembly from the lowered configuration to the raised configuration, wherein at least a portion of the motorized actuator assembly extends outwardly past the lower arm in a direction toward the display bracket when the linkage assembly moves toward the raised configuration to collapse the television mounting system.

2. The television mounting system of claim 1, wherein the lower arm includes a pair of spaced apart links.

3. The television mounting system of claim 1, wherein the lower arm includes a plurality of openings spaced apart along a longitudinal length of the lower arm.

4. The television mounting system of claim 1, wherein the motorized actuator assembly includes a motor and an extendable member.

5. The television mounting system of claim 1, wherein the television mounting system includes a programmable control device configured to store user-set positions for avoiding contact with one or more objects, wherein the motorized actuator assembly is controllable via a wireless controller.

6. The television mounting system of claim 1, further including:
a wireless controller configured to control operation of the motorized actuator assembly and to program the television mounting system with user-set position settings.

7. The television mounting system of claim 1, further including memory configured to store user-set position settings.

8. The television mounting system of claim 1, further comprising a control system programmed to control operation of the motorized actuator assembly such that the television mounting system avoids striking a mantelshelf positioned below the support bracket.

9. A television mounting system for raising and lowering a television, the television mounting system comprising:
a support bracket;
a display bracket;
a linkage assembly pivotally coupled to the support bracket and movable to raise and lower the display bracket;
a motorized actuator assembly operable to cause movement of the display bracket, wherein at least a portion of the motorized actuator assembly extends outwardly past the linkage assembly and toward the display bracket when the linkage assembly moves toward a raised configuration; and
a programmable control system in communication with the motorized actuator assembly and including one or more processors and memory, wherein the memory stores at least one user-set position setting and programming to cause the motorized actuator assembly to move the television to the at least one user-set position setting.

10. The television mounting system of claim 9, wherein the control system includes
a control device connected to the motorized actuator assembly via a wired or wireless connection, and
a remote control configured to wirelessly communicate with the control device.

11. The television mounting system of claim 9, wherein the programmable control system is configured to communicate with a voice-controlled IoT hub.

12. The television mounting system of claim 9, wherein the programmable control system includes one or more buttons for inputting the at least one user-set position setting.

13. A television mounting system for raising and lowering a television, the television mounting system comprising:
a support bracket;
a display bracket;
a linkage assembly pivotally coupled to the support bracket and movable to raise and lower the display bracket;
a motorized actuator assembly coupled to a linkage assembly, wherein at least a portion of the motorized actuator assembly extends outwardly past the linkage assembly in a direction toward the display bracket when the linkage assembly moves toward a raised collapsed configuration; and
a programmable control system in communication with the motorized actuator assembly and including one or more processors and memory, wherein the memory stores at least one user-set position setting and programming to cause the motorized actuator assembly to move the television to the at least one user-set position setting.

14. The television mounting system of claim 9, wherein the at least one user-set position setting includes a stowed setting for viewing the television at a raised television position and a lowered setting for viewing the television at a lowered television position.

15. The television mounting system of claim 9, wherein the memory stores the at least one user-set position setting provided via a controller.

16. The television mounting system of claim 9, further including:
a wireless controller configured to control operation of the motorized actuator assembly and to program a control device to store position settings for the television.

17. The television mounting system of claim 9, wherein the programmable control system is programmed to
receive one or more signals from a controller, and
control the motorized actuator assembly to move the linkage assembly based on the received one or more signals.

18. The television mounting system of claim 9, further comprising one or more microphones configured to receive voice commands.

19. The television mounting system of claim 9, wherein the programmable control system is configured to automatically move the display bracket to one of the user-set position settings based on received user input.

20. The television mounting system of claim 9, wherein the programmable control system includes a wireless receiver in communication with the memory and the one or more processors.

21. A television mounting system for raising and lowering a television, the television mounting system comprising:
a support bracket;
a display bracket;
an arm assembly pivotally coupled to the support bracket and movable between a first configuration for holding the television at a first position and a second configuration for holding the display bracket at a second position different from the first position;
a motorized actuator assembly that moves outwardly past the arm assembly in a direction away from the support bracket while the display bracket moves to a raised position; and a control system configured be programmed by a user and including one or more processors, and
memory configured to store user-set positions and programming executable by the one or more processors to cause the motorized actuator assembly to operate to move the display bracket to one of the user-set positions.

22. The television mounting system of claim 21, wherein the user-set positions include a stowed setting and a lowered setting.

23. The television mounting system of claim 21, wherein the control system is programmable to cause the display bracket to be automatically moved to the one of the user-set positions in response to input from the user.

24. The television mounting system of claim 21, wherein the control system is programmable to avoid contact with one or more objects within a range of motion of the television mounting system.

25. The television mounting system of claim 21, wherein the arm assembly and the support bracket form a four-bar linkage or a five-bar linkage.

26. The television mounting system of claim 21, wherein the control system includes a control device connected to the motorized actuator assembly via a wired connection.

27. The television mounting system of claim 21, wherein the motorized actuator assembly is pivotally coupled to the arm assembly.

\* \* \* \* \*